US012634117B2

(12) United States Patent
Song et al.

(10) Patent No.: US 12,634,117 B2
(45) Date of Patent: May 19, 2026

(54) COMPUTING ARCHITECTURE FOR ENERGY-EFFICIENT HASH COMPUTATION

(71) Applicant: Block, Inc., Oakland, CA (US)

(72) Inventors: William Song, San Francisco, CA (US);
Yue Yang, San Francisco, CA (US);
Bertram Leesti, San Francisco, CA
(US); Mehrdad Ramezani, San
Francisco, CA (US); Afshin Rezayee,
San Francisco, CA (US); **Kajornsak
Julavittayanukool**, San Francisco, CA
(US); Weili Chen, San Francisco, CA
(US)

(73) Assignee: Block, Inc., Oakland, CA (US)

( * ) Notice: Subject to any disclaimer, the term of this
patent is extended or adjusted under 35
U.S.C. 154(b) by 468 days.

(21) Appl. No.: 17/858,666

(22) Filed: Jul. 6, 2022

(65) Prior Publication Data

US 2024/0015005 A1 Jan. 11, 2024

(51) Int. Cl.
*H04L 9/06* (2006.01)
*H04L 9/00* (2022.01)

(52) U.S. Cl.
CPC .............. *H04L 9/0643* (2013.01); *H04L 9/50*
(2022.05)

(58) Field of Classification Search
CPC ... H04L 9/0643; H04L 9/50; H04L 2209/122;
H04L 9/3239
See application file for complete search history.

(56) References Cited

U.S. PATENT DOCUMENTS

| | | | | |
|---|---|---|---|---|
| 4,008,458 A | * | 2/1977 | Wensley | .............. H04M 11/002 |
| | | | | 340/870.13 |
| 4,099,028 A | * | 7/1978 | Towson, IV | .............. H04J 3/24 |
| | | | | 370/479 |

(Continued)

FOREIGN PATENT DOCUMENTS

| | | | |
|---|---|---|---|
| CN | 111488627 A | 8/2020 | |
| CN | 111600699 A | 8/2020 | |
| WO | WO-2013095521 A1 * | 6/2013 | .............. G06F 21/72 |

OTHER PUBLICATIONS

Author Unknown, Secure Hash Standard (SHS) Information Technology Laboratory, National Institute of Standards and Technology Published: Aug. 2015 (Year: 2015).*

*Primary Examiner* — Mohammad A Siddiqi
(74) *Attorney, Agent, or Firm* — Polsinelli PC

(57) ABSTRACT

A hashing system includes data storage circuit elements that store words to be used for hashing a message. Each data storage circuit element stores a word without moving the word to any other data storage circuit element during hashing. The hashing system includes combinational logic circuit element(s) that select specified data storage circuit elements according to a specified order that simulates shifting of at least a subset of the words among the data storage circuit elements, for instance based on an order in which the words were stored and/or based a clock. The hashing system includes computational operator(s) that generate additional word(s) based on the selected specified words. The hashing system stores the additional word(s) into available data storage circuit element(s), in some cases overwriting prior word(s) that were stored in the available data storage circuit element(s). The hashing system can include a message expander (ME) and/or message compressor (MC).

19 Claims, 16 Drawing Sheets

(56)                    References Cited

U.S. PATENT DOCUMENTS

| | | | | |
|---|---|---|---|---|
| 4,882,706 | A  * | 11/1989 | Sinclair | G11C 8/04 |
| | | | | 365/230.02 |
| 5,602,880 | A  * | 2/1997 | Webster | H04J 3/06 |
| | | | | 375/372 |
| 5,699,554 | A  * | 12/1997 | Vajapey | G06F 11/261 |
| | | | | 714/724 |
| 5,748,875 | A  * | 5/1998 | Tzori | G06F 11/261 |
| | | | | 714/724 |
| 6,539,505 | B1 * | 3/2003 | Dahn | G01R 31/31935 |
| | | | | 714/733 |
| 7,181,009 | B1 * | 2/2007 | Huxel | H04L 9/0643 |
| | | | | 713/168 |
| 10,979,214 | B2 * | 4/2021 | Denham | H04L 9/3239 |
| 11,156,662 | B2 * | 10/2021 | Xiang | G06F 30/333 |
| 2003/0043437 | A1 * | 3/2003 | Stough | H04B 10/0773 |
| | | | | 398/141 |
| 2005/0187997 | A1 * | 8/2005 | Zheng | G06F 7/5443 |
| | | | | 708/490 |
| 2007/0073999 | A1 * | 3/2007 | Verheyen | G06F 30/33 |
| | | | | 712/11 |
| 2008/0075462 | A1 * | 3/2008 | Kashima | H04J 14/005 |
| | | | | 398/58 |
| 2011/0208898 | A1 * | 8/2011 | Shin | G06F 12/0246 |
| | | | | 711/E12.008 |
| 2013/0016825 | A1 * | 1/2013 | Efrat | H04L 9/0631 |
| | | | | 380/28 |
| 2013/0083585 | A1 * | 4/2013 | Jeddeloh | G11C 5/06 |
| | | | | 365/63 |
| 2013/0132705 | A1 * | 5/2013 | Ishii | G06F 12/0607 |
| | | | | 711/211 |
| 2015/0160862 | A1 * | 6/2015 | Blott | G06F 3/0683 |
| | | | | 711/148 |
| 2015/0222377 | A1 * | 8/2015 | Chieco | H04J 3/0685 |
| | | | | 370/503 |
| 2015/0277770 | A1 * | 10/2015 | Tsai | G06F 3/0604 |
| | | | | 711/104 |
| 2016/0041813 | A1 * | 2/2016 | Narayanamoorthy | |
| | | | | G06F 1/3243 |
| | | | | 708/190 |
| 2016/0112200 | A1 * | 4/2016 | Kheterpal | G06F 9/30098 |
| | | | | 380/28 |
| 2017/0243176 | A1 * | 8/2017 | Hanke | G06Q 20/0655 |
| 2017/0302440 | A1 * | 10/2017 | Agrawal | H04L 9/3239 |
| 2018/0122825 | A1 * | 5/2018 | Lupino | H10N 70/231 |
| 2018/0316611 | A1 * | 11/2018 | Sheldon | H04L 45/72 |
| 2019/0207748 | A1 * | 7/2019 | Courtney | H04L 9/3239 |
| 2020/0036517 | A1 * | 1/2020 | Denham | H04L 9/3239 |
| 2021/0119796 | A1 * | 4/2021 | Jose | H04L 9/3213 |
| 2021/0294500 | A1 * | 9/2021 | Kodama | G06F 3/061 |
| 2022/0237164 | A1 * | 7/2022 | Havlir | G06F 16/2246 |
| 2022/0278823 | A1 * | 9/2022 | Farrahi Moghaddam | |
| | | | | H04L 9/0643 |

* cited by examiner

CHART 600
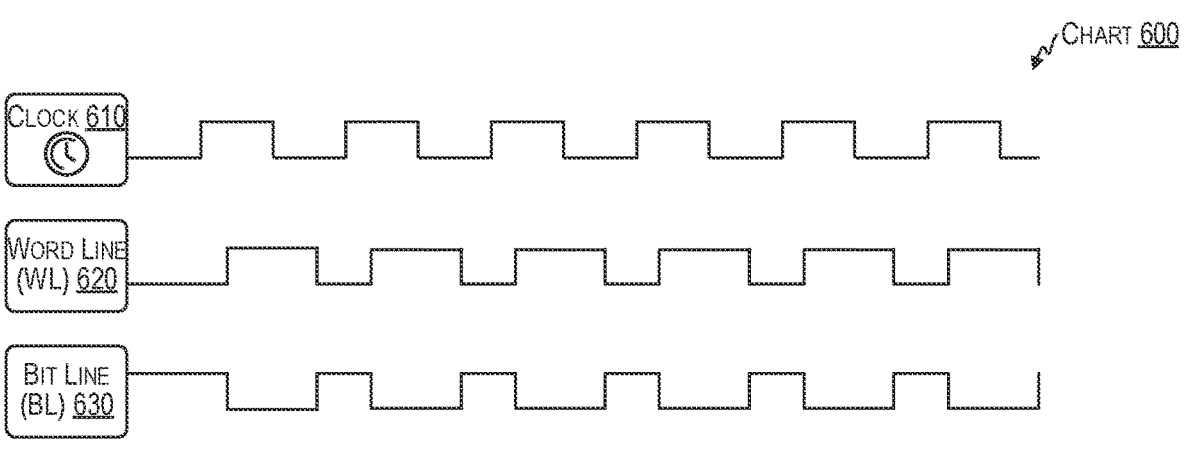
CHART 650
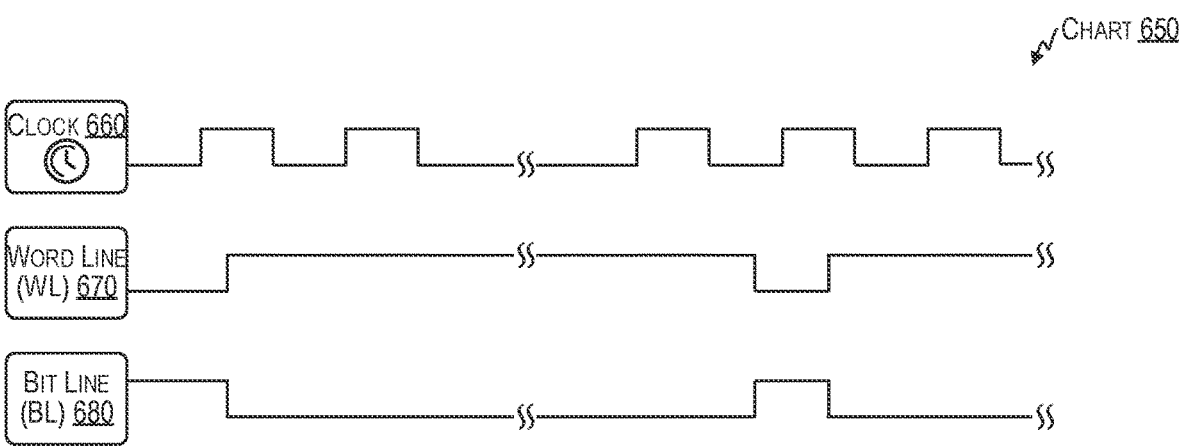
FIG. 6

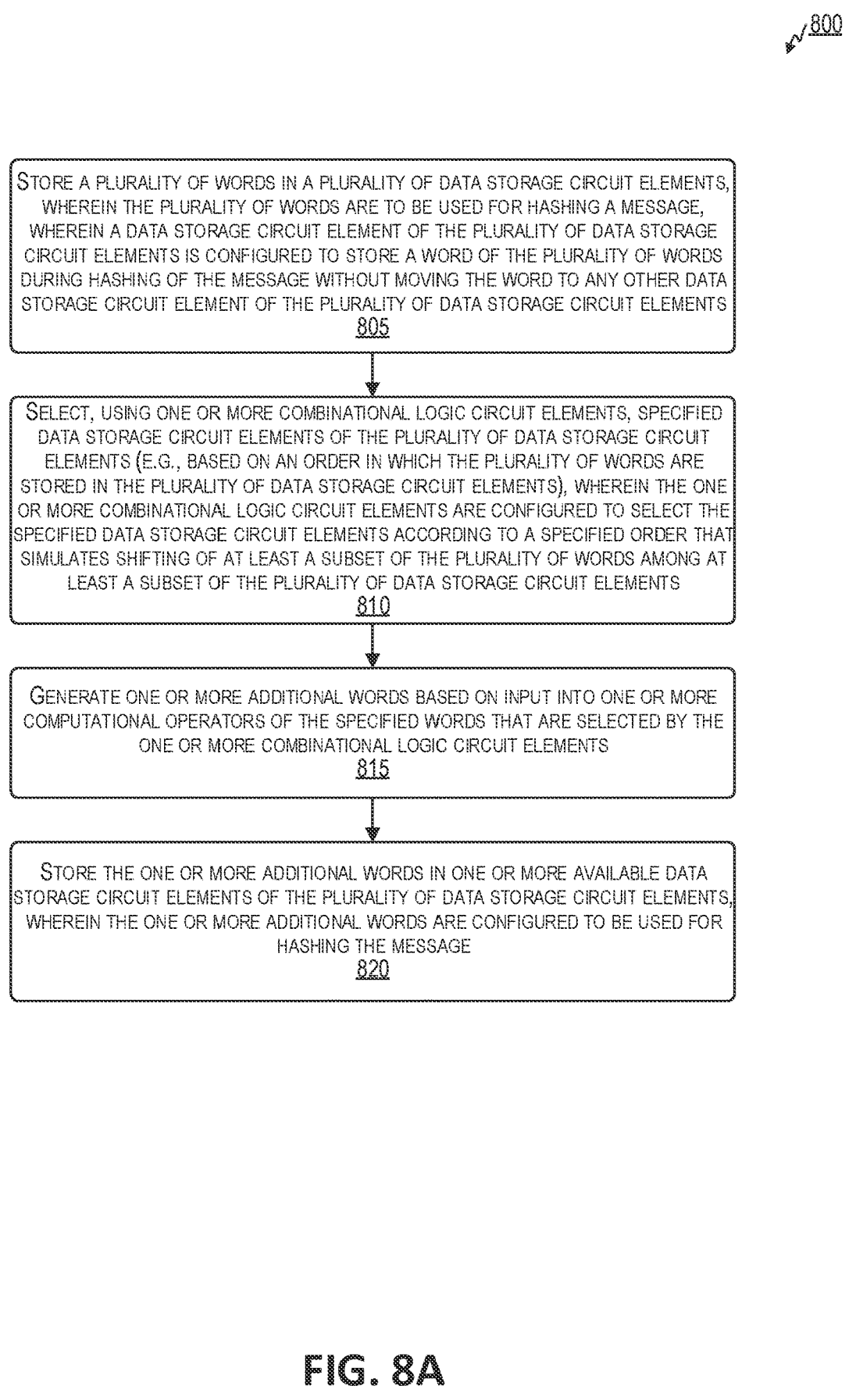

⟋800

STORE A PLURALITY OF WORDS IN A PLURALITY OF DATA STORAGE CIRCUIT ELEMENTS, WHEREIN THE PLURALITY OF WORDS ARE TO BE USED FOR HASHING A MESSAGE, WHEREIN A DATA STORAGE CIRCUIT ELEMENT OF THE PLURALITY OF DATA STORAGE CIRCUIT ELEMENTS IS CONFIGURED TO STORE A WORD OF THE PLURALITY OF WORDS DURING HASHING OF THE MESSAGE WITHOUT MOVING THE WORD TO ANY OTHER DATA STORAGE CIRCUIT ELEMENT OF THE PLURALITY OF DATA STORAGE CIRCUIT ELEMENTS
805

SELECT, USING ONE OR MORE COMBINATIONAL LOGIC CIRCUIT ELEMENTS, SPECIFIED DATA STORAGE CIRCUIT ELEMENTS OF THE PLURALITY OF DATA STORAGE CIRCUIT ELEMENTS (E.G., BASED ON AN ORDER IN WHICH THE PLURALITY OF WORDS ARE STORED IN THE PLURALITY OF DATA STORAGE CIRCUIT ELEMENTS), WHEREIN THE ONE OR MORE COMBINATIONAL LOGIC CIRCUIT ELEMENTS ARE CONFIGURED TO SELECT THE SPECIFIED DATA STORAGE CIRCUIT ELEMENTS ACCORDING TO A SPECIFIED ORDER THAT SIMULATES SHIFTING OF AT LEAST A SUBSET OF THE PLURALITY OF WORDS AMONG AT LEAST A SUBSET OF THE PLURALITY OF DATA STORAGE CIRCUIT ELEMENTS
810

GENERATE ONE OR MORE ADDITIONAL WORDS BASED ON INPUT INTO ONE OR MORE COMPUTATIONAL OPERATORS OF THE SPECIFIED WORDS THAT ARE SELECTED BY THE ONE OR MORE COMBINATIONAL LOGIC CIRCUIT ELEMENTS
815

STORE THE ONE OR MORE ADDITIONAL WORDS IN ONE OR MORE AVAILABLE DATA STORAGE CIRCUIT ELEMENTS OF THE PLURALITY OF DATA STORAGE CIRCUIT ELEMENTS, WHEREIN THE ONE OR MORE ADDITIONAL WORDS ARE CONFIGURED TO BE USED FOR HASHING THE MESSAGE
820

FIG. 8A

STORE A PLURALITY OF WORDS IN A PLURALITY OF DATA STORAGE CIRCUIT ELEMENTS, WHEREIN THE PLURALITY OF WORDS ARE TO BE USED FOR HASHING A MESSAGE, WHEREIN A DATA STORAGE CIRCUIT ELEMENT OF THE PLURALITY OF DATA STORAGE CIRCUIT ELEMENTS IS CONFIGURED TO STORE A WORD OF THE PLURALITY OF WORDS DURING HASHING OF THE MESSAGE WITHOUT MOVING THE WORD TO ANY OTHER DATA STORAGE CIRCUIT ELEMENT OF THE PLURALITY OF DATA STORAGE CIRCUIT ELEMENTS
805

DO SPECIFIED DATA STORAGE CIRCUIT ELEMENTS OF THE PLURALITY OF DATA STORAGE CIRCUIT ELEMENTS STORE VALID WORD DATA?
855

NO → CHECK OTHER SPECIFIED DATA STORAGE CIRCUIT ELEMENTS
860

YES

SELECT, USING ONE OR MORE COMBINATIONAL LOGIC CIRCUIT ELEMENTS, THE SPECIFIED DATA STORAGE CIRCUIT ELEMENTS OF THE PLURALITY OF DATA STORAGE CIRCUIT ELEMENTS
865

GENERATE ONE OR MORE ADDITIONAL WORDS BASED ON INPUT INTO ONE OR MORE COMPUTATIONAL OPERATORS OF THE SPECIFIED WORDS THAT ARE SELECTED BY THE ONE OR MORE COMBINATIONAL LOGIC CIRCUIT ELEMENTS
815

STORE THE ONE OR MORE ADDITIONAL WORDS IN ONE OR MORE AVAILABLE DATA STORAGE CIRCUIT ELEMENTS OF THE PLURALITY OF DATA STORAGE CIRCUIT ELEMENTS, WHEREIN THE ONE OR MORE ADDITIONAL WORDS ARE CONFIGURED TO BE USED FOR HASHING THE MESSAGE
820

OUTPUT A SET OF OUTPUT WORDS, WHEREIN THE SET OF OUTPUT WORDS INCLUDES OR IS BASED ON AT LEAST ONE OF THE ONE OR MORE ADDITIONAL WORDS
870

FIG. 8B

1100
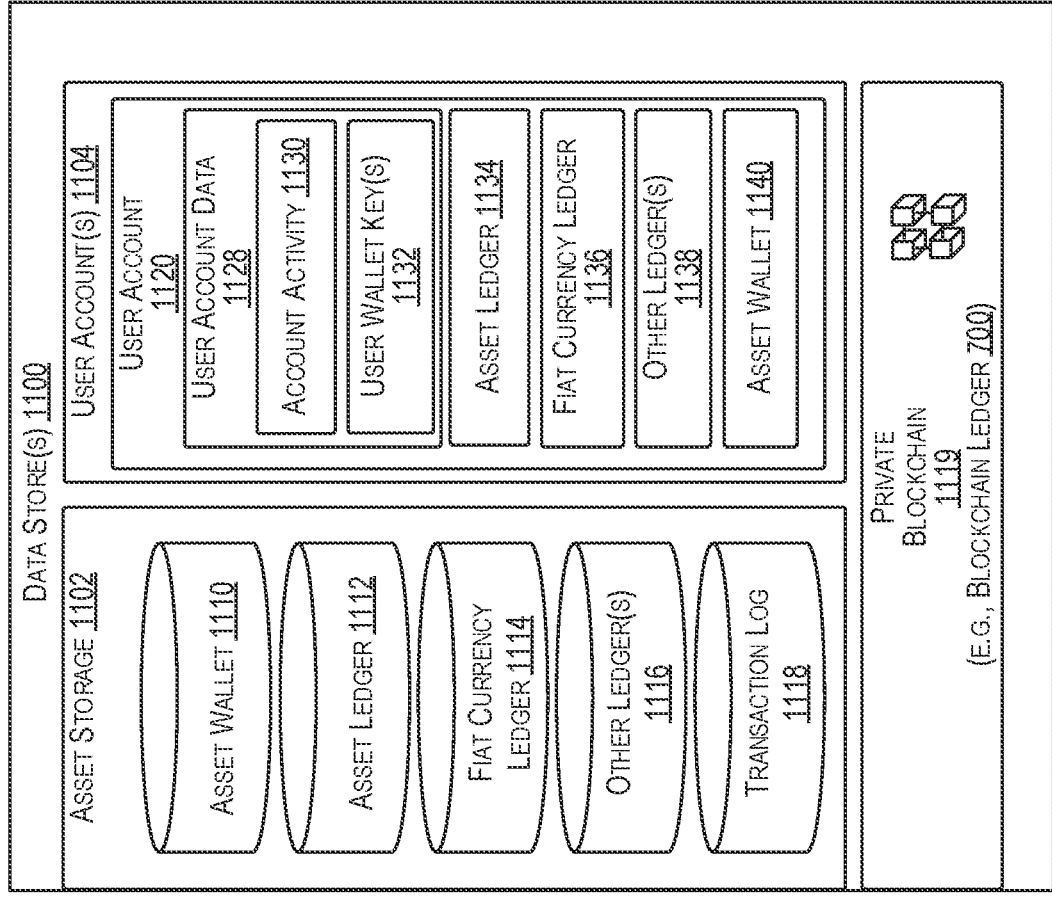
DATA STORE(S) 1100
USER ACCOUNT(S) 1104
USER ACCOUNT 1120
USER ACCOUNT DATA 1128
ACCOUNT ACTIVITY 1130
USER WALLET KEY(S) 1132
ASSET LEDGER 1134
FIAT CURRENCY LEDGER 1136
OTHER LEDGER(S) 1138
ASSET WALLET 1140
PRIVATE BLOCKCHAIN 1119
(E.G., BLOCKCHAIN LEDGER 700)
ASSET STORAGE 1102
ASSET WALLET 1110
ASSET LEDGER 1112
FIAT CURRENCY LEDGER 1114
OTHER LEDGER(S) 1116
TRANSACTION LOG 1118
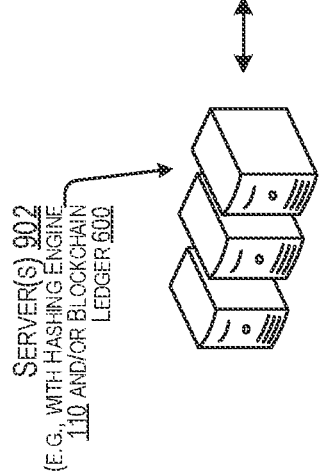
SERVER(S) 902
(E.G., WITH HASHING ENGINE 110 AND/OR BLOCKCHAIN LEDGER 600)
FIG. 11

COMPUTING ARCHITECTURE FOR ENERGY-EFFICIENT HASH COMPUTATION

TECHNICAL FIELD

A secure hash algorithm (SHA) is a cryptographic algorithm used to encode a message into an encrypted output, referred to as a hash or a hash digest. Generally, the input message to a SHA can have an arbitrary length, but the output hash has a consistent length regardless of the length of the input message. For example, the output hash of SHA-256 has a length of 256 bits, and 32 bit word length. Various processes used for distributed ledgers, such as mining and validation, involve use of SHA operations.

Use of distributed ledger technologies, such as cryptocurrency mining, is often attributed with high levels of power consumption. Hash operations using SHA account for a significant portion of the power consumption for distributed ledger technologies.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. Moreover, multiple instances of the same part are designated by a common prefix, in some cases separated from the instance number by a dash and/or parentheses. The drawings are not to scale.

FIG. 6 is a conceptual diagram illustrating power savings resulting from use of at-memory computing (AMC) in a hashing engine, in accordance with some examples;

FIG. 8A is a flow diagram illustrating a hashing process, in accordance with some examples;

FIG. 8B is a flow diagram illustrating a hashing process, in accordance with some examples;

FIG. 11 is a block diagram illustrating a ledger system, in accordance with some examples;

DETAILED DESCRIPTION

Figure 1:
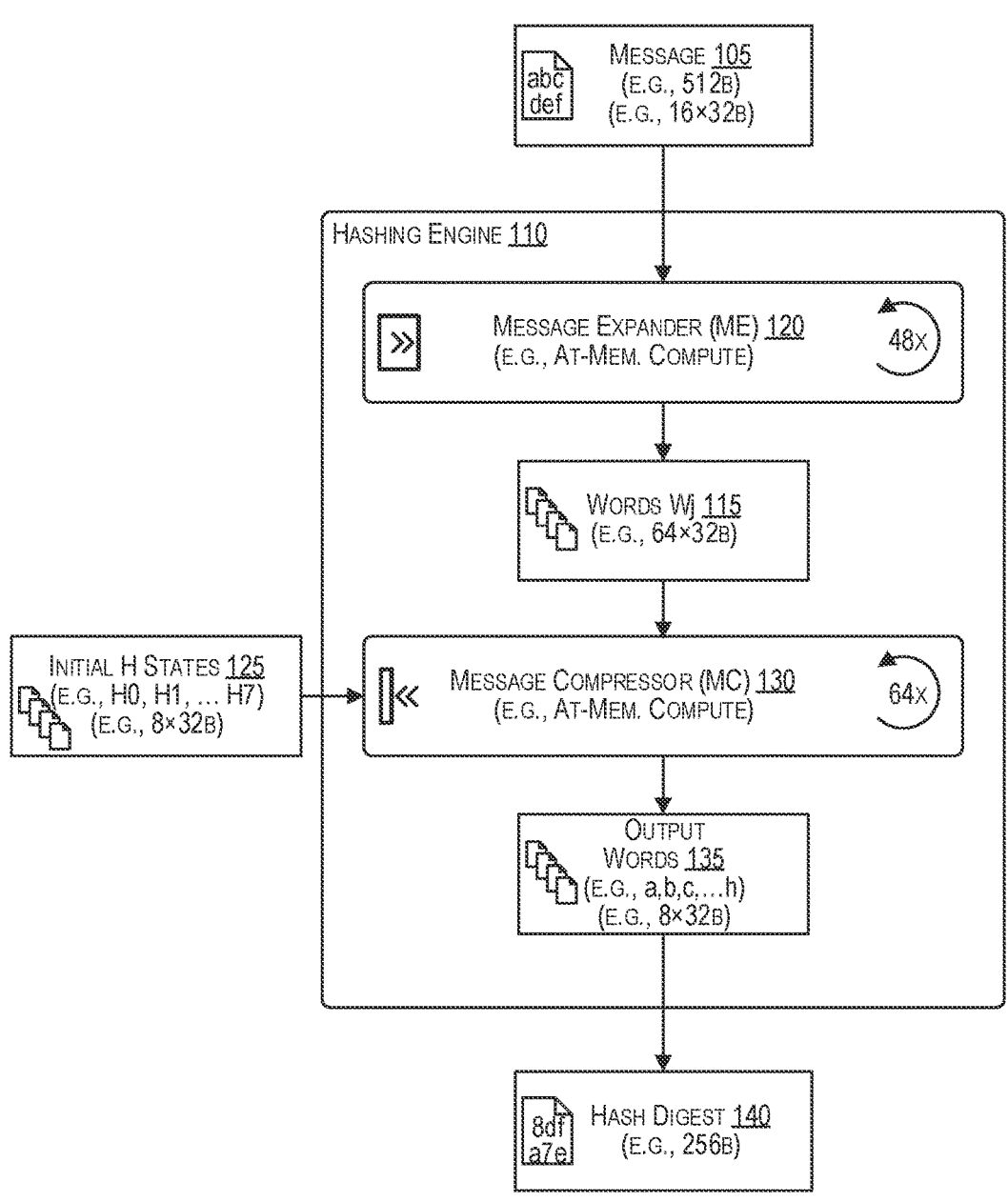
FIG. 1 is a block diagram illustrating an architecture of a hashing engine, in accordance with some examples.

Techniques and systems for hashing are described herein. The techniques and systems for hashing are described herein include at-memory computing (AMC) architectures for hashing systems, such as for message expander (ME) and/or message compressor (MC) systems. In one implementation, the techniques and systems disclosed herein support an architecture for more accessible, distributed, decentralized, and efficient mining for digital assets, such as Bitcoin.

Systems described herein implement energy-efficient and time-efficient techniques to process SHA (secure hash algorithm) hashing algorithms to generate hash digests. SHA includes several hash functions. For instance, SHA-2 is a set of secure hash functions including SHA-224, SHA-256, SHA-384, and SHA-512 that provide a higher level of security than the SHA-1 algorithm. SHA-224 and SHA-256 are similar algorithms based on a 32-bit word length producing hash digests of 224 and 256 bits, respectively. SHA-384 and SHA-512 are based on a 64-bit word length and produce digests of 384 and 512 bits, respectively. The SHA-2 algorithm is computationally more complex the SHA 1, relying on carry propagate additions as well as logical operations and rotates. In some examples, a round of SHA-2 operations can consist of four consecutive propagate additions with adder inputs being determined by complex logical and rotation functions.

Systems and methods described herein describe a hashing system, such as a SHA-256 system, that includes at least a message expander (ME) and/or a message compressor (MC). As an example, during the SHA-256 operation, the ME expands the 512-bit input message into 64 chunks of 32-bit data. The MC compresses these 64 32-bit data chunks into a 256-bit hashed output. This process is generally extremely energy and time consuming. In some examples, the hashing system includes data storage circuit elements (e.g., memory cells) that store words to be used for hashing a message. Each data storage circuit element stores a word without moving the word to any other data storage circuit element during hashing. The hashing system includes combinational logic circuit elements (e.g., one or more multiplexers, demultiplexers, transistors, controllers, and/or processors) that select specified data storage circuit elements of the data storage circuit elements, for instance based on which data storage circuit elements include valid word data and/or based on an order in which the words were stored in the data storage circuit elements. In some examples, the combinational logic circuit elements are configured to select the specified data storage circuit elements according to a specified order that can simulate shifting of at least a subset of the words among the data storage circuit elements, without actually shifting the words among the data storage circuit elements. The hashing system includes computational operators (e.g., adders and various logic gates and/or operators described herein) that generate one or more additional words based on the selected specified words. The hashing system stores the one or more additional words into one or more available data storage circuit elements of the data storage circuit elements. In some examples, to store the one or more additional words into one or more available data storage circuit elements, the hashing system overwrites prior word data that was stored in the one or more available data storage circuit elements.

The systems and methods for hashing described herein provide various improvements over traditional hashing techniques. For instance, traditional hashing techniques can use high levels of power consumption, and the systems and methods for hashing described herein can significantly reduce power consumption used for hashing compared to traditional hashing techniques as discussed further herein. This allows devices with limited power reserves (e.g., limited battery capacity), such as mobile handsets, head-mounted display (HMD) devices, laptops, wearable devices, and other portable devices to use hashing techniques and all of the various technologies that hashing is used for, such as distributed ledger technologies, cryptography, network security, encryption, fraud detection, error detection, validating the authenticity of data, validating the integrity of data, mapping data, or combinations thereof.

The systems and methods for hashing described herein can be used to perform hashing for distributed ledger technologies, such as blockchain technologies, digital asset technologies, cryptocurrency technologies, mining, and the like. Use of distributed ledger technologies can often result in high levels of power consumption, to the extent there is some concern about potential climate impacts of the expanded use of distributed ledger technologies. Hash operations account for a significant portion of the power consumption for traditionally distributed ledger technologies. Use of the systems and methods for hashing described herein with distributed ledger technologies (such as those also described herein) can significantly reduce power consumption used for distributed ledger technologies compared to traditional distributed ledger technologies as discussed further herein, allowing democratization of initiatives such as bitcoin mining. This allows devices with limited power reserves (e.g., limited battery capacity), such as mobile handsets, head-mounted display (HMD) devices, laptops, wearable devices, and other portable devices to use distributed ledger technologies and all of the various technologies that distributed ledger technologies are used for, such as cryptocurrency mining, cryptocurrency transactions, smart contract generation, smart contract execution, smart contract validations, generation of tokens (e.g., non-fungible tokens (NFTs)), transfer of tokens, or combinations thereof.

Traditional hashing techniques involve numerous shifting and/or rotation operations that move content from one register to another register in a set of registers. These operations traditionally are performed numerous times for each hash without any logical step to whether it is even needed, and amount to a significant portion of the total power consumption of hashing operations under both the ME and the MC. In stark contrast to that, the systems and methods for hashing described herein logically handle the data for movement or storage based on predefined rules. In one implementation, the systems and methods for hashing described herein reduce or eliminate movement of content from one data storage circuit element to another, instead using combinational logic circuit elements (e.g., one or more multiplexers, demultiplexers, transistors, controllers, and/or processors) to dynamically, and in some instances in real time or near real time, select which of a set of data storage circuit elements stores the content to be used for generating new words during the hashing process in an order that can simulate the movement (e.g., shifting and/or rotation) of content between data storage circuit elements. In this way, rather than changing what content is stored in the data storage circuit elements, the systems and methods for hashing described herein effectively change references to the data storage circuit elements and/or to the content stored in the data storage circuit elements, greatly reducing the power consumption of hashing operations.

Traditional hashing techniques involve use of shift registers, flip flops (FFs), and/or dynamic flip flips (DFFs) as data storage circuit elements to store word data for hashing, and then use of a clock tree that provides cycle timing data to each of these data storage circuit elements. Providing clock data to each of these data storage circuit elements amounts to a significant portion of the power consumption of hashing under traditional hashing techniques. The systems and methods for hashing described herein can also reduce or eliminate need for such a clock tree. For instance, the systems and methods for hashing described herein can allow content to be maintained in individual data storage circuit elements for extended periods of time (e.g., 64 cycles, 32 cycles, 16 cycles, 8 cycles, or 4 cycles) compared to traditional hashing techniques (e.g., 1 cycle), reducing or eliminating the need for precise timing with respect to data storage circuit elements while maintaining accuracy.

The systems and methods for hashing described herein can also use memory cells, such as random access memory (RAM), static RAM (SRAM), dynamic RAM (DRAM), or a combination thereof, as data storage circuit elements to store word data for hashing, rather than shift registers, FFs, or DFFs. Memory cells include fewer transistors than shift registers, FFs, or DFFs. Thus, use of memory cells instead of shift registers, FFs, or DFFs uses less power, uses less physical space, increases data storage density, and/or provides for improved structure and increased capacity for customization.

In some examples, the systems and methods described herein identify hashes that can produce a valid block and/or hashes that are unable to produce a valid block in a specific hashing algorithm. In this way, the algorithm can be processed in a manner that saves energy. In some examples, the hashing algorithm may include specific steps that may not need to be computed.

Various aspects of the application will be described with respect to the figures. FIG. 1 is a block diagram illustrating an architecture of a hashing engine 110, according to some examples of the present subject matter. In some examples, the hashing engine 110 receives a message 105 and outputs a hash digest 140. The hashing engine 110 includes a message expander (ME) 120 and a message compressor (MC) 130. The ME 120 can also be referred to as a message scheduler. The MC 130 can also be referred to as a message digest.

The message 105 can be of any size. In the example illustrated in FIG. 1 the message 105 is 512 bits. In some examples, messages smaller than a threshold size (e.g., 512 bits) can be expanded with padding bits to the threshold size before being input to the hashing engine 110. The message 105 of FIG. 1, which is 512 bits, breaks down into 16 32-bit message blocks that are input into the ME 120 of the hashing engine 110.

The ME 120 of the hashing engine 110 receives the message 105 (e.g., receives the 16 32-bit message blocks of the message 105) and processes them to generate words Wj 115. In some examples, the ME 120 generates 64 words Wj 115. In some examples, each of the words Wj 115 is 32 bits in size. In some examples, the ME 120 generates the words Wj 115 using a number of bit-shift and/or bit rotation operations as illustrated in and discussed with respect to the ME 200 of FIG. 2. In some examples, the ME 120 generates the words Wj 115 without such bit-shift and/or bit rotation operations, for instance by changing references to content rather than moving the content itself, as illustrated in and discussed with respect to the ME 400A of FIG. 4A and/or the ME 400B of FIG. 4B that use at-memory computing (AMC) techniques. In some cases, the words Wj 115 can be referred to as the message schedule.

The words Wj 115 are input into the MC 130. In some examples, the MC 130 also receives initial H states 125 for data storage circuit elements (e.g., registers 310 and/or data storage circuit elements 510) of the MC 130. The initial H states 125 can be referred to as the initial hash values $H_r^0$, for registers r (e.g., register a through register h). The MC 130 processes the words Wj 115 and/or the initial H states 125 to generate output words 135, denoted as a, b, c, d, e, f, and h. In some examples, the MC 130 generates 8 output words 135. In some examples, each of the output words 135 is 32 bits in size. In some examples, the MC 130 generates the output words 135 using a number of bit-shift and/or bit rotation operations as illustrated in and discussed with respect to the MC 300 of FIG. 3. In some examples, the MC 130 generates the output words 135 without such bit-shift and/or bit rotation operations, for instance by changing references to content rather than moving the content itself, as illustrated in and discussed with respect to the MC 500A of FIG. 5A and/or the MC 500B of FIG. 5B that use at-memory computing (AMC) techniques. For example, such referencing can be performed by creating data pointers to a specific content.

The hashing engine 110 ultimately combines the output words 135 to form the hash digest 140. In some examples, hash digest 140 is 256 bits in size, for example where the hashing engine 110 uses SHA-256. For example, the hashing engine 110 can combine the output words 135 by concatenating the output words 135 together. An icon representing the message 105 in FIG. 1 illustrates a human-comprehensible string reading "abcdef." An icon representing the hash digest 140 in FIG. 1 illustrates a hash reading "8dfa7e" corresponding to the human-comprehensible string reading "abcdef" representing the message 105.

Figure 2:
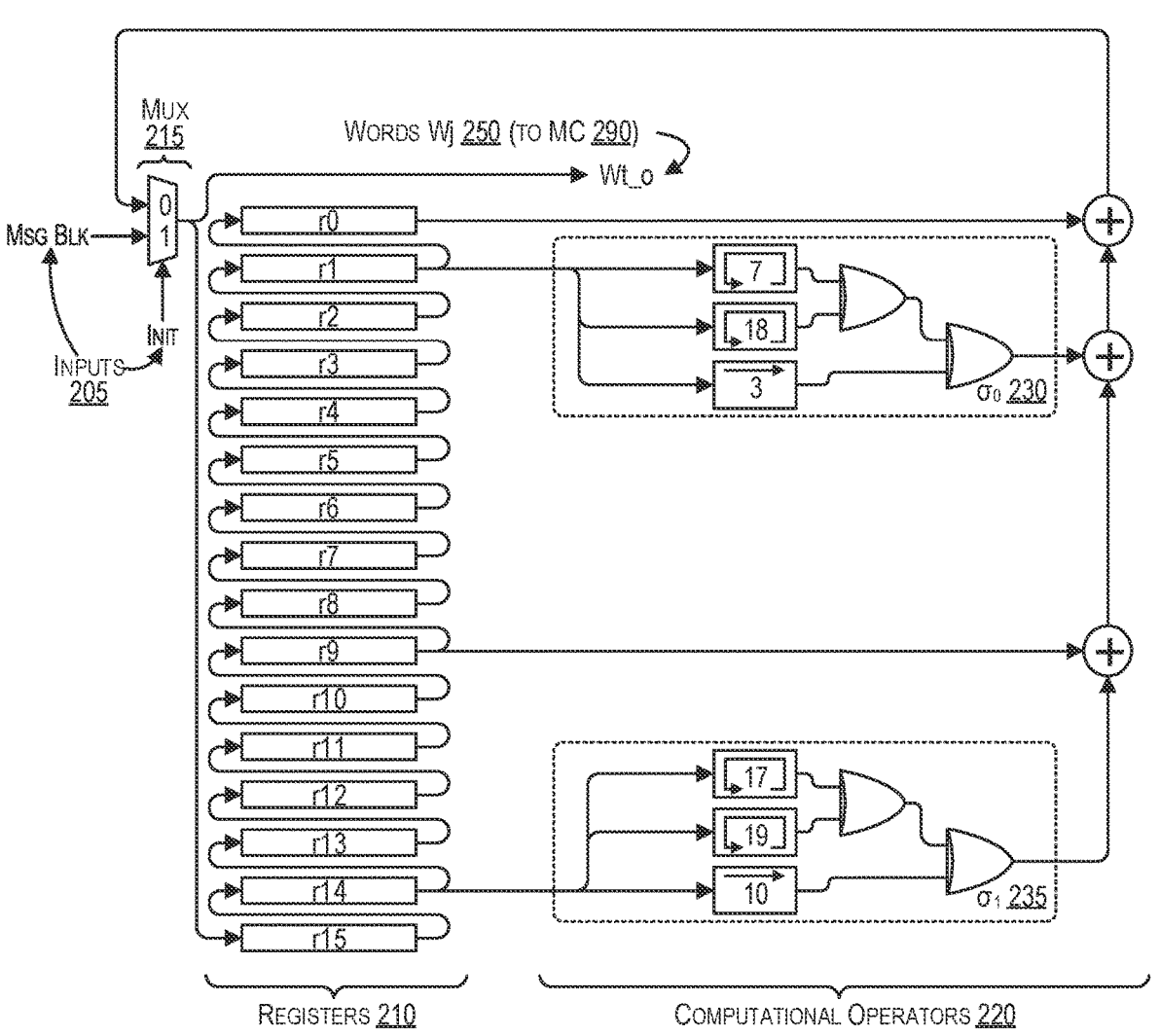
FIG. 2 is a block diagram illustrating an architecture of a message expander (ME), in accordance with some examples.

The bit sizes illustrated in FIG. 1 represent bit sized to be used under SHA-256. It should be understood that other secure hashing algorithms (SHA), or other hashing algorithms (or message digest algorithms) more generally, can be performed by the hashing engine. It should be understood that different bit sizes for the hash digest 140, the output words 135, the words Wj 115, the initial H states 125, and/or the message 105 may be used under different hashing algorithms (or message digest algorithms) than SHA-256. For instance, under SHA-512, the hash digest 140 may be 512 bits in size, and the words are 64 bits in size. Under SHA-224, the hash digest 140 may be 224 bits in size. Under SHA-384, the hash digest 140 may be 384 bits in size. Under SHA-0 or SHA-1, the hash digest 140 may be 160 bits in size. Under MD2, MD4, and MD5 message digest (hashing) algorithms, the hash digest 140 may be 128 bits in size. Under SHAKE128 or SHAKE256, the hash digest 140 may be an arbitrary size FIG. 2 is a block diagram illustrating an architecture of a message expander (ME) 200. The ME 200 receives two inputs 205, including a message block and an initialization value init. Each message block may include at least a portion of a message, such as the message 105. In some examples, the registers 210 of the ME 200 include one or more flip flops (FFs) or dynamic flip flips (DFFs).

The ME 200 includes 16 registers 210, denoted as register 0 (r0) through register 15 (r15). In some examples, the width of each of the registers 210 is 32 bits. In some examples, the ME 200 outputs 32 words Wj (e.g., the words Wj 115 of FIG. 1). For every word Wj produced by the ME 200, the registers 210 (r0 through r15) are clocked at least once, and all content in the registers 210 (r0 through r15) is shifted at least once. For instance, the content in register r15 is shifted to register r14, the content in register r14 is shifted to register r13, the content in register r13 is shifted to register r12, and so forth, ultimately with the content in register r1 being shifted to register r0. Much of the content is shifted without any changes. Nonetheless, these shifts of content from one register to another amount to a significant portion of the power consumption of the ME 200.

The content of four of the registers 210 (register r0, register r1, register r9, and register r14) are fed into computational operators 220, including a $\sigma_0$ operator 230, a $\sigma_1$ operator 235, and several adder operators. The $\sigma_0$ operator 230 and the $\sigma_1$ operator 235 each include two exclusive or (XOR) logic gates, a shift register, and two circular shift registers (also referred to as rotators, rotation operators, rotr operators, rotl operators, ror operators, rol operators, and/or circular shift operators). Each shift register or circular shift register are marked with the number of shifts and/or rotations to be performed by the shift register or circular shift register (e.g., 7 rotations, 18 rotations, 3 shifts, 17 rotations, 19 rotations, and 10 shifts, from top to bottom in FIG. 2). The result(s) of these computational operators 220 can be input into register r15 and/or output as one of the words Wj 250 (denoted Wt_o), in some examples passing through multiplexer 215. Multiplexer 215 can act as an initialization switch. In some examples, the multiplexer 215 can start (e.g., as controlled by init) at a first value (e.g., select-1) to fill up the 16 registers (r0 through r15) with the message block (e.g., 16×32 bits), then the multiplexer 215 can shift (e.g., as controlled by init) to a second value (e.g., select-0) to allow value(s) generated using the computational operators 220 into register r15 and/or output words Wj 250. In some examples, the multiplexer 215 can remain at the second value (e.g., select-0) for the remainder of the hash. The words Wj 250, and/or the specific word Wt_o, can be examples of the words Wj 115. The words Wj 250, and/or the specific word Wt_o, can be output to a message compressor (MC) 290. Examples of the MC 290 include the MC 130, the MC 300, the MC 500A, and the MC 500B.

Figure 3:
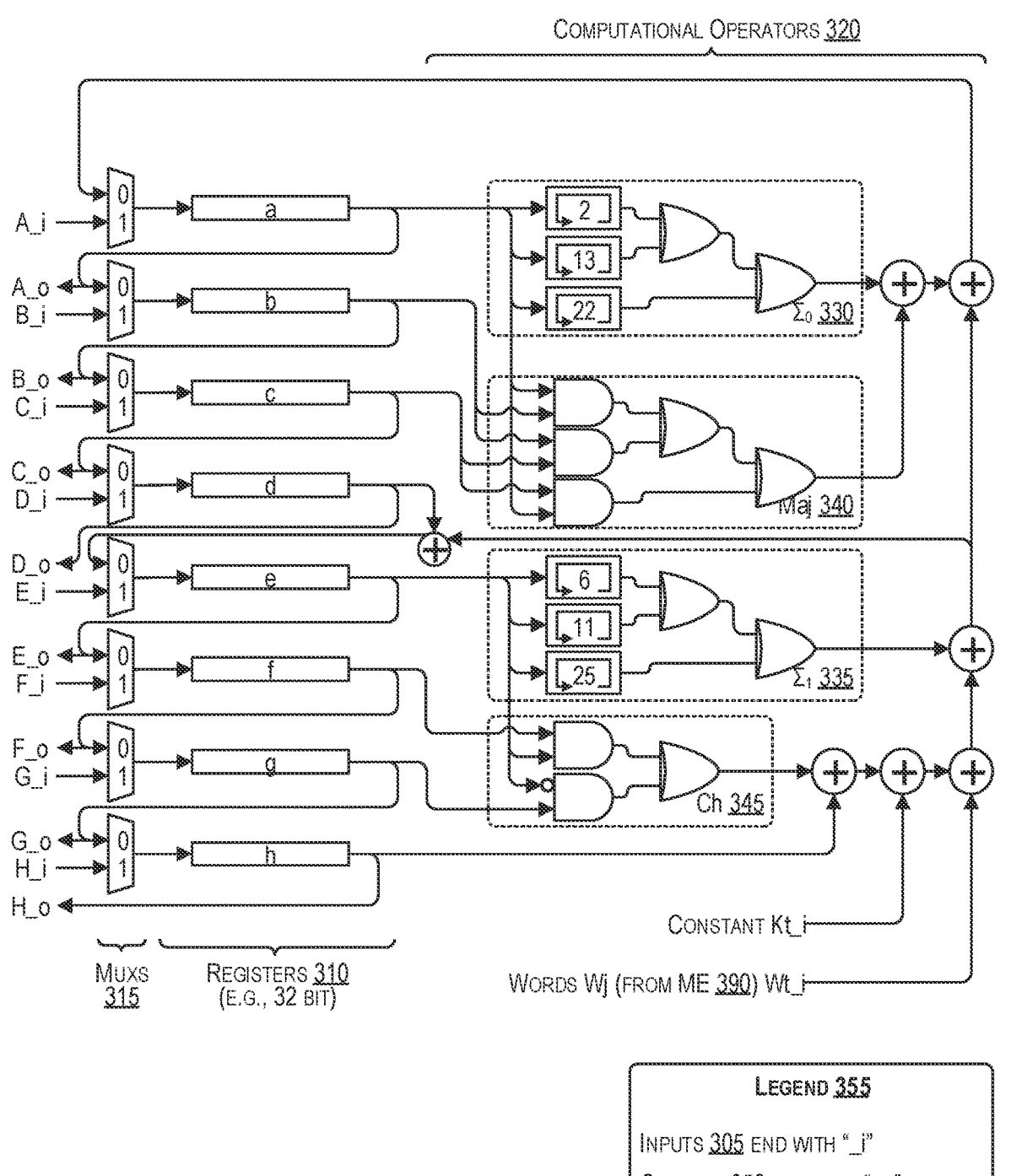
FIG. 3 is a block diagram illustrating an architecture of a message compressor (MC), in accordance with some examples.

FIG. 3 is a block diagram illustrating an architecture of a message compressor (MC) 300. The MC 300 includes 8 registers 310, denoted as register a through register h. In some examples, the width of each of the registers 310 is 32 bits. A legend 355 identifies inputs 305 and outputs 350 of the MC 300. The MC 300 receives multiple inputs 305, including a constant Kt_i, words Wj (denoted Wt_i), and initial states for the 8 registers 310 (denoted A_i, B_i, C_i, D_i, E_i, F_i, G_i, and H_i). The initial states for the 8 registers 310 are examples of the initial H states 125 of FIG. 1. Examples of the words Wj (denoted Wt_i in FIG. 3) include the words Wj 115, the words Wj 250, the word Wt_o of FIG. 2, or a combination thereof. The words Wj (denoted Wt_i in FIG. 3) are received from an ME 390. Examples of the ME 390 include the ME 120, the ME 200, the ME 400A, and the ME 400B. In some examples, the registers 310 of the MC 300 include one or more flip flops (FFs) or dynamic flip flips (DFFs).

The outputs 350 of the MC 300 include output words (e.g., the output words 135). For examples, the outputs 350 include the outputs of the registers 310 (register a through register h), denoted as A_o, B_o, C_o, D_o, E_o, F_o, G_o, and H_o. The MC 300 can undergo multiple compression cycles to generate the outputs 350. During each compression cycle, the content in the registers 310 is shifted. For instance, the content in register a is shifted to register b, the content in register b is shifted to register c, the content in register c is shifted to register d, the content in register e is shifted to register f, the content in register f is shifted to register g, and the content in register g is shifted to register h. In some examples, the content shifted into registers b, c, d, f, g, and h are shifted without any changes. Thus, 75% of the content is shifted, amounting to a significant portion of the power consumption of the MC 300.

Content from the registers 310 (each of the registers a, b, c, d, e, f, g, and h) is also input into computational operators 320, including a $\Sigma_0$ operator 330, a $\Sigma_1$ operator 335, a majority (Maj) operator 340, a choice (ch) operator 345, and several adder operators. The $\Sigma_0$ operator 330 and the $\Sigma_1$ operator 335 each include two exclusive or (XOR) logic gates and three circular shift registers (also referred to as rotators, rotation operators, rotr operators, rotl operators, ror operators, rol operators, and/or circular shift operators). Each shift register or circular shift register are marked with the number of shifts and/or rotations to be performed by the shift register or circular shift register (e.g., 2 rotations, 13 rotations, 22 rotations, 6 rotations, 11 rotations, and 25 rotations, from top to bottom in FIG. 3). The majority (Maj) operator 340 includes two XOR logic gates and three AND logic gates. The choice (ch) operator 345 includes one XOR logic gate and two AND logic gates. The result(s) of these computational operators 320 can be input into register a and/or register e, as controlled using the multiplexers 315 for register a and register e, respectively. The outputs 350 can include the outputs of the registers 310, denoted as A_o, B_o, C_o, D_o, E_o, F_o, G_o, and H_o, and can be output words (e.g., the output words 135).

As noted above the ME 200 and MC 300 expend a significant portion of their power consumption on shifting and/or rotating content between registers (e.g., registers 210 and/or registers 310). In fact, in some examples, a majority of the power consumption of the ME 200 and the MC 300 is used for shifting and/or rotating content between registers (e.g., registers 210 and/or registers 310). According to some examples, addition operations such as those used in hashing functions (e.g., in the computational operators 220 and/or the computational operators 320) use a small amount of energy, in a range of from approximately less than 1 picojoule (pJ) of energy to approximately 4 pJ of energy. Data access for registers such as the registers 210 and/or the registers 310 can use a comparatively large amount of energy, in a range of a few tens of picojoules. Shifting and/or rotation of content between registers, as illustrated in the ME 200 and the MC 300, can also use a comparatively large amount of energy, in a range of a few tens of picojoules. In some examples, shifting and/or rotation of content between registers uses even more energy than data access, sometimes significantly more. Thus, reducing shifting and/or rotation of content between registers, and/or need to access new registers, can provide a significant technical improvement by providing a significant reduction in power consumption.

Figure 4A:
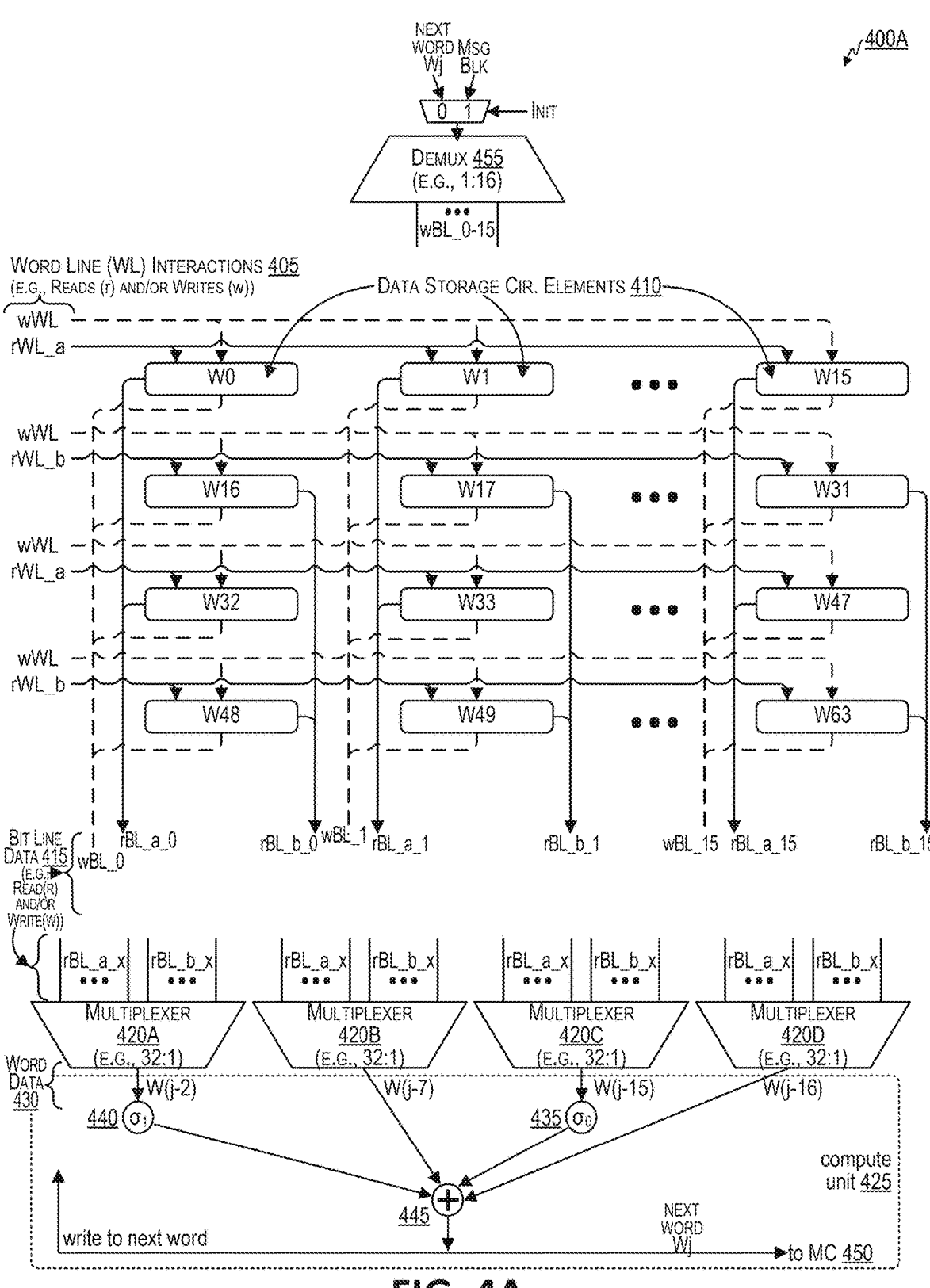
FIG. 4A is a block diagram illustrating an at-memory computing (AMC) architecture for a message expander (ME), in accordance with some examples.

FIG. 4A is a block diagram illustrating an at-memory computing (AMC) architecture for a message expander (ME) 400A. In the context of the ME 400A, AMC refers to a memory architecture with data storage circuit elements 410 that is optimized for certain computation operations, and in some examples is able to perform certain computation operations (e.g., message expansion, selecting specific words and/or data storage circuit elements, generating additional words, or a combination thereof) using combinatorial logic circuit elements (e.g., multiplexers 420A-420D and/or demultiplexer 455) and/or computational operators (e.g., the compute unit 425 and/or components thereof) that are located in and/or adjacent to the memory. The ME 400A uses an array of data storage circuit elements 410. The exemplary ME 400A illustrated in FIG. 4A includes an array of 64 data storage circuit elements 410, numbered from word 0 (W0) to word 63 (W63). In the exemplary ME 400A illustrated in FIG. 4A, the array of 64 data storage circuit elements 410 is arranged in 4 word lines or rows, each word line having 16 data storage circuit elements. In some examples, the array may include a different arrangement, for example with more or fewer than 4 word lines, and more or fewer than 16 data storage circuit elements 410 per word line.

In some examples, the data storage circuit elements 410 may include dynamic flip flops (DFFs) or shift registers, similarly to the registers 210. In some examples, the data storage circuit elements 410 may include memory, such as random access memory (RAM), static random access memory (SRAM), dynamic random access memory (DRAM), or a combination thereof. Generally, memory uses less power than DFFs or registers, and includes fewer transistors. For instance, a DFF includes 22 transistors, while an equivalent DRAM cell uses only 3 transistors, and an equivalent SRAM cell uses 10 transistors. This reduction in amount of transistors translates to a similar reduction in power consumption by memory cells (e.g., RAM, SRAM, and/or DRAM cells) as compared to DFFs. This reduction in amount of transistors also translates to a similar reduction in size of memory cells (e.g., RAM, SRAM, and/or DRAM cells) as compared to DFFs, making memory cells useful for dense memory storage in small (e.g., portable) devices. Memory cells are generally more compact and/or structural than DFFs as well, and can provide for easier customization. Thus, use of RAM, SRAM, and/or DRAM cells rather than FFs, DFFs, or shift registers, can provide a significant reduction in power consumption, increased structure, and an increased capacity for customization. In some examples, the array of data storage circuit elements 410 may be referred to as a memory array.

In some examples, the registers 210 of the ME 200 may use DFFs, and the ME 200 may use a clock tree that connects to the DFFs and synchronizes timing to the clock across DFFs. In such examples, the power consumption of the clock tree can account for a significant portion (e.g., approximately 30%-45%) of the power consumption of the ME 200. The AMC architecture of the ME 400A is structured to not require a clock tree to the data storage circuit elements 410, thus removing this significant source of power consumption from the ME 400A.

The AMC architecture of the ME 400A is structured to provide functionality that provides a number of technical improvements. For example, rather than shifting or rotating content every clock cycle in an energy-intensive manner (e.g., as in the ME 200), the AMC architecture of the ME 400A maintains the content in the data storage circuit elements 410 that the content is stored in. The AMC architecture of the ME 400A can change references to the content (e.g., via multiplexers 420A-420D) rather than actually physically moving the content between data storage circuit elements 410.

The array of data storage circuit elements 410 is used by the ME 400A in place of the 16 registers 210 (r0 through r15). Each of the data storage circuit elements 410 in the array stores one word (e.g., a 32-bit word), which is why the data storage circuit elements 410 are numbered from word 0 (W0) to word 63 (W63). The array of data storage circuit elements 410 in the ME 400A includes word lines (WLs) of data storage circuit elements 410 that are activated alternatively to one another. The WLs are oriented horizontally in FIG. 4A. The word lines are denoted in FIG. 4A using the letters "a" and "b." For instance, a word line a can be denoted as "WL_a," while a word line b can be denoted as "WL_b." The first WL_a includes data storage circuit elements W0 through W15, the first WL_b includes data storage circuit elements W16 through W31, the second WL_a includes data storage circuit elements W32 through W47, and the second WL_b includes data storage circuit elements W48 through W63.

Word line (WL) interactions 405 are illustrated using lines to the various data storage circuit elements 410. The WL interactions 405 include read operations (denoted "r") and write operations (denoted "w"). Thus, the WL interactions 405 for reading from WL_a are denoted as rWL_a, and the WL interactions 405 for reading from WL_b are denoted as rWL_b. The WL interactions 405 for writing to either WL_a or WL_b are denoted as wWL in FIG. 4A.

As indicated above, the ME 400A uses alternating word line activations (e.g., alternating between WL_a and WL_b). Once the data storage circuit elements 410 of the first WL_a (W0 through W15) are filled with content (e.g., the message blocks from the message 105, as in the initial content of registers 210), that content remains in the data storage circuit elements 410 of the first WL_a (W0 through W15) without moving or changing for at least a portion of the duration of the message expansion process (e.g., at least 64 clock cycles). Because the ME 400A maintains the content in the data storage circuit elements 410 unchanged for at least a portion of the duration of the message expansion process (e.g., at least 64 clock cycles) once the ME 400A stores this content in the data storage circuit elements 410, the data storage circuit elements 410 do not need to be activated and deactivated repeatedly throughout the message expansion process. Reducing such activations and deactivations reduces unnecessary charges and discharges, and therefore reduces unnecessary power consumption by the ME 400A, as illustrated and discussed with respect to FIG. 6.

The content that is stored in the data storage circuit elements 410 is input and/or output using bit lines (BLs), which are oriented vertically in FIG. 4A. Content being written into data storage circuit elements 410 is denoted with a "w" along with the column in the array of the data storage circuit elements 410. For example, content being written into the first column in the array is written along bit line wBL_0, content being written into the second column in the array is written along bit line wBL_1, content being written into the third column in the array is written along bit line wBL_2, and so forth.

Content being read from data storage circuit elements 410 is denoted with a "r" along with the column in the array of the data storage circuit elements 410. For example, content being read from the first column in the array from a WL_a is read along bit line rBL_a_0, content being read from the second column in the array from a WL_a is read along bit line rBL_a_1, content being read from the third column in the array from a WL_a is read along bit line rBL_a_2, and so forth. Similarly, content being read from the first column in the array from a WL_b is read along bit line rBL_b_0, content being read from the second column in the array from a WL_b is read along bit line wBL_b_1, content being read from the third column in the array from a WL_b is read along bit line wBL_b_2, and so forth. The content that is stored in the data storage circuit elements 410, that is input using the BLs, and/or that is output using the BLs can be referred to as word data 415. Because the content in the data storage circuit elements 410 does not move or change once input for the duration of the ME process (e.g., 16 cycles), in some examples, each of the BLs can be activated once for each data storage circuit elements 410 for the duration of the ME process (e.g., 16 cycles). In some examples, because the ME 400A maintains the content in the data storage circuit elements 410 unchanged for at least a portion of the duration of the message expansion process (e.g., at least 16 clock cycles) once the ME 400A stores this content in the data storage circuit elements 410, the BLs are mostly static during at least this portion of the duration of the message expansion process (e.g., at least 16 clock cycles), in some cases including zero, one, or a small number of activations. For clarity, word lines and bit lines corresponding to reading content from the data storage circuit elements 410 are illustrated as solid lines in FIGS. 4A-4B, while word lines and bit lines corresponding to writing content to the data storage circuit elements 410 are illustrated as dashed lines in FIGS. 4A-4B. Therefore, removal of the dashed lines corresponding to writing content to the data storage circuit elements 410 would represent a read-only implementation of the ME 400A.

The ME 200 of FIG. 2 is configured to use content from four of its registers 210 (r0, r1, r9, and r14) to perform combinational operations using its computational operators 220. Similarly, the ME 400A of FIG. 4A is configured to use content from four of its data storage circuit elements 410 to perform combinational operations using its compute unit 425. The word data 415 (specifically, the word data read from the data storage circuit elements 410 using the BLs) is input into combinatorial logic circuit elements (e.g., multiplexers 420A-420D), which select the appropriate word data 430 from the word data 415 to perform combinational operations using the compute unit 425 of the ME 400A. The multiplexers 420A-420D can also ensure that the word data 415 is taken from the correct data storage circuit elements 410. In some examples, one or more clock signals (not shown) may synchronize inputs and outputs of the combinatorial logic circuit elements (e.g., multiplexers 420A-420D) and/or inputs and outputs of the data storage elements 410.

Similarly to the computational operators 220, the compute unit 425 includes a $\sigma_0$ operator 435, a $\sigma_1$ operator 440, and several adder operators. The $\sigma_0$ operator 435 can be structured like the $\sigma_0$ operator 230. The $\sigma_1$ operator 440 can be structured like the $\sigma_1$ operator 235. The word data 430 selected by the multiplexer 420A is output to the $\sigma_0$ operator 435, similarly to register r2 in the ME 200. The word data 430 selected by the multiplexer 420C is output to the $\sigma_1$ operator 440, similarly to register r15 in the ME 200. The outputs of the $\sigma_0$ operator 435 and the $\sigma_1$ operator 440 are both input into an adder 445 (e.g., which may include more than one adder as in the various adders of the ME 200), along with the word data 430 that is selected by the multiplexer 420B and the word data 430 that is selected by the multiplexer 420D. The new word data that is generated by the compute unit 425 is written to the next available word in the array of data storage circuit elements 410, output to an MC 450, or both. The next available word in the array of data storage circuit elements 410 can be identified using a demultiplexer 455 (e.g. a 1:16 demultiplexer) for writing the new word data to the next available word in the array of data storage circuit elements 410. Examples of the MC 450 include the MC 130, the MC 300, the MC 500A, the MC 500B, or a combination thereof.

In each cycle of the ME process, the multiplexers 420A-420D choose four words (the word data 430) from the bit line data 415. In each cycle of the ME process, only 16 of the data storage circuit elements 410 are filled with valid word data at any given time. In the first sixteen cycles, words W0 through W15 are filled with content from the message (e.g., message 105) (e.g., via wBL_0 through wBL_15), so the selection proceeds similarly to the what is illustrated with respect to the ME 200 of FIG. 2. For example, in the seventeenth cycle, the multiplexers 420A-420D can choose the word data 430 in W0, W1, W9, and W1415 of the data storage circuit elements 410, which may correspond to registers r0, r1, r9, and r14 of the registers 210.

In the seventeenth cycle, new content generated by the compute unit 425 is added to word W16 (e.g., via wBL_0). Thus, W16 includes valid word data, and fifteen of the words from the top WL_a word line (e.g., W1-W15) include valid word data. One of the words from the top WL_a word line (e.g., W0) no longer includes valid word data. The valid word data is read as bit line data 415 and is input into the multiplexers 420A-420D, which reference the valid word data (e.g., bit line data 415) (e.g., in words W1-W16) of the data storage circuit elements 410 as if the data had shifted, without actually shifting any of the content between any of the data storage circuit elements 410.

In the eighteenth cycle, new content generated by the compute unit 425 is added to word W17 (e.g., via wBL_1). Thus, W16 and W17 include valid word data, and fourteen of the words from the top WL_a word line (e.g., W2-W15) include valid word data. Two of the words from the top WL_a word line (e.g., W0 and W1) no longer include valid word data. The valid word data is read as bit line data 415 and is input into the multiplexers 420A-420D, which reference the valid word data (e.g., bit line data 415) (e.g., in words W2-W17) of the data storage circuit elements 410 as if the data had shifted or rotated (e.g., as in the ME 200), without actually shifting or rotating or otherwise moving any of the content between any of the data storage circuit elements 410.

This process continues, with new content generated by the compute unit 425 being added by the ME 400A to a new word of the array of data storage circuit elements 410 during each new cycle. After the thirty-second cycle, all of the valid word data is on the second row (WL_b) of the array of data storage circuit elements 410 (e.g., W16 through W31), and the first row (WL_a) of the array of data storage circuit elements 410 (e.g., W0 through W15) no longer includes any valid word data. On the thirty-third cycle, the ME 400A moves onto the third row (WL_a), and the new content generated by the compute unit 425 is added to word W32 (e.g., via wBL_0). Eventually, all 64 words of the array of data storage circuit elements 410 are filled after 64 cycles, and the ME 400A completes the message expansion process.

In some examples, the multiplexers 420A-420D receive selection inputs. The multiplexers 420A-420D can use the selection inputs to select the correct four words (e.g., corresponding to registers r0, r1, r9, and r14 of the registers 210) from the bit line data 415 to input into the compute unit 425 to generate the new content using the compute unit 425.

In some examples, the demultiplexer 455 receives a selection input to select the next unused data storage circuit element to write new word content (e.g., generated by the compute unit 425) into in the array of data storage circuit elements 410. In some examples, the selection inputs (to the multiplexers 420A-420D and/or to the demultiplexer 455) include 5 bits, more than 5 bits, or fewer than 5 bits. In some examples, the selection inputs are generated and provided to the multiplexers 420A-420D and/or the demultiplexer 455 by a control unit (e.g., as in the control unit 460 of the ME 400B). In some examples, the multiplexers 420A-420D are 32:1 multiplexers, each able to select one word from 32 words (from bit line data 415 from two sets of bit lines rBL_a and rBL_b) at a time based on the selection inputs. In some examples, the demultiplexer 455 is a 1:16 demultiplexer, able to select one word from 16 words (along a specific bit line wBL) at a time based on the selection input.

In some examples, the AMC architecture for the ME 400A is able to perform message expansion without a clock. In some examples, the AMC architecture for the ME 400A includes a control unit (e.g., as in the control unit 460 of the ME 400B) with a clock (e.g., clock 465). In examples where the ME 400A includes a control unit with a clock, the clock can provide timing for activating the various word line interactions 405, such as the reads and/or writes to the word lines, and in some cases operations of the multiplexers 420A-420D. However, the clock does not need to couple to the individual data storage circuit elements 410, particularly if the data storage circuit elements 410 are memory (e.g., RAM, SRAM, and/or DRAM) rather than registers, FFs, and/or DFFs. This reduction in the clock tree reduces power consumption significantly compared to ME implementations in which a clock tree needs to couple to numerous data storage circuit elements (e.g., registers 210).

Figure 4B:
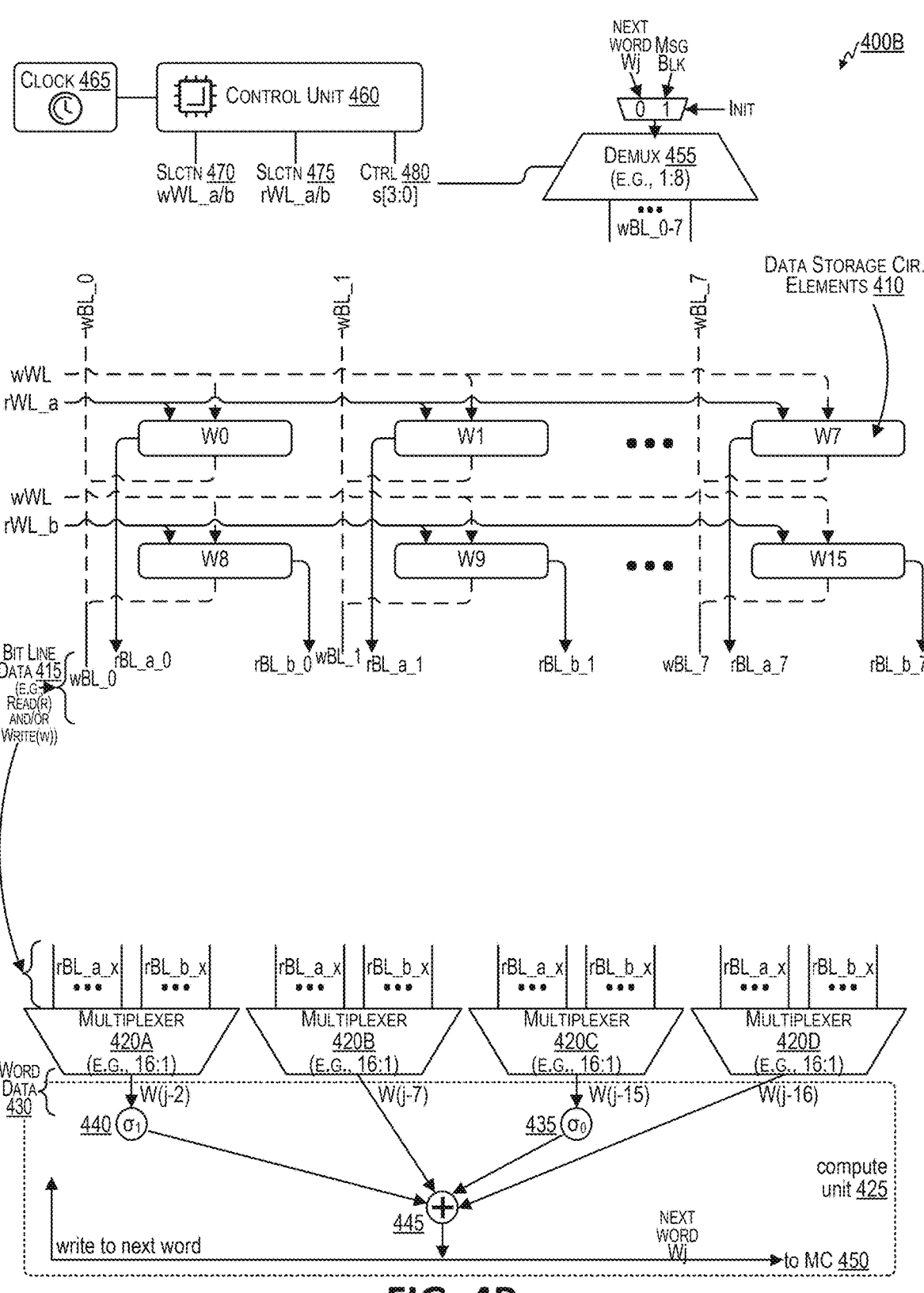
FIG. 4B is a block diagram illustrating an at-memory computing (AMC) architecture for a message expander (ME) with a reduced amount of data storage circuit elements and a control unit, in accordance with some examples.

FIG. 4B is a block diagram illustrating an at-memory computing (AMC) architecture for a message expander (ME) 400B with a reduced amount of data storage circuit elements 410 and a control unit 460. In the context of the ME 400B, AMC refers to a memory architecture with data storage circuit elements 410 that is optimized for certain computation operations, and in some examples is able to perform certain computation operations (e.g., message expansion, selecting specific words and/or data storage circuit elements, generating additional words, or a combination thereof) using combinatorial logic circuit elements (e.g., multiplexers 420A-420D and/or demultiplexer 455) and/or computational operators (e.g., the compute unit 425 and/or components thereof) that are located in and/or adjacent to the memory. In the ME 400B of FIG. 4B, the array of data storage circuit elements 410 is reduced from 64 data storage circuit elements 410 (as in the ME 400A of FIG. 4A) to 16 data storage circuit elements 410 that are denoted W0 through W15. This reduction is possible because the minimum number of data storage circuit elements 410 needed for message expansion using this architecture is 16. For instance, in the ME 400A, only 16 out of the 64 data storage elements include valid word data at any given time. On the other hand, in the ME 400B, all 16 elements are valid at the beginning of every cycle.

As indicated above with respect to the ME 400A of FIG. 4A, on the seventeenth cycle, the ME 400A moves onto the second row (WL_b), and the new content generated by the compute unit 425 is added to word W8 (e.g., via wBL_0). In the context of the ME 400B of FIG. 4B, however, on the seventeenth cycle, the ME 400B instead identifies which of the top word line WL_a will be invalid data in the next cycle and overwrites that word (e.g., W0) of the data storage circuit elements 410 with the new content generated by the compute unit 425. On the eighteenth cycle, ME 400B again identifies which of the top word line WL_a will be invalid data in the next cycle and overwrites that word (e.g., W1) of the data storage circuit elements 410 with the new content generated by the compute unit 425. This process continues on, until eventually, the content of all 16 of the data storage circuit elements 410 are overwritten three times each, corresponding to 64 clock cycles.

As in the ME 400A of FIG. 4A, the multiplexers 420A-420D of the ME 400B of FIG. 4B identify which of the contents in the array of data storage circuit elements 410 correspond to each of four inputs to the compute unit 425 and/or to each of four inputs to the computational operators 220. In some examples, the multiplexers 420A-420D are controlled by a control 480 and/or a selection 475 from the control unit 460. In some examples, the multiplexers 420A-420D of the ME 400B have a 16:1 configuration (e.g., compared to the 32:1 configuration of the multiplexers 420A-420D of the ME 400A), further reducing the size, complexity, and power draw of the ME 400B compared to the ME 400A.

As in the ME 400A of FIG. 4A, the demultiplexer 455 of the ME 400B of FIG. 4B identifies which data storage circuit element of the array of data storage circuit elements 410 to write new data (e.g., provided as part of the message 105 and/or generated using the compute unit 425) to. Once all 16 data storage circuit elements of the array of data storage circuit elements 410 have been filled up for the first time in a ME process, the demultiplexer 455 of the ME 400B of FIG. 4B identifies which data storage circuit element of the array of data storage circuit elements 410 includes content that would be invalid on the next cycle to identify which data storage circuit element of the array of data storage circuit elements 410 to overwrite to write new data (e.g., generated using the compute unit 425) to. In some examples, the demultiplexer 455 is controlled by a control 480 and/or a selection 470 from the control unit 460. In some examples, the demultiplexer 455 of the ME 400B has a 1:8 configuration (e.g., compared to the 1:16 configuration of the demultiplexer 455 of the ME 400A), further reducing the size, complexity, and power draw of the ME 400B compared to the ME 400A The control unit 460 may also include a clock 465, which may provide cycle timing for word line interactions 405 (which may be controlled using the selection 470 and/or the selection 475 from the control unit 460), multiplexing (e.g., using the multiplexers 420A-420D), and/or demultiplexing (e.g., using the demultiplexer 455). In some examples, the control unit 460 can be a computing system, a processor (e.g., processor(s) 1308, processor(s) 1328), a controller, an FPGA, a combinatorial logic circuit, or a combination thereof. In some examples, the control unit 460 and/or the clock 465 can be referred to as a timing circuit and/or a delay circuit. In some examples, the control unit 460 and/or the clock 465 can synchronize selection of specified data storage circuit elements (e.g., using the multiplexers 420A-420D and/or the demultiplexer 455) according to a specified order. In some examples, the control unit 460 and/or the clock 465 can delay selection of specified data storage circuit elements (e.g., using the multiplexers 420A-420D and/or the demultiplexer 455) based on whether a cycle generates a valid word.

Figure 5A:
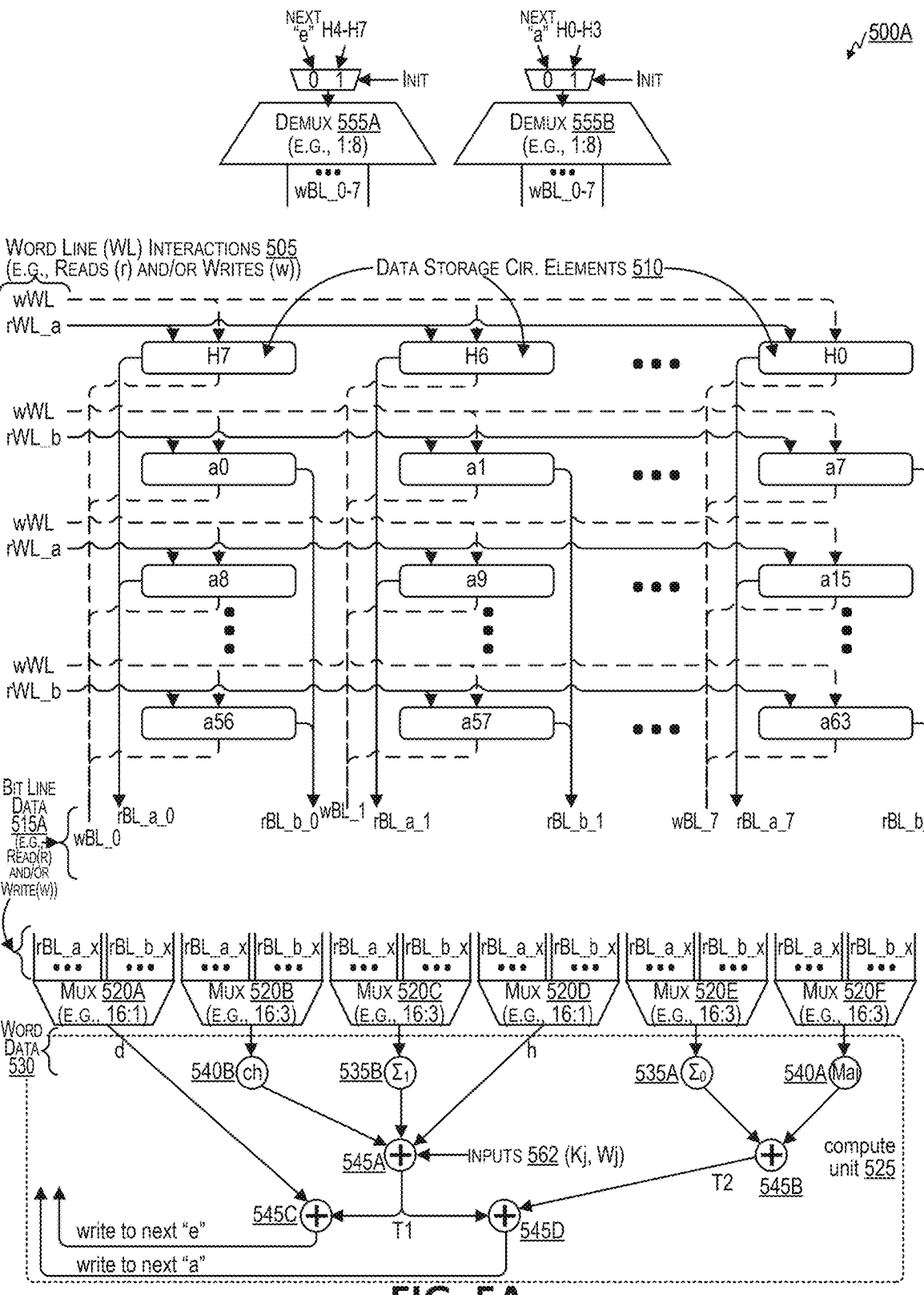
FIG. 5A is a block diagram illustrating an at-memory computing (AMC) architecture for a message compressor (MC), in accordance with some examples.

FIG. 5A is a block diagram illustrating an at-memory computing (AMC) architecture for a message compressor (MC) 500A. In the context of the MC 500A, AMC refers to a memory architecture with data storage circuit elements 510 that is optimized for certain computation operations, and in some examples is able to perform certain computation operations (e.g., message compression, selecting specific words and/or data storage circuit elements, generating additional words, or a combination thereof) using combinatorial logic circuit elements (e.g., multiplexers 520A-520F and/or demultiplexers 555A-555B) and/or computational operators (e.g., the compute unit 525 and/or components thereof) located in or adjacent to the memory. The MC 500A uses an array of data storage circuit elements 510. The exemplary MC 500A illustrated in FIG. 5A includes an array of 72 data storage circuit elements 510, with 8 initial H value data storage circuit elements (denoted H0 through H7) and 64 "a" value data storage circuit elements (denoted a0 through a63). In the exemplary MC 500A illustrated in FIG. 5A, the array of 72 data storage circuit elements 510 is arranged in 9 word lines or rows, each word line having 8 data storage circuit elements. In some examples, the array may include a different arrangement, for example with more or fewer than 8 data storage circuit elements 510 per word line, and/or with more or fewer than 9 word lines.

In some examples, the data storage circuit elements 510 may include dynamic flip flops (DFFs) or shift registers, similarly to the registers 310. In some examples, the data storage circuit elements 510 may include memory, such as random access memory (RAM), static random access memory (SRAM), dynamic random access memory (DRAM), or a combination thereof. As indicated above, memory uses less power than DFFs or registers, includes fewer transistors, uses less size, provides more portability, provides more structure, and/or provides more capacity for customization. In some examples, the array of data storage circuit elements 510 may be referred to as a memory array.

In some examples, the registers 310 of the MC 300 may use DFFs, and the MC 300 may use a clock tree that connects to the DFFs and synchronizes timing to the clock across DFFs. In such examples, the power consumption of the clock tree can account for a significant portion (e.g., approximately 30%-45%) of the power consumption of the MC 300. The AMC architecture of the MC 500A is structured to not require a clock tree to the data storage circuit elements 510, thus removing this significant source of power consumption from the MC 500A.

The AMC architecture of the MC 500A is structured to provide functionality that provides a number of technical improvements. For example, rather than shifting or rotating content every clock cycle in an energy-intensive manner (e.g., as in the MC 300), the AMC architecture of the MC 500A maintains the content in the data storage circuit elements 510 that the content is stored in. The AMC architecture of the MC 500A can change references to the content (e.g., via multiplexers 520A-520F) rather than actually physically moving the content between data storage circuit elements 510.

The array of data storage circuit elements 510 is used by the MC 500A in place of the 8 registers 310 (a through h). Each of the data storage circuit elements 510 in the array stores one word (e.g., a 32-bit word). The array of data storage circuit elements 510 in the MC 500A includes word lines (WLs) of data storage circuit elements 510 that are activated alternatively to one another. The WLs are oriented horizontally in FIG. 5A. The word lines are denoted in FIG. 5A using the letters "a" and "b." For instance, a word line a can be denoted as "WL_a," while a word line b can be denoted as "WL_b." The first WL_a includes data storage circuit elements H0 through H7, the first WL_b includes data storage circuit elements a0 through a7, the second WL_a includes data storage circuit elements a8 through a15, the second WL_b includes data storage circuit elements a16 though a23, the third WL_a includes data storage circuit elements a24 through a31, and so forth, until the final word line (here, a WL_b) includes data storage circuit elements a56 through a63.

Word line (WL) interactions 505 are illustrated using lines to the various data storage circuit elements 510. The WL interactions 505 include read operations (denoted "r") and write operations (denoted "w"). Thus, the WL interactions 505 for reading from WL_a are denoted as rWL_a, and the WL interactions 505 for reading from WL_b are denoted as rWL_b. The WL interactions 505 for writing to either WL_a or WL_b are denoted as wWL in FIG. 5A.

As indicated above, the MC 500A uses alternating word line activations (e.g., alternating between WL_a and WL_b). Once the data storage circuit elements 510 of the first WL_a (H0 through H8) are filled with content (e.g., initial H states as in the initial H states 125 of FIG. 1 and/or A_i through H_i of the inputs 305 of FIG. 3), that content remains in the data storage circuit elements 510 of the first WL_a (H0 through H7) without moving or changing for at least a portion of the duration of the message compression process (e.g., data content is not changed or updated for 64 clock cycles). Because the MC 500A maintains the content in the data storage circuit elements 510 unchanged for at least a portion of the duration of the message compression process (e.g., data content is not changed or updated for 64 clock cycles) once the MC 500A stores this content in the data storage circuit elements 510, the data storage circuit elements 510 do not need to be activated and deactivated repeatedly throughout the message compression process. Reducing such activations and deactivations reduces unnecessary charges and discharges, and therefore reduces unnecessary power consumption by the MC 500A, as illustrated and discussed with respect to FIG. 6.

The content that is stored in the data storage circuit elements 510 is input and/or output using bit lines (BLs), which are oriented vertically in FIG. 5A. Content being written into data storage circuit elements 510 is denoted with a "w" along with the column in the array of the data storage circuit elements 510. For example, content being written into the first column in the array is written along bit line wBL_0, content being written into the second column in the array is written along bit line wBL_1, content being written into the third column in the array is written along bit line wBL_2, and so forth.

Content being read from data storage circuit elements 510 is denoted with a "r" along with the column in the array of the data storage circuit elements 510. For example, content being read from the first column in the array from a WL_a is read along bit line rBL_a_0, content being read from the second column in the array from a WL_a is read along bit line rBL_a_1, content being read from the third column in the array from a WL_a is read along bit line rBL_a_2, and so forth. Similarly, content being read from the first column in the array from a WL_b is read along bit line rBL_b_0, content being read from the second column in the array from a WL_b is read along bit line wBL_b_1, content being read from the third column in the array from a WL_b is read along bit line wBL_b_2, and so forth. The content that is stored in the data storage circuit elements 510, that is input using the BLs, and/or that is output using the BLs can be referred to as bit line data 515A. Because the content in the data storage circuit elements 510 does not move or change once input for the duration of the MC process, in some examples, each of the BLs can be activated once for each data storage circuit elements 510 per every 16 clock cycles. In some examples, because the MC 500A maintains the content in the data storage circuit elements 510 unchanged for at least a portion of the duration of the message compression process once the MC 500A stores this content in the data storage circuit elements 510, the BLs are mostly static during at least this portion of the duration of the message compression process, in some cases including zero, one, or a small number of activations. For clarity, word lines and bit lines corresponding to reading content from the data storage circuit elements 510 are illustrated as solid lines in FIGS. 5A-5B, while word lines and bit lines corresponding to writing content to the data storage circuit elements 510 are illustrated as dashed lines in FIGS. 5A-5B. Therefore, removal of the dashed lines corresponding to writing content to the data storage circuit elements 510 would represent a read-only implementation of the MC 500A.

The MC 300 of FIG. 3 is configured to use content from all 8 of its registers 310 (a through h) to perform combinational operations using its computational operators 320. Similarly, the MC 500A of FIG. 5A is configured to use content from eight of its data storage circuit elements 510 to perform combinational operations using its compute unit 525. The bit line data 515A (specifically, the word data read from the data storage circuit elements 510 using the BLs) is input into multiplexers 520A-520F, which select the appropriate word data 530 from the bit line data 515A to perform combinational operations using the compute unit 525 of the MC 500A. The multiplexers 520A-520F can also ensure that the bit line data 515A is taken from the correct data storage circuit elements 510.

Similarly to the computational operators 320, the compute unit 525 includes a $\Sigma_0$ operator 535A, a $\Sigma_1$ operator 535B, a majority (Maj) operator 540A, a choice (ch) operator 540B, and several adder operators (e.g., adder 545A, adder 545B, adder 545C, and adder 545D). The $\Sigma_0$ operator 535A can be structured like the $\Sigma_0$ operator 330. The $\Sigma_1$ operator 535B can be structured like the $\Sigma_1$ operator 335. The Maj operator 540A can be structured like the Maj operator 340. The ch operator 540B can be structured like the ch operator 345. The word data 530 selected by the multiplexer 520A is output to the adder 545C, along with the output Ti of the adder 545A, similarly to register d of the registers 310 in the MC 300. The word data 530 selected by the multiplexer 520B is output to the ch operator 540B, similarly to the registers e-g of the registers 310 in the MC 300. The word data 530 selected by the multiplexer 520C is output to $\Sigma_1$ operator 535B, similarly to register e of the registers 310 in the MC 300. The word data 530 selected by the multiplexer 520D is output to adder 545A, along with other inputs 562 Kj (e.g., as in constant Kt_i of MC 300) and Wj (e.g., as in words Wj from the words Wj 115, from ME 120, from ME 200, from ME 390, from word Wt_i of MC 300, from ME 400A, and/or from ME 400B), and the outputs of the ch operator 540B and the $\Sigma_1$ operator 535B, similarly to register h of the registers 310 in the MC 300. The word data 530 selected by the multiplexer 520E is output to $\Sigma_0$ operator 535A, similarly to register a of the registers 310 in the MC 300. The word data 530 selected by the multiplexer 520F is output to Maj operator 540A, similarly to registers a-c of the registers 310 in the MC 300. The outputs of the $\Sigma_0$ operator 535A and the Maj operator 540A are input into the adder 545B. The output T2 of the adder 545B is input into the adder 545D, along with the output T1 of the adder 545A. The output of the adder 545D is written to the next "a" data storage circuit element (corresponding to register a of the registers 310) of the array of data storage circuit elements

510. The next "a" data storage circuit element of the array of data storage circuit elements 510 can be identified using a demultiplexer 555A (e.g. a 1:8 demultiplexer) for writing the new "a" word data to the next available "a" word in the array of data storage circuit elements 510. The output of the adder 545D is written to the next "e" data storage circuit element (corresponding to register e of the registers 310) of the array of data storage circuit elements 510. The next "e" data storage circuit element of the array of data storage circuit elements 510 can be identified using a demultiplexer 555B (e.g. a 1:8 demultiplexer) for writing the new "e" word data to the next available "e" word in the array of data storage circuit elements 510.

In each cycle of the MC process, the multiplexers 520A-520F choose 8 words (the word data 530) from the bit line data 515A. In each cycle of the MC process, only 8 of the data storage circuit elements 510 are filled with valid word data at any given time. In the first cycle, only words H0 through H7 are filled with content from the initial H states (e.g., initial H states as in the initial H states 125 of FIG. 1 and/or A_i through H_i of the inputs 305 of FIG. 3), so the selection proceeds similarly to the what is illustrated with respect to the MC 300 of FIG. 3. For example, in the first cycle, the multiplexers 520A-520F can choose the word data 530 in words H0 through H7 of the data storage circuit elements 510, which may correspond to registers a through h of the registers 310.

At the end of the first cycle, new content generated by the compute unit 525 is added to word a0 (e.g., via wBL_0) and to word H3 (e.g., via wBL_4), corresponding to the next "a" word and next "e" word, respectively, in either order. Thus, words a0 and H3 include valid word data, and six of the words from the top WL_a word line (e.g., H0-H2, H4-H6) include valid word data. One of the words from the top WL_a word line, H7 (e.g., corresponding to registers h of the previous state) no longer includes valid word data. The valid word data is read as bit line data 515A and is input into the multiplexers 520A-520F, which reference the valid word data (e.g., bit line data 515A) of the data storage circuit elements 510 as if the data had shifted, without actually shifting any of the content between any of the data storage circuit elements 510.

At the end of the second cycle, new content generated by the compute unit 525 is added to word a1 (e.g., via wBL_1) and to word H2 (e.g., via wBL_5), corresponding to the next "a" word and next "e" word, respectively, in either order. Thus, words a0 through a1 include valid word data, and six of the words from the top WL_a word line (e.g., H0-H5) include valid word data. Two of the words from the top WL_a word line, H7 and H6 (e.g., corresponding to registers h of the previous cycles) no longer include valid word data 515. The valid word data is read as bit line data 515A and is input into the multiplexers 520A-520F, which reference the valid word data (e.g., bit line data 515A) of the data storage circuit elements 510 as if the data had shifted, without actually shifting any of the content between any of the data storage circuit elements 510.

This process continues, with new content generated by the compute unit 525 being added by the MC 500A to a new word of the array of data storage circuit elements 510 during each new cycle. After eight cycles, all of the valid word data (e.g., bit line data 515A) is on the second row (WL_b) of the array of data storage circuit elements 510 (e.g., a0 through a7), and the first row (WL_a) of the array of data storage circuit elements 510 (e.g., H0 through H7) no longer includes any valid word data. On the ninth cycle, the MC 500A moves onto the third row (WL_a), and the new content generated by the compute unit 525 is added to word a8 (e.g., via wBL_0) and to word a4 (e.g., via wWL_4), corresponding to the next "a" word and the next "e" word, respectively. Eventually, all 72 words of the array of data storage circuit elements 510 are filled, and the MC 500A completes the message compression process.

In some examples, the multiplexers 520A-520F receive selection inputs. The multiplexers 520A-520F can use the selection inputs to select the correct eight words (e.g., corresponding to current values for the registers a through h of the registers 310 during the respective MC cycle) from the bit line data 515A to input into the compute unit 525 to generate the new content using the compute unit 525. In some examples, the demultiplexers 555A-555B receive selection inputs to select the next data storage circuit elements 510 to write new word content (e.g., generated by the compute unit 525 for the next "a" and next "e" respectively) into in the array of data storage circuit elements 510. In some examples, the next "a" is written into an unused data storage circuit element 510. In some examples, the next "e" is written into a used data storage circuit element 510. In some examples, the selection inputs (to the multiplexers 520A-520F and/or to the demultiplexers 555A-555B) include 4 bits, more than 4 bits, or fewer than 4 bits. In some examples, the selection inputs are generated and provided to the multiplexers 520A-520F and/or to the demultiplexers 555A-555B by a control unit (e.g., as in the control unit 560 of the MC 500B). In some examples, the multiplexers 520A-520F are 16:1 multiplexers and/or 16:3 multiplexers, each able to select one word or three words from 16 words (from two alternating word lines WL_a and WL_b) at a time based on the selection inputs. In some examples, the demultiplexers 555A-555B are each 1:8 demultiplexers, each able to select one of the 8 words to pass the input data through (along a specific bit line) at a time based on the selection input.

In some examples, the AMC architecture for the MC 500A is able to perform message expansion without a clock. In some examples, the AMC architecture for the MC 500A includes a control unit (e.g., as in the control unit 560 of the MC 500B) with a clock (e.g., clock 565). In examples where the MC 500A includes a control unit with a clock, the clock can provide timing for activating the various word line interactions 505, such as the reads and/or writes to the word lines, and in some cases operations of the multiplexers 520A-520F. However, the clock does not need to couple to the individual data storage circuit elements 510, particularly if the data storage circuit elements 510 are memory (e.g., RAM, SRAM, and/or DRAM) rather than registers, FFs, and/or DFFs. This reduction in the clock tree reduces power consumption significantly compared to MC implementations in which a clock tree needs to couple to numerous data storage circuit elements (e.g., registers 310). In some examples, the control unit 560 and/or the clock 565 can be referred to as a timing circuit and/or a delay circuit. In some examples, the control unit 560 and/or the clock 565 can synchronize selection of specified data storage circuit elements (e.g., using the multiplexers 590A-590B and/or the demultiplexers 585A-585B) according to a specified order. In some examples, the control unit 560 and/or the clock 565 can delay selection of specified data storage circuit elements (e.g., using the multiplexers 590A-590B and/or the demultiplexers 585A-585B) based on whether a cycle generates a valid word.

Figure 5B:
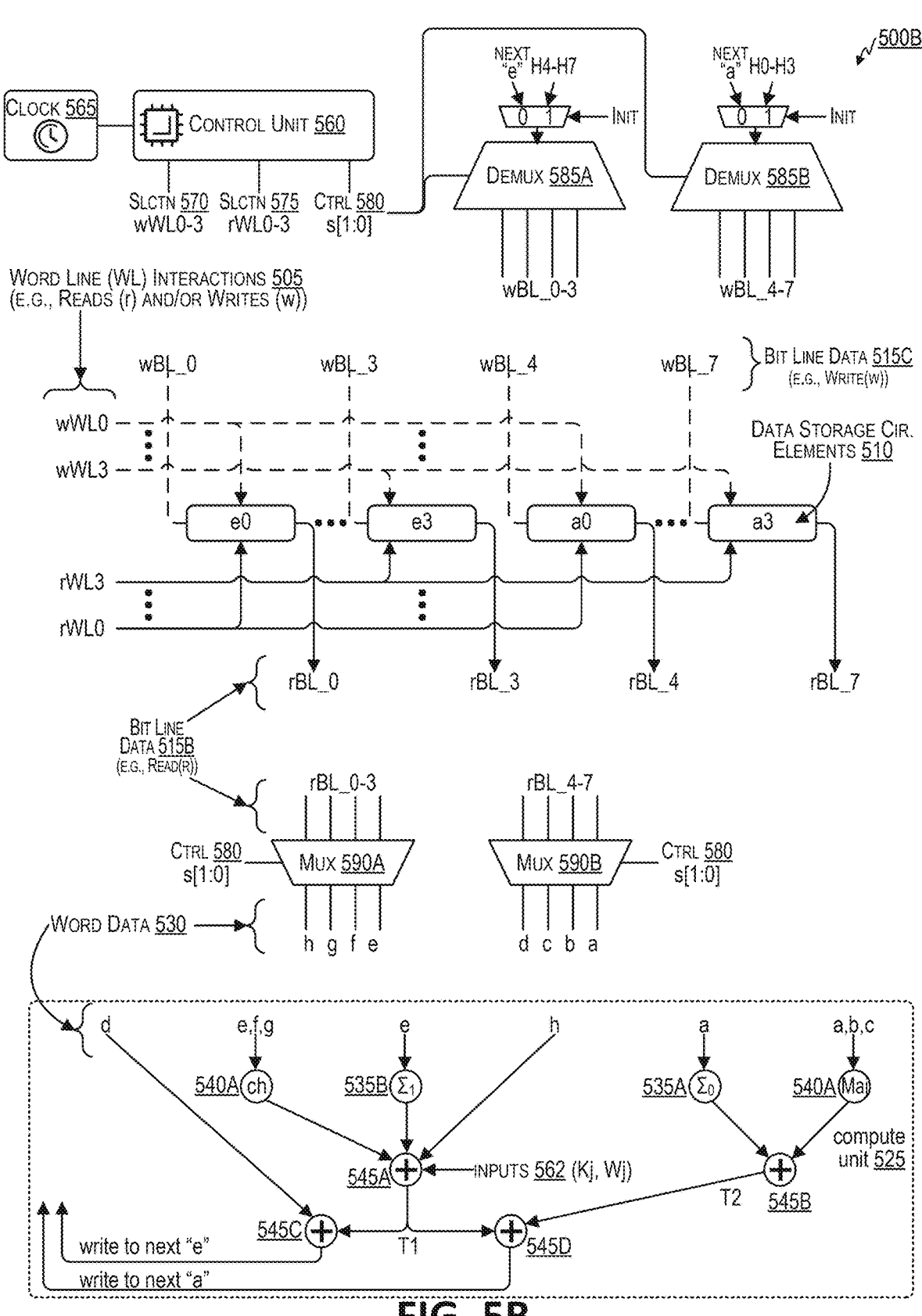
FIG. 5B is a block diagram illustrating an at-memory computing (AMC) architecture for a message compressor (MC) with a reduced amount of data storage circuit elements and a control unit, in accordance with some examples.

FIG. 5B is a block diagram illustrating an at-memory computing (AMC) architecture for a message compressor (MC) 500B with a reduced amount of data storage circuit elements 510 and a control unit 560. In the context of the MC 500B, AMC refers to a memory architecture with data storage circuit elements 510 that is optimized for certain computation operations, and in some examples is able to perform certain computation operations (e.g., message compression, selecting specific words and/or data storage circuit elements, generating additional words, or a combination thereof) using combinatorial logic circuit elements (e.g., multiplexers 590A-590B and/or demultiplexers 585A-585B) and/or computational operators (e.g., the compute unit 525 and/or components thereof) located in or adjacent to the memory. In the MC 500B of FIG. 5B, the array of data storage circuit elements 510 is reduced to 8 data storage circuit elements 510, denoted a0 through a3 and e0 through e3. Bit line data 515B is read from the data storage circuit elements 510 along some of the bit lines (e.g., rBL_0 through rBL_7). Bit line data 515C is written to the data storage circuit elements 510 along some of the bit lines (e.g., wBL_0 through wBL_7).

The data storage circuit elements a0 through a3 are used to store content that would be stored in registers a through d of the registers 310 of the MC 300. For instance, the initial H states corresponding to registers a through d (e.g., initial H states 125 in FIG. 1 and/or A_i through D_i in FIG. 3) are stored in data storage circuit elements a0 through a3 before the first hashing cycle. Each cycle, the compute unit 525 generates a new "a" word, which becomes valid word data for the next cycle, while one of the existing words in data storage circuit elements a0 through a3 becomes invalid (e.g., corresponding to register d). The new "a" word generated by the compute unit 525 can take the place of (e.g., overwrite and/or replace) the one of the existing words in data storage circuit elements a0 through a3 that becomes invalid (e.g., corresponding to the content in register d at the cycle in which the new "a" word is generated).

The data storage circuit elements e0 through e3 are used to store content that would be stored in registers e through h of the registers 310 of the MC 300. For instance, the initial H states corresponding to registers e through h (e.g., initial H states 125 in FIG. 1 and/or E_i through H_i in FIG. 3) are stored in data storage circuit elements e0 through e3 before the first hashing cycle. Each cycle, the compute unit 525 generates a new "e" word, which becomes valid word data for the next cycle, while one of the existing words in data storage circuit elements e0 through e3 becomes invalid (e.g., corresponding to register h). The new "e" word generated by the compute unit 525 can take the place of (e.g., overwrite and/or replace) the one of the existing words in data storage circuit elements e0 through e3 that becomes invalid (e.g., corresponding to the content in register h at the cycle in which the new "e" word is generated).

The different structure of the array of data storage circuit elements 510 in the MC 500B of FIG. 5B relative to the MC 500A of FIG. 5A reduces how many data storage circuit elements 510 are needed for the MC 500B of FIG. 5B relative to the MC 500A of FIG. 5A, for instance from 72 data storage circuit elements to just 8 data storage circuit elements.

The MC 500B also includes two demultiplexers 585A-585B and two multiplexers 590A-590B. The multiplexer 590A identifies which of the contents in the data storage circuit elements e0 through e3 (read along rBL_0 through rBL 3) corresponds to each of inputs e, f, g, and h of the compute unit 525, respectively (e.g., and/or corresponds to each of the registers e, f, g, and h of the registers 310 of the MC 300). The multiplexer 590B identifies which of the contents in the data storage circuit elements a0 through a3

(read along rBL_4 through rBL_7) corresponds to each of inputs a, b, c, and d of the compute unit 525, respectively (e.g., and/or corresponds to each of the registers a, b, c, and d of the registers 310 of the MC 300). In some examples, the multiplexers 590A-590B are controlled by a control 580 and/or a selection 575 from the control unit 560. In some examples, the multiplexers 590A-590B function as replacements for the multiplexers 520A-520F of the MC 500A. In some examples, the multiplexers 590A-590B of the MC 500B can replace the multiplexers 520A-520F in the MC 500A. In some examples, the multiplexers 520A-520F of the MC 500A can replace the multiplexers 590A-590B in the MC 500B.

The demultiplexer 585A identifies which of the contents in the data storage circuit elements e0 through e3 (e.g., read along rBL_0 through rBL_3) will no longer be valid in the next cycle (e.g., corresponds to input h of the compute unit 525 and/or register h of the registers 310 of the MC 300) and is thus to be overwritten (e.g., written along wBL_0 through wBL_3) by the new "e" word generated by the compute unit 525 (e.g., as the result of the adder 545C). The demultiplexer 585B identifies which of the contents in the data storage circuit elements a0 through a3 (e.g., read along rBL_4 through rBL_7) will no longer be valid in the next cycle (e.g., corresponds to input d of the compute unit 525 and/or register d of the registers 310 of the MC 300) and is thus to be overwritten (e.g., written along wBL_4 through wBL_7) by the new "a" word generated by the compute unit 525 (e.g., as the result of the adder 545D). In some examples, the demultiplexers 585A-585B are controlled by a control 580 and/or a selection 570 from the control unit 560. In some examples, the demultiplexers 585A-585B function as replacements for the demultiplexers 555A-555B of the MC 500A. In some examples, the demultiplexers 585A-585B of the MC 500B can replace the demultiplexers 555A-555B in the MC 500A. In some examples, the demultiplexers 555A-555B of the MC 500A can replace the demultiplexers 585A-585B in the MC 500B.

The control unit 560 may also include a clock 565, which may provide cycle timing for word line interactions 505 (which may be controlled using the selection 570 and/or the selection 575 from the control unit 560), multiplexing (e.g., using the multiplexers 590A-590B), and/or demultiplexing (e.g., using the demultiplexers 585A-585B). In some examples, the control unit 560 can be a computing system, a processor (e.g., processor(s) 1308, processor(s) 1328), a controller, an FPGA, a combinatorial logic circuit, or a combination thereof.

FIG. 6 is a conceptual diagram illustrating power savings resulting from use of at-memory computing (AMC) in a hashing engine. A chart 600 of FIG. 6 illustrates hashing operations of an ME and/or an MC of hashing engine that does not use AMC, such as the ME 200 and/or the MC 300. A clock 610 keeps cycle timing with periodic activations and deactivations, appearing in the chart 600 as steps up and down in voltage, respectively. In a hashing engine that does not use AMC, each word line 620 is activated and deactivated every clock cycle, causing the hashing engine to consume a significant amount of power. In a hashing engine that does not use AMC, each bit line 630 is likewise activated and deactivated every clock cycle, also causing the hashing engine to consume a significant amount of unnecessary power, since the data content of the cells are known to be the same for a fixed number of clock cycles.

A chart 650 of FIG. 6 illustrates hashing operations of an ME and/or an MC of hashing engine that uses AMC, such as the ME 400A, the ME 400B, the MC 500A, and/or the MC 500B. A clock 660 keeps cycle timing with periodic activations and deactivations. In a hashing engine that uses AMC, each word line 670 is activated only once for a number of clock cycles (e.g., at least 16 clock cycles for ME 400A and/or ME 400B, at least four clock cycles for MC 500A and/or MC 500B), allowing the hashing engine to reduce power consumption significantly compared to the word line 620 in the chart 600 for the non-AMC hashing engine. In a hashing engine that uses AMC, each bit line 630 is likewise activated only once for a number of clock cycles (e.g., at least 16 clock cycles for ME 400A and/or ME 400B, at least four clock cycles for MC 500A and/or MC 500B), allowing the hashing engine to reduce power consumption significantly compared to the word line 620 in the chart 600 for the non-AMC hashing engine.

The clock 610 and/or clock 660 can be examples of a clock of the ME 200, a clock of the MC 300, the clock 465, and/or the clock 565. The word line 620 can be an example of lines reading from, and/or writing to, the registers 210 of the ME 200 and/or the registers 310 of the MC 300. The bit line 630 can be an example of lines reading from the registers 210 of the ME 200 and/or the registers 310 of the MC 300. The word line 670 can be an example of the word lines wWL, rWL_a, and/or rWL_b of the ME 400A, the ME 400B, the MC 500A, and/or the MC 500B. The bit line 680 can be an example of the bit lines rBL_a_x and/or rBL_b_x of the ME 400A, the ME 400B, the MC 500A, and/or the MC 500B.

Figure 7:
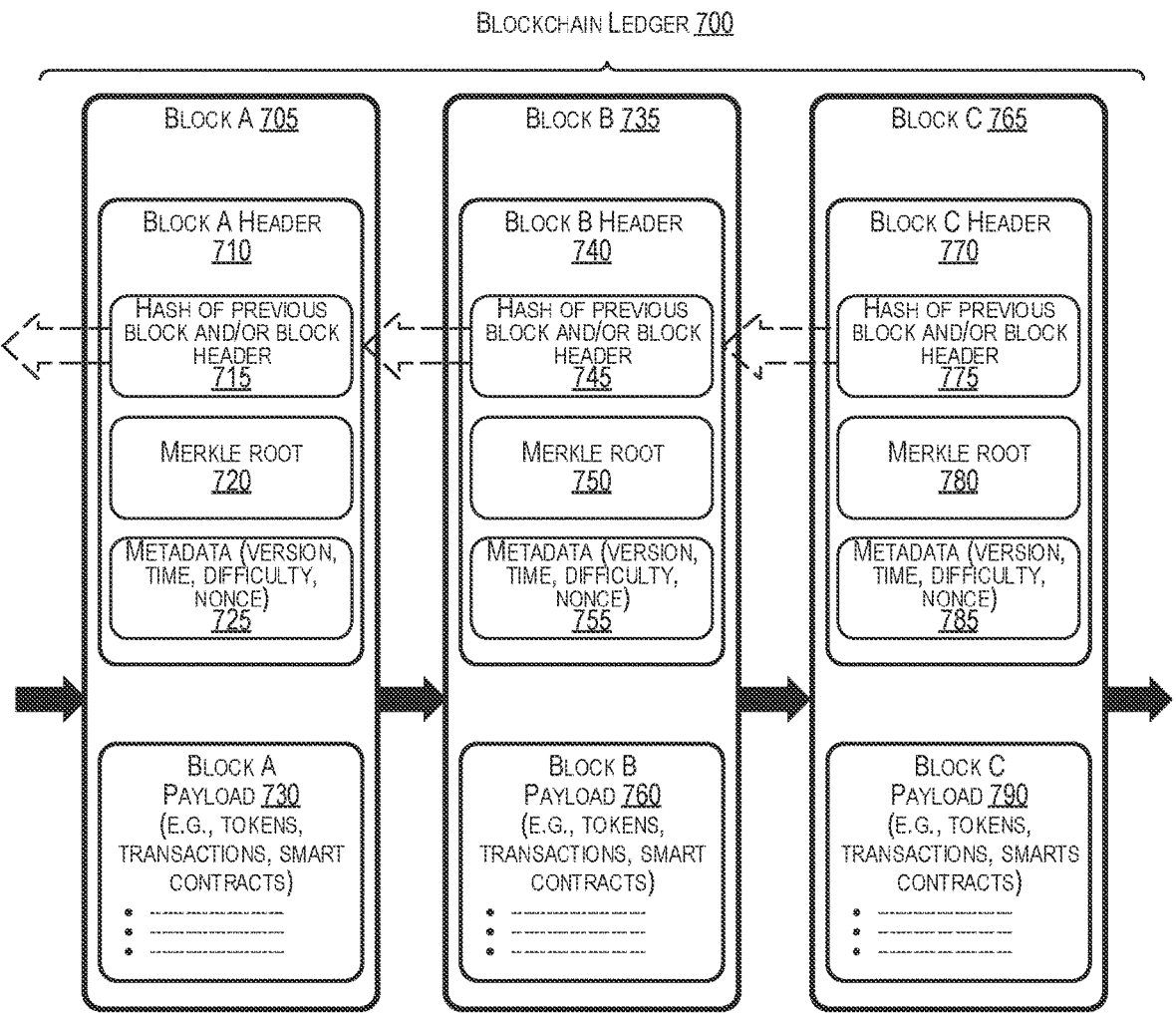
FIG. 7 is a block diagram illustrating three consecutive blocks of a blockchain ledger that the hashing engine may be used to compute hashes for, in accordance with some examples.

FIG. 7 is a block diagram illustrating three consecutive blocks of a blockchain ledger 700 that the hashing engine 100 may be used to compute hashes for. Three blocks of the blockchain ledger 700 are illustrated in FIG. 7, including Block A 705, Block B 735, and Block C 765.

Each block includes a block header 710/740/770 and a list of one or more payloads 730/760/790. In some examples, block header 710/740/770 includes a hash 710/740/770 of at least the block header of the previous block. For instance, the header 770 of block C 765 includes a hash 775 of the header 740 of block B 735. The header 740 of block B 735 likewise includes a hash 745 of the header 710 of block A 705. The header 710 of block A 705 likewise includes a hash 715 of a header (not pictured) of previous block (not pictured) that is before block A 705 in the blockchain ledger 700. Including the hash of the previous block's header secures the blockchain ledger 700 by preventing modification of any block of the blockchain ledger 700 after the block has been entered into the blockchain ledger 700, as any change to a particular block would cause that block header's hash 715/745/775 in the next block to be incorrect. Further, modification of that block header's hash in the next block would make the next block's header's hash 715/745/775 in the block after the next block incorrect, and so forth. A verifying device can verify that a block has not been modified by computing the hash of the block header, then comparing the computed hash to the stored hash 715/745/775 that is stored in the next block. In some distributed ledgers, a block header 710/740/770 can include hashes of multiple previous blocks and/or block headers of multiple previous blocks, as in the distributed acyclic graph (DAG) ledger 1200 of FIG. 12.

The hash 715/745/775 of the block header of the previous block can be computed using any hashing engine, ME, MC, and/or combination thereof. For example, the hash 715/745/775 of the block header of the previous block can be computed using the hashing engine 100, the ME 120, the MC 130, the ME 200, the MC 300, ME 400A, the ME 400B, the MC 500A, the MC 500B, or a combination thereof.

Each block's block header 710/740/770 can include a Merkle root 720/750/780. The Merkle root 720/750/780 is generated based on hashes of each of the tokens (e.g., non-fungible tokens (NFTs)), transactions, smart contracts, and/or other elements identified in the payload 730/760/790 for that block. Any attempt to modify a payload after the block has been entered would change the Merkle root. A verifying device can verify that the payload(s) 730/760/790 have not been modified by computing the Merkle root, then comparing the computed Merkle root to the stored Merkle root 720/750/780 that is stored in the block header 710/740/770. Changes to the payload 730/760/790 and/or to the Merkle root 720/750/780 would also change the hash for the block header, for which a value is stored in the next block as the hash 715/745/775. Each payload of each block may include one or more tokens, one or more transactions, one or more smart contracts, other content, or combinations thereof.

The hashes of the Merkle root 720/750/780, and/or the Merkle root 720/750/780 itself, can be computed using any hashing engine, ME, MC, and/or combination thereof. For example, the hashes of the Merkle root 720/750/780, and/or the Merkle root 720/750/780 itself, can be computed using the hashing engine 100, the ME 120, the MC 130, the ME 200, the MC 300, ME 400A, the ME 400B, the MC 500A, the MC 500B, or a combination thereof.

Each block's block header 710/740/770 may also include various elements of metadata, such as a version number for the blockchain ledger platform, a version number for the block itself, a timestamp for verification of each payload, a timestamp for generation of the block, a timestamp for entry of the block into the blockchain ledger 700, a timestamp for request of generation of the block, a difficulty target value (e.g., adjusting difficulty of mining), one or more random-ized nonce values, a counter identifying how many nonces have been tried, a title of the blockchain ledger 700, an identifier as to what the blockchain ledger 700 is tracking, or a combination thereof. Each individual element added can further serve as information that can be verified by a verifying device to identify if the block, and the payload within, is accurate and authorized. The one or more ran-domized nonce values can serve to further complicate the hashes, improving security. In some examples, mining and/or validation of the blocks of the blockchain ledger 700 involves computation of hash values using the hashing engine 100, the ME 120, the MC 130, the ME 200, the MC 300, ME 400A, the ME 400B, the MC 500A, the MC 500B, or a combination thereof.

Each block 705/735/765 of the blockchain ledger 700 also includes a payload 730/760/790. The payload 730/760/790 for each block 705/735/765 can include one or more tokens, one or more transactions, one or more smart contracts, one or more other elements, metadata related to any of the previously-listed elements, or combinations thereof. A token may be, for example, a non-fungible token. The token 400 may be an example of a token that is stored in the payload 730/760/790 for a block 705/735/765. As discussed with respect to the token 400, certain parts of the token 400 are stored within the payload 730/760/790 of the blockchain ledger 700, and are thus stored "on-chain." As discussed with respect to the token 400, certain parts of the token 400 include on-chain pointers that point to data outside of the blockchain ledger 700, such as a data structure 140, with such data being stored "off-chain." The payload 730/760/790 of the blockchain ledger 700 may store hashes of off-chain data, so that a verifying device can compute a hash of the off-chain data and compare the computed hash to the stored hash that is stored on-chain to verify that the off-chain data is accurate. In some examples, the payload 730/760/790 includes one or more smart contracts. The block may include the code of the smart contract stored within the payload 730/760/790 of the blockchain ledger 700, thus storing the code on-chain. If the payload 730/760/790 includes a smart contract, the block may include a hash of the code of the smart contract and/or a pointer to an off-chain data structure 140 storing the code of the smart contract, thus storing the code off-chain. In some examples, some of the smart contract's code may be stored on-chain, while some of the smart contract's code may be stored off-chain. In some examples, smart contracts can be used to create, modify, transfer, or otherwise manage tokens. In some examples, the payload 730/760/790 includes transactions. In some examples, transactions may include transfers of tokens from one account to another account. In some examples, transactions may include changes to certain properties of tokens or the associated digital assets, such as changes to ownership of the tokens.

While FIG. 7 only illustrates three blocks 705/735/765 of the blockchain ledger 700, it should be understood that any blockchain discussed herein may be longer or shorter in that it may have more or fewer than three blocks.

In one illustrative example, a first computing device can store a blockchain ledger including a plurality of blocks. Each of a plurality of computing devices (e.g., in a distributed architecture) also stores a copy of the blockchain ledger. The first computing device can receive a message identifying an intended payload element (e.g., token and/or transaction and/or smart contract). The first computing device can verify that the intended payload element is valid. In some blockchain ledger 700 implementations, the first computing device can verify that sufficient funds are allocated in order to pay for execution fee charges for the intended payload element, for instance in the form of gas on an Ethereum blockchain ledger. For a transaction, the first computing device can verify whether the transferor has a sufficient quantity of an asset (e.g., whether the transferor owns the token to be transferred) for the transaction to take place. For a smart contract, the first computing device can verify that the smart contract refers to valid accounts that include sufficient quantity of an asset (e.g., token) to execute the smart contract (e.g., to transfer the token), verify that the code of the smart contract can be executed (e.g., does not include syntax errors or other errors), verify that all parties involved in the smart contract have submitted agreement to the terms of the smart contract, or a combination thereof. For a token, the first computing device can verify that the token refers to a valid digital asset, for instance a valid type of digital asset. In some examples, such verifications involve computation of hash values using the hashing engine 100, the ME 120, the MC 130, the ME 200, the MC 300, ME 400A, the ME 400B, the MC 500A, the MC 500B, or a combination thereof.

The first computing device can generate a hash of a most recent block or block header of the blockchain ledger 700. The first computing device can generate a new block header for a new block. The new block header can include at least the hash of the most recent block or block header of the blockchain ledger 700, for instance generated using the hashing engine 100, the ME 120, the MC 130, the ME 200, the MC 300, ME 400A, the ME 400B, the MC 500A, the MC 500B, or a combination thereof. The first computing device can generate the new block, the new block including the new block header and a payload with one or more payload elements. The one or more payload elements include at least the intended payload element discussed above (e.g., token, smart contract, transaction). The first computing device can generate a Merkle root based on the payload elements, and include the Merkle root in the new block header. The first computing device can generate a metadata and a nonce value based on the payload elements, and include the metadata and the nonce value in the new block header. The first computing device can append the new block to the plurality of blocks of the blockchain ledger 700 in response to verifying the intended payload element. The first computing device can transmit the new block to the plurality of computing devices that each store the blockchain ledger 700 in response to verifying the intended payload element. Each of the plurality of computing devices also appends the new block to their respective copy of the blockchain ledger 700.

In another illustrative example, a first computing device can store a blockchain ledger 700 including a plurality of blocks. Each of a plurality of computing devices (e.g., in a distributed architecture) also stores a copy of the blockchain ledger 700. The first computing device can receive a UI input identifying an intended payload element (e.g., transaction and/or smart contract). The first computing device can generate a message identifying the intended payload element. The first computing device can retrieve a private key associated with an account corresponding to the first computing device. The first computing device can modify the message by encrypting at least a portion of the message with the private key. The first computing device can transmit the message to the plurality of computing devices other than the first computing device. A second computing device of the plurality of computing devices verifies that the intended payload element is valid, for instance as described in the previous paragraph. The first computing device receives a new block from the second computing device. The new block identifies and/or includes the intended payload element (e.g., in its payload). The first computing device appends the new block to the plurality of blocks of the blockchain ledger 700 at the first computing device.

It should be understood that the blockchain ledger 700 illustrated in FIG. 7 is a non-limiting example of a distributed ledger. In some examples, a distributed ledger may be a directed acyclic graph (DAG) ledger. In a DAG ledger, each block header includes the hashes of blocks, or block headers, of a predetermined number of other "parent" blocks in the DAG ledger selected either at random or in some other non-linear manner, rather than the hash of a single previous block in the blockchain. Where each block header includes multiple hashes corresponding to different parent blocks or their headers, these hashes can be combined together using a Merkle root. For example, if the blockchain ledger 700 were instead a DAG ledger, block A 705 and block B 735 could be parent blocks to block C 765, in which case the Merkle root 780 in the block C header 770 would be based on block A 705 and block B 735, and the hash 775 in the block C header 770 can be replaced with one hash of block A 705 and a second hash of block B 735. The resulting structure is a directed acyclic graph (DAG) of blocks, where each vertex block includes a hash of its parent vertex block(s), rather than a linear stream of blocks as in a blockchain. A DAG ledger may sometimes be referred to as a "web," a "tangle," or a "hashgraph."

In some examples, the number of parent blocks of a given block in a DAG ledger is not predetermined, but there may be a predetermined minimum number of parent blocks, such as a two-parent minimum or a one-parent minimum, meaning that each block has at least the predetermined minimum number of parent blocks. In some cases, each block in a DAG ledger may only identify only a single payload element rather than multiple payload element, and may therefore forego a Merkle root 320/350/380 of payload elements and/or replace it with a hash of the single payload element. In other implementations, each block may identify multiple payload elements associated with a predetermined time period, and/or may include a Merkle root 320/350/380 of the payload elements. Potential benefits of DAG ledgers over blockchain ledgers 700 may include parallelized validation, which may result in higher throughput.

FIG. 8A is a flow diagram illustrating a hashing process 800. In some examples, the hashing process 800 is performed by a hashing system. The hashing system can include, for instance, the hashing engine 100, the message expander (ME) 120, the message compressor (MC) 130, the ME 200, the MC 290, the MC 300, the ME 390, the ME 400A, the ME 400B, the MC 500A, the MC 500B, the clock 610, the word line 620, the bit line 630, the clock 660, the word line 670, the bit line 680, the hashing system that performs the hashing process 850, the blockchain ledger 700, the server(s) 902, the network(s) 904, the user devices 906, the merchant device(s) 908(A)-908(N), the server(s) 910, the POS application 918, the reader device 922, the POS system 924, the server(s) 1002, the network(s) 1004, the user devices 1006, the user device(s) 1008(A)-908(N), the server(s) 1010, the payment application 1018, the data store(s) 1100, the asset storage 1102, the user account(s) 1104, the private blockchain 1119, the application programming interfaces (APIs) 1204, the network(s) 1202, the user device 1302, the server(s) 1304, the reader device(s) 1326, the datastore 1344, a computing system, an apparatus, a processor executing instructions stored in a non-transitory computer-readable storage medium, one or more components or subsets of any of the previously-listed systems, or a combination thereof. The order in which the operations of the process 800 are described is not intended to be construed as a limitation, and any number of the described blocks can be combined in any order and/or in parallel to implement the processes. In some embodiments, one or more blocks of the process 800 can be omitted entirely. Moreover, the process 800 can be combined in whole or in part with other processes, methods, actions, and/or operations described herein.

At operation 805, the hashing system is configured to, and can, store data (e.g., a plurality of words) in a plurality of data storage circuit elements. The plurality of words are to be used for hashing a message. A data storage circuit element of the plurality of data storage circuit elements is configured to store a word of the plurality of words during hashing of the message without moving the word to any other data storage circuit element of the plurality of data storage circuit elements. Examples of the plurality of data storage circuit elements include the registers 210, the registers 310, the data storage circuit elements 410, the data storage circuit elements 510, or a combination thereof.

In some examples, the plurality of data storage circuit elements at least one of a random access memory (RAM) element, a static random access memory (SRAM) element, or a dynamic random access memory (DRAM) element.

At operation 810, the hashing system is configured to, and can, select, using one or more combinational logic circuit elements, specified data storage circuit elements of the plurality of data storage circuit elements. The one or more combinational logic circuit elements are configured to select the specified data storage circuit elements according to a specified order that simulates shifting of at least a subset of the plurality of words among at least a subset of the plurality of data storage circuit elements. In some examples, the specified order changes throughout hashing the message. In some examples, the one or more combinational logic circuit elements are configured to select the specified data storage circuit elements based on an order in which the plurality of words are stored in the plurality of data storage circuit elements.

In some examples, the one or more combinational logic circuit elements include one or more multiplexers and/or demultiplexers, such as at least one of the multiplexer 215, the multiplexers 315, the multiplexers 420A-420D, the multiplexers 520A-520F, the multiplexers 590A-590B, the demultiplexer 455, the demultiplexers 555A-555B, the demultiplexers 585A-585B, or a combination thereof.

In some examples, the one or more combinational logic circuit elements are configured to select the specified words based also on a clock input (e.g., selection 470, selection 475, control 480, selection 570, selection 575, control 580, line for clock 610 in chart 600, line for clock 660 in chart 650) received from a clock circuit element (e.g., clock 465, clock 565, clock 610, clock 660).

In some examples, the order of selection of the specified words and/or data storage circuit elements changes throughout hashing the message to simulate shifting of at least a subset of the plurality of words among at least a subset of the plurality of data storage circuit elements (e.g., to simulate shifting of words between various registers of the registers 210 of the ME 200 and/or to simulate shifting of words between various registers of the registers 310 of the MC 300).

In some examples, the hashing system includes a timing circuit to synchronize selection of the specified data storage circuit elements according to the specified order. In some examples, the hashing system includes a delay circuit to delay selection of the specified data storage circuit elements based on whether a cycle generates a valid word. Examples of the timing circuit, and/or of the delay circuit, include the control unit 460, the clock 465, control unit 560, the clock 565, the clock 610, the clock 660, or a combination thereof.

At operation 815, the hashing system is configured to, and can, generate one or more additional words based on input into one or more computational operators of the specified words that are selected by the one or more combinational logic circuit elements. Examples of the one or more additional words include at least a subset of the words Wj 115, at least a subset of the output words 135, words Wj 250 generated using the computational operators 220, word(s) generated using the computational operators 320 for input into register a, word(s) generated using the computational operators 320 for input into register e, the "next words Wj" output by the compute unit 425 (e.g., the result(s) of the adder 445), the next "e" word(s) output by the compute unit 525 (e.g., the result(s) of the adder 545C), the next "a" word(s) output by the compute unit 525 (e.g., the result(s) of the adder 545D), or a combination thereof. Examples of the one or more computational operators include the computational operators 220, the $\sigma_0$ operator 230, the $\sigma_1$ operator 235, one or more of the adders of the computational operators 220, the computational operators 320, the $\Sigma_0$ operator 330, the $\Sigma_1$ operator 335, the majority (Maj) operator 340, the choice (ch) operator 345, one or more of the adder operators of the computational operators 320, one or more of the computational operators of the compute unit 425, the $\sigma_0$ operator 435, $\sigma_1$ operator 440, the adder 445, one or more of the computational operators of the compute unit 525, the $\Sigma_0$ operator 535A, the $\Sigma_1$ operator 535B, the majority (Maj)

operator 540A, the choice (ch) operator 540B, the adder 545A, the adder 545B, the adder 545C, the adder 545D, or a combination thereof.

At operation 820, the hashing system is configured to, and can, store the one or more additional words in one or more available data storage circuit elements of the plurality of data storage circuit elements. The one or more additional words are configured to be used for hashing the message.

In some examples, the hashing system is, and/or includes, a message expander (ME), such as the ME 120, the ME 200, the ME 390, the ME 400A, the ME 400B, or a combination thereof. In some examples, the one or more additional words are configured to be output from the ME to a message compressor (MC) that generates a hash for the message.

In some examples, the hashing system is, and/or includes, a message compressor (MC), such as the MC 130, the MC 290, the MC 300, the MC 500A, the MC 500B, or a combination thereof. In some examples, the one or more additional words are configured to be part of a hash for the message (e.g., part of the output words 135 and/or the hash digest 140).

In some examples, the one or more combinational logic circuit elements are also configured to select the one or more available data storage circuit elements of the plurality of data storage circuit elements for the one or more additional words to be stored in. For instance, in some examples, the one or more combinational logic circuit elements include one or more demultiplexers, such as at least one of the demultiplexer 455, the demultiplexers 555A-555B, the demultiplexers 585A-585B, or a combination thereof.

In some examples, the one or more additional words are configured to overwrite one or more prior words of the plurality of words by being stored in the one or more available data storage circuit elements. Examples of the one or more additional words overwriting one or more prior words are described with respect to the ME 400B of FIG. 4B and/or the MC 500B of FIG. 5B.

In some examples, the one or more available data storage circuit elements do not store any of the plurality of words prior to storage of the one or more additional words in the one or more available data storage circuit elements. Examples of the one or more additional words being stored where no prior words have yet been stored are described with respect to the ME 400A of FIG. 4A, the ME 400B of FIG. 4B, the MC 500A of FIG. and/or the MC 500B of FIG. 5B.

In some examples, the message includes at least a portion of a first block of a distributed ledger (e.g., the blockchain ledger 700, the DAG ledger described with respect to FIG. 7, the private blockchain 1119, or a combination thereof). In some examples, hashing the message includes generating a hash to be stored in a second block of the distributed ledger. For example, the first block can be the block A 705, and the hash can be the hash of the previous block (e.g., of block A 705) and/or the hash of the block header 710 of block A 705 in the block B header 740 of block B 735 (which would then be the second block), a hash in the Merkle root 750 in the block B 735 (which would then be the second block), a hash in the Merkle root 780 in the block C 765 (which would then be the second block), or a combination thereof.

In some examples, the hashing system can hash the message using SHA-256, SHA-512, SHA-0, SHA-1, SHA-2, SHA-3, MD1, MD2, MD3, MD4, MD5, SHAKE128, SHAKE256, another hash format, another message digest format, or a combination thereof.

FIG. 8B is a flow diagram illustrating a hashing process 850. In some examples, the hashing process 850 is performed by a hashing system. The hashing system can include, for instance, the hashing engine 100, the message expander (ME) 120, the message compressor (MC) 130, the ME 200, the MC 290, the MC 300, the ME 390, the ME 400A, the ME 400B, the MC 500A, the MC 500B, the clock 610, the word line 620, the bit line 630, the clock 660, the word line 670, the bit line 680, the blockchain ledger 700, the hashing system that performs the hashing process 800, the server(s) 902, the network(s) 904, the user devices 906, the merchant device(s) 908(A)-908(N), the server(s) 910, the POS application 918, the reader device 922, the POS system 924, the server(s) 1002, the network(s) 1004, the user devices 1006, the user device(s) 1008(A)-908(N), the server(s) 1010, the payment application 1018, the data store(s) 1100, the asset storage 1102, the user account(s) 1104, the private blockchain 1119, the application programming interfaces (APIs) 1204, the network(s) 1202, the user device 1302, the server(s) 1304, the reader device(s) 1326, the datastore 1344, a computing system, an apparatus, a processor executing instructions stored in a non-transitory computer-readable storage medium, one or more components or subsets of any of the previously-listed systems, or a combination thereof. The order in which the operations of the process 800 are described is not intended to be construed as a limitation, and any number of the described blocks can be combined in any order and/or in parallel to implement the processes. In some embodiments, one or more blocks of the process 800 can be omitted entirely. Moreover, the process 800 can be combined in whole or in part with other processes, methods, actions, and/or operations described herein.

The hashing system is configured to, and can, perform operations 805, 815, and 820 as described with respect to the hashing process 800.

At operation 855, the hashing system is configured to, and can, determine whether specified data storage circuit elements (of the plurality of data storage circuit elements) store valid word data. If, at operation 855, the hashing system determines that the specified data storage circuit elements do not store valid word data, then the hashing system performs operation 860. If, at operation 855, the hashing system determines that the specified data storage circuit elements do store valid word data, then the hashing system performs operation 865.

At operation 860, the hashing system is configured to, and can, check other specified data storage elements, meaning that another subset of the plurality of data storage elements is now referred to as the specified data storage circuit elements. The hashing system can then repeat operation 855, to determine whether the new specified data storage circuit elements store valid word data.

At operation 865, the hashing system is configured to, and can select, using one or more combinational logic circuit elements, the specified data storage circuit elements (that include the valid word data) of the plurality of data storage circuit elements. Operations 855, 860, and/or 865 of the hashing process 850 can be examples of operation 810 of the hashing process 800. Operation 810 of the hashing process 800 can be an example of operations 855, 860, and/or 865 of the hashing process 850.

In some examples, the one or more combinational logic circuit elements are configured to select the specified data storage circuit elements according to a specified order that simulates shifting of at least a subset of the plurality of words among at least a subset of the plurality of data storage circuit elements. In some examples, the specified order changes throughout hashing the message. In some examples, the one or more combinational logic circuit elements are configured to select the specified data storage circuit elements based on an order in which the plurality of words are stored in the plurality of data storage circuit elements.

In some examples, the one or more combinational logic circuit elements include one or more multiplexers and/or demultiplexers, such as at least one of the multiplexer 215, the multiplexers 315, the multiplexers 420A-420D, the multiplexers 520A-520F, the multiplexers 590A-590B, the demultiplexer 455, the demultiplexers 555A-555B, the demultiplexers 585A-585B, or a combination thereof.

In some examples, the one or more combinational logic circuit elements are configured to select the specified words based also on a clock input (e.g., selection 470, selection 475, control 480, selection 570, selection 575, control 580, line for clock 610 in chart 600, line for clock 660 in chart 650) received from a clock circuit element (e.g., clock 465, clock 565, clock 610, clock 660).

In some examples, the order of selection of the specified words and/or data storage circuit elements changes throughout hashing the message to simulate shifting of at least a subset of the plurality of words among at least a subset of the plurality of data storage circuit elements (e.g., to simulate shifting of words between various registers of the registers 210 of the ME 200 and/or to simulate shifting of words between various registers of the registers 310 of the MC 300).

In some examples, the hashing system includes a timing circuit to synchronize selection of the specified data storage circuit elements according to the specified order. In some examples, the hashing system includes a delay circuit to delay selection of the specified data storage circuit elements based on whether a cycle generates a valid word. Examples of the timing circuit, and/or of the delay circuit, include the control unit 460, the clock 465, control unit 560, the clock 565, the clock 610, the clock 660, or a combination thereof.

In some examples, after operation 820, the hashing system is configured to, and can, loop back to operation 855. For instance, after the hashing system generates and stores the one or more additional words in the one or more available data storage circuit elements, a different subset of the plurality data storage circuit elements may store valid word data than before the storage of the one or more additional words in the one or more available data storage elements. For instance, by the time the ME 400A is generating (using the compute unit 425) and storing additional words (that will be valid word data) in data storage circuit elements W32 through W63, the data storage circuit elements W0 through W15 may in some cases no longer store valid word data. Similarly, by the time the MC 500A is generating (using the compute unit 525) and storing additional words (that will be valid word data) in data storage circuit elements a56 through a63, the data storage circuit elements a0 through a7 may in some cases no longer store valid word data.

In some examples, after operation 820, the hashing system is configured to, and can, output a set of output words. The set of output words can include, and/or can be based on, at least one of the one or more additional words that are generated and stored by the hashing system in operations 815 and 820. If the hashing system includes an ME (e.g., ME 120, ME 200, ME 400A, and/or ME 400B), then examples of the set of output words may include the words Wj 115, the words Wj 250, and/or the next word Wj of FIGS. 4A-4B. If the hashing system includes an MC (e.g., MC 130, MC 300, MC 500A, and/or MC 500B), then examples of the set of output words may include the output words 135, the hash digest 140, words stored in at least some of the registers 310 after message compression, the next "e" data of FIGS. 5A-5B, and/or the next "a" data of FIGS. 5A-5B. For instance, in some examples, the hashing system is configured to, and can, loop back from operation 820 to operation 855 several times until message expansion is complete and/or message compression is complete, and then progress from operation 820 to operation 870.

Figure 9:
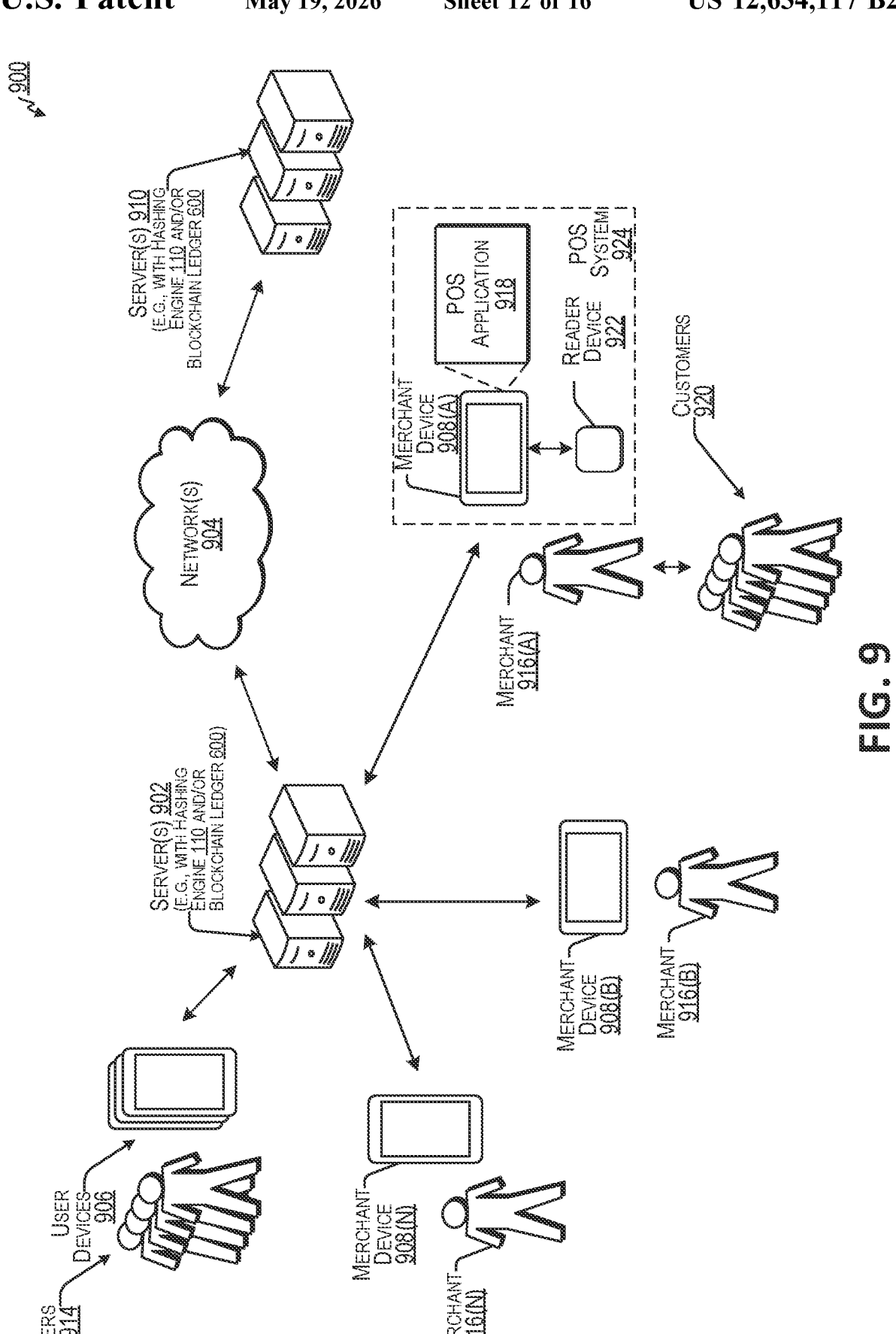
FIG. 9 is a block diagram illustrating an environment that includes various devices associated with one or more merchants, in accordance with some examples.

FIG. 9 is a block diagram illustrating an environment 900 that includes various devices associated with one or more merchants. The environment 900 includes server(s) 902 that can communicate over a network 904 with user devices 906 (which, in some examples can be merchant devices 908 (individually, 908(A)-908(N))) and/or server(s) 910 associated with third-party service provider(s). The server(s) 902 can be associated with a service provider that can provide one or more services for the benefit of users 914, as described below. Actions attributed to the service provider can be performed by the server(s) 902.

In some examples, any of the systems and/or elements in the environment 900 (e.g., the server(s) 902, the network(s) 904, the user devices 906, the merchant device(s) 908(A)-908(N), the server(s) 910, the POS application 918, the reader device 922, and/or the POS system 924) can include, run, generate hashes using, store hashes generated using, generate words using, store words generated using, and/or access the hashing engine 100, the message expander (ME) 120, the message compressor (MC) 130, the ME 200, the MC 290, the MC 300, the ME 390, the ME 400A, the ME 400B, the MC 500A, the MC 500B, the clock 610, the word line 620, the bit line 630, the clock 660, the word line 670, the bit line 680, the blockchain ledger 700, or a combination thereof.

The environment 900 can include a plurality of user devices 906, as described above. Each one of the plurality of user devices 906 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 914. The users 914 can be referred to as customers, buyers, merchants, sellers, borrowers, employees, employers, payors, payees, couriers and so on. The users 914 can interact with the user devices 906 via user interfaces presented via the user devices 906. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 906 can have an instance or versioned instance of an application, which can be downloaded from an application store, for example, which can present the user interface(s) described herein. In at least one example, a user 914 can interact with the user interface via touch input, spoken input, or any other type of input.

As described above, in at least one example, the users 914 can include merchants 916 (individually, 916(A)-916(N)). In an example, the merchants 916 can operate respective merchant devices 908, which can be user devices 906 configured for use by merchants 916. For the purpose of this discussion, a "merchant" can be any entity that offers items (e.g., goods or services) for purchase or other means of acquisition (e.g., rent, borrow, barter, etc.). The merchants 916 can offer items for purchase or other means of acqui- sition via brick-and-mortar stores, mobile stores (e.g., pop- up shops, food trucks, etc.), online stores, combinations of the foregoing, and so forth. In some examples, at least some of the merchants 916 can be associated with a same entity but can have different merchant locations and/or can have franchise/franchisee relationships. In additional or alterna- tive examples, the merchants 916 can be different mer- chants. That is, in at least one example, the merchant 916(A) is a different merchant than the merchant 916(B) and/or the merchant 916(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relation- ships. Such merchants—with various merchant locations or franchise/franchisee relationships—can be referred to as merchants having different merchant locations and/or dif- ferent commerce channels.

Each merchant device 908 can have an instance of a POS application 918 stored thereon. The POS application 918 can configure the merchant device 908 as a POS terminal, which enables the merchant 916(A) to interact with one or more customers 920. As described above, the users 914 can include customers, such as the customers 920 shown as interacting with the merchant 916(A). For the purpose of this discussion, a "customer" can be any entity that acquires items from merchants. While only two customers 920 are illustrated in FIG. 9, any number of customers 920 can interact with the merchants 916. Further, while FIG. 9 illustrates the customers 920 interacting with the merchant 916(A), the customers 920 can interact with any of the merchants 916.

In at least one example, interactions between the custom- ers 920 and the merchants 916 that involve the exchange of funds (from the customers 920) for items (from the mer- chants 916) can be referred to as "transactions." In at least one example, the POS application 918 can determine trans- action data associated with the POS transactions. Transac- tion data can include payment information, which can be obtained from a reader device 922 associated with the merchant device 908(A), user authentication data, purchase amount information, point-of-purchase information (e.g., item(s) purchased, date of purchase, time of purchase, etc.), etc. The POS application 918 can send transaction data to the server(s) 902 such that the server(s) 902 can track transac- tions of the customers 920, merchants 916, and/or any of the users 914 over time. Furthermore, the POS application 918 can present a UI to enable the merchant 916(A) to interact with the POS application 918 and/or the service provider via the POS application 918.

In at least one example, the merchant device 908(A) can be a special-purpose computing device configured as a POS terminal (via the execution of the POS application 918). In at least one example, the POS terminal may be connected to a reader device 922, which is capable of accepting a variety of payment instruments, such as credit cards, debit cards, gift cards, short-range communication based payment instruments, and the like, as described below. In at least one example, the reader device 922 can plug in to a port in the merchant device 908(A), such as a microphone port, a headphone port, an audio-jack, a data port, or other suitable port. In additional or alternative examples, the reader device 922 can be coupled to the merchant device 908(A) via another wired or wireless connection, such as via a Blu- etooth®, BLE, and so on. Additional details are described below with reference to FIG. 12. In some examples, the reader device 922 can read information from alternative payment instruments including, but not limited to, wrist- bands and the like.

In some examples, the reader device 922 may physically interact with payment instruments such as magnetic stripe payment cards, EMV payment cards, and/or short-range communication (e.g., near field communication (NFC), radio frequency identification (RFID), Bluetooth®, Blu- etooth® low energy (BLE), etc.) payment instruments (e.g., cards or devices configured for tapping). The POS terminal may provide a rich user interface, communicate with the reader device 922, and communicate with the server(s) 902, which can provide, among other services, a payment pro- cessing service. The server(s) 902 associated with the ser- vice provider can communicate with server(s) 910, as described below. In this manner, the POS terminal and reader device 922 may collectively process transaction(s) between the merchants 916 and customers 920. In some examples, POS terminals and reader devices can be config- ured in one-to-one pairings. In other examples, the POS terminals and reader devices can be configured in many-to- one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house sys- tems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the pri- mary or secondary terminal switches to online mode. In other examples, such data synchronization may happen periodically or at randomly selected time intervals.

While the POS terminal and the reader device 922 of the POS system 924 are shown as separate devices, in additional or alternative examples, the POS terminal and the reader device 922 can be part of a single device. In some examples, the reader device 922 can have a display integrated therein for presenting information to the customers 920. In addi- tional or alternative examples, the POS terminal can have a display integrated therein for presenting information to the customers 920. POS systems, such as the POS system 924, may be mobile, such that POS terminals and reader devices may process transactions in disparate locations across the world. POS systems can be used for processing card-present transactions and card-not-present (CNP) transactions, as described below.

A card-present transaction is a transaction where both a customer 920 and his or her payment instrument are physi- cally present at the time of the transaction. Card-present transactions may be processed by swipes, dips, taps, or any other interaction between a physical payment instrument (e.g., a card), or otherwise present payment instrument, and a reader device 922 whereby the reader device 922 is able to obtain payment data from the payment instrument. A swipe is a card-present transaction where a customer 920 slides a card, or other payment instrument, having a magnetic strip through a reader device 922 that captures payment data contained in the magnetic strip. A dip is a card-present transaction where a customer 920 inserts a payment instrument having an embedded microchip (i.e., chip) into a reader device 922 first. The dipped payment instrument remains in the payment reader until the reader device 922 prompts the customer 920 to remove the card, or other payment instrument. While the payment instrument is in the reader device 922, the microchip can create a one-time code which is sent from the POS system 924 to the server(s) 910 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 920 may tap or hover his or her payment instrument (e.g., card, electronic device such as a smart phone running a payment application, etc.) over a reader device 922 to complete a transaction via short-range communication (e.g., NFC, RFID, Bluetooth®, BLE, etc.). Short-range communication enables the payment instrument to exchange information with the reader device 922. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 924, the server(s) 902, and/or the server(s) 910 may exchange payment information and transaction data to determine whether transactions are authorized. For example, the POS system 924 may provide encrypted payment data, user authentication data, purchase amount information, point-of-purchase information, etc. (collectively, transaction data) to server(s) 902 over the network(s) 904. The server(s) 902 may send the transaction data to the server(s) 910. As described above, in at least one example, the server(s) 910 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 910 associated therewith) can send a fund transfer request to a server computing device of a card payment network (e.g., Mastercard®, VISA®, etc.) to determine whether the transaction is authorized or deficient. In at least one example, the service provider can serve as an acquirer and connect directly with the card payment network.

The card payment network (e.g., the server(s) 910 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 910 associated therewith)

can make a determination as to whether the customer has the capacity to absorb the relevant charge associated with the payment transaction. In at least one example, the service provider can serve as an issuer and/or can partner with an issuer. The transaction is either approved or rejected by the issuer and/or the card payment network (e.g., the server(s) 910 associated therewith), and a payment authorization message is communicated from the issuer to the POS device via a path opposite of that described above, or via an alternate path.

As described above, the server(s) 910, which can be associated with payment service provider(s), may determine whether the transaction is authorized based on the transaction data, as well as information relating to parties to the transaction (e.g., the customer 920 and/or the merchant 916(A)). The server(s) 910 may send an authorization notification over the network(s) 904 to the server(s) 902, which may send the authorization notification to the POS system 924 over the network(s) 904 to indicate whether the transaction is authorized. The server(s) 902 may also transmit additional information such as transaction identifiers to the POS system 924. In one example, the server(s) 902 may include a merchant application and/or other functional components for communicating with the POS system 924 and/or the server(s) 910 to authorize or decline transactions.

Based on the authentication notification that is received by the POS system 924 from server(s) 902, the merchant 916(A) may indicate to the customer 920 whether the transaction has been approved. In some examples, approval may be indicated at the POS system 924, for example, at a display of the POS system 924. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, and so on. In some examples, the users 914 can access all of the services of the service provider. In other examples, the users 914 can have gradated access to the services, which can be based on risk tolerance, IDV outputs, subscriptions, and so on. In at least one example, access to such services can be availed to the merchants 916 via the POS application 918. In additional or alternative examples, each service can be associated with its own access point (e.g., application, web browser, etc.).

The service provider can offer payment processing services for processing payments on behalf of the merchants 916, as described above. For example, the service provider can provision payment processing software, payment processing hardware and/or payment processing services to merchants 916, as described above, to enable the merchants 916 to receive payments from the customers 920 when conducting POS transactions with the customers 920. For instance, the service provider can enable the merchants 916 to receive cash payments, payment card payments, and/or electronic payments from customers 920 for POS transactions and the service provider can process transactions on behalf of the merchants 916.

As the service provider processes transactions on behalf of the merchants 916, the service provider can maintain accounts or balances for the merchants 916 in one or more ledgers. For example, the service provider can analyze transaction data received for a transaction to determine an amount of funds owed to a merchant 916(A) for the transaction. In at least one example, such an amount can be a total purchase price less fees charged by the service provider for providing the payment processing services. Based on determining the amount of funds owed to the merchant 916(A), the service provider can deposit funds into an account of the merchant 916(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument.

A scheduled deposit can occur when the service provider transfers funds associated with a stored balance of the merchant 916(A) to a bank account of the merchant 916(A) that is held at a bank or other financial institution (e.g., associated with the server(s) 910). Scheduled deposits can occur at a prearranged time after a POS transaction is funded, which can be a business day after the POS transaction occurred, or sooner or later. In some examples, the merchant 916(A) can access funds prior to a scheduled deposit. For instance, the merchant 916(A) may have access to same-day deposits (e.g., wherein the service provider deposits funds from the stored balance to a linked bank account of the merchant on a same day as POS transaction, in some examples prior to the POS transaction being funded) or instant deposits (e.g., wherein the service provider deposits funds from the stored balance to a linked bank account of the merchant on demand, such as responsive to a request). Further, in at least one example, the merchant 916(A) can have a payment instrument that is linked to the stored balance that enables the merchant to access the funds without first transferring the funds from the account managed by the service provider to the bank account of the merchant 916(A).

In at least one example, the service provider may provide inventory management services. That is, the service provider may provide inventory tracking and reporting. Inventory management services may enable the merchant 916(A) to access and manage a database storing data associated with a quantity of each item that the merchant 916(A) has available (i.e., an inventory). Furthermore, in at least one example, the service provider can provide catalog management services to enable the merchant 916(A) to maintain a catalog, which can be a database storing data associated with items that the merchant 916(A) has available for acquisition (i.e., catalog management services). In at least one example, the catalog may include a plurality of data items and a data item of the plurality of data items may represent an item that the merchant 9121(A) has available for acquisition. The service provider can offer recommendations related to pricing of the items, placement of items on the catalog, and multi-party fulfilment of the inventory.

In at least one example, the service provider can provide business banking services, which allow the merchant 916(A) to track deposits (from payment processing and/or other sources of funds) into an account of the merchant 916(A), payroll payments from the account (e.g., payments to employees of the merchant 916(A)), payments to other merchants (e.g., business-to-business) directly from the account or from a linked debit card, withdrawals made via scheduled deposit and/or instant deposit, etc. Furthermore, the business banking services can enable the merchant 916(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 916 to visualize their cash flow to track their financial health, set aside money for upcoming obligations (e.g., savings), organize money around goals, etc.

In at least one example, the service provider can provide financing services and products, such as via business loans, consumer loans, fixed term loans, flexible term loans, and the like. In at least one example, the service provider can utilize one or more risk signals to determine whether to extend financing offers and/or terms associated with such financing offers.

In at least one example, the service provider can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally and/or alternatively, the service provider can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 916. The service provider can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider (e.g., from payments owed to the merchant from payments processed on behalf of the merchant, funds transferred to the merchant, etc.). The service provider can offer specific financial products, such as payment instruments, tied specifically to the loan products. For example, in one implementation, the server provider 912 associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider can provide web-development services, which enable users 914 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 916. In at least one example, the service provider can recommend and/or generate content items to supplement omni-channel presences of the merchants 916. That is, if a merchant of the merchants 916 has a web page, the service provider—via the web-development or other services—can recommend and/or generate additional content items to be presented via other channel(s), such as social media, email, etc.

Furthermore, the service provider can provide payroll services to enable employers to pay employees for work performed on behalf of employers. In at least one example, the service provider can receive data that includes time worked by an employee (e.g., through imported timecards and/or POS interactions), sales made by the employee, gratuities received by the employee, and so forth. Based on such data, the service provider can make payroll payments to employee(s) on behalf of an employer via the payroll service. For instance, the service provider can facilitate the transfer of a total amount to be paid out for the payroll of an employee from the bank of the employer to the bank of the service provider to be used to make payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk and/or reliability analyses performed by the service provider.

Moreover, in at least one example, the service provider can provide employee management services for managing schedules of employees. Further, the service provider can provide appointment services for enabling users 914 to set schedules for scheduling appointments and/or users 914 to schedule appointments.

In some examples, the service provider can provide restaurant management services to enable users 914 to make and/or manage reservations, to monitor front-of-house and/or back-of-house operations, and so on. In such examples, the merchant device(s) 908 and/or server(s) 902 can be configured to communicate with one or more other computing devices, which can be located in the front-of-house (e.g., POS device(s)) and/or back-of-house (e.g., kitchen display system(s) (KDS)). In at least one example, the service provider can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider can provide fulfilment services, which can use couriers for delivery, wherein couriers can travel between multiple locations to provide delivery services, photography services, etc. Couriers can be users 914 who can travel between locations to perform services for a requesting user 914 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 906.

In some examples, the service provider can provide omni-channel fulfillment services. For instance, if a customer places an order with a merchant and the merchant cannot fulfill the order because one or more items are out of stock or otherwise unavailable, the service provider can leverage other merchants and/or sales channels that are part of the platform of the service provider to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider can enable conversational commerce via conversational commerce services, which can use one or more machine learning mechanisms to analyze messages exchanged between two or more users 914, voice inputs into a virtual assistant or the like, to determine intents of user(s) 914. In some examples, the service provider can utilize determined intents to automate customer service, offer promotions, provide recommendations, or otherwise interact with customers in real-time. In at least one example, the service provider can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 914 may be new to the service provider such that the user 914 that has not registered (e.g., subscribed to receive access to one or more services offered by the service provider) with the service provider. The service provider can offer onboarding services for registering a potential user 914 with the service provider. In some examples, onboarding can involve presenting various questions, prompts, and the like to a potential user 914 to obtain information that can be used to generate a profile for the potential user 914. In at least one example, the service provider can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 914 providing all necessary information, the potential user 914 can be onboarded to the service provider. In such an example, any limited or short-term access to services of the service provider can be transitioned to more permissive (e.g., less limited) or longer-term access to such services.

The service provider can be associated with IDV services, which can be used by the service provider for compliance purposes and/or can be offered as a service, for instance to third-party service providers (e.g., associated with the server(s) 910). That is, the service provider can offer IDV services to verify the identity of users 914 seeking to use or using their services. Identity verification requires a customer (or potential customer) to provide information that is used by compliance departments to prove that the information is associated with an identity of a real person or entity. In at least one example, the service provider can perform services for determining whether identifying information provided by a user 914 accurately identifies the customer (or potential customer) (i.e., Is the customer who they say they are?).

The service provider is capable of providing additional or alternative services and the services described above are offered as a sampling of services. In at least one example, the service provider can exchange data with the server(s) 910 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider.

Techniques described herein can be configured to operate in both real-time/online and offline modes. "Online" modes refer to modes when devices are capable of communicating with the service provider (e.g., the server(s) 902) and/or the server(s) 910 via the network(s) 904. In some examples, the merchant device(s) 908 are not capable of connecting with the service provider (e.g., the server(s) 902) and/or the server(s) 910, due to a network connectivity issue, for example. In additional or alternative examples, the server(s) 902 are not capable of communicating with the server(s) 910 due to network connectivity issue, for example. In such examples, devices may operate in "offline" mode where at least some payment data is stored (e.g., on the merchant device(s) 908) and/or the server(s) 902 until connectivity is restored and the payment data can be transmitted to the server(s) 902 and/or the server(s) 910 for processing.

In at least one example, the service provider can be associated with a hub, such as an order hub, an inventory hub, a fulfillment hub and so on, which can enable integration with one or more additional service providers (e.g., associated with the additional server(s) 910). In some examples, such additional service providers can offer additional or alternative services and the service provider can provide an interface or other computer-readable instructions to integrate functionality of the service provider into the one or more additional service providers.

Techniques described herein are directed to services provided via a distributed system of user devices 906 that are in communication with one or more server computing devices 902 of the service provider. That is, techniques described herein are directed to a specific implementation—or, a practical application—of utilizing a distributed system of user devices 906 that are in communication with one or more server computing devices 902 of the service provider to perform a variety of services, as described above. The unconventional configuration of the distributed system described herein enables the server(s) 902 that are remotely-located from end-users (e.g., users 914) to intelligently offer services based on aggregated data associated with the end-users, such as the users 914 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider, and those outside of the control of the service provider, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 914 and user devices 906. Furthermore, such features are changed dynamically based on the profiles of the users involved interacting with the GUIs. As such, techniques described herein are directed to improvements to computing systems.

Figure 10:
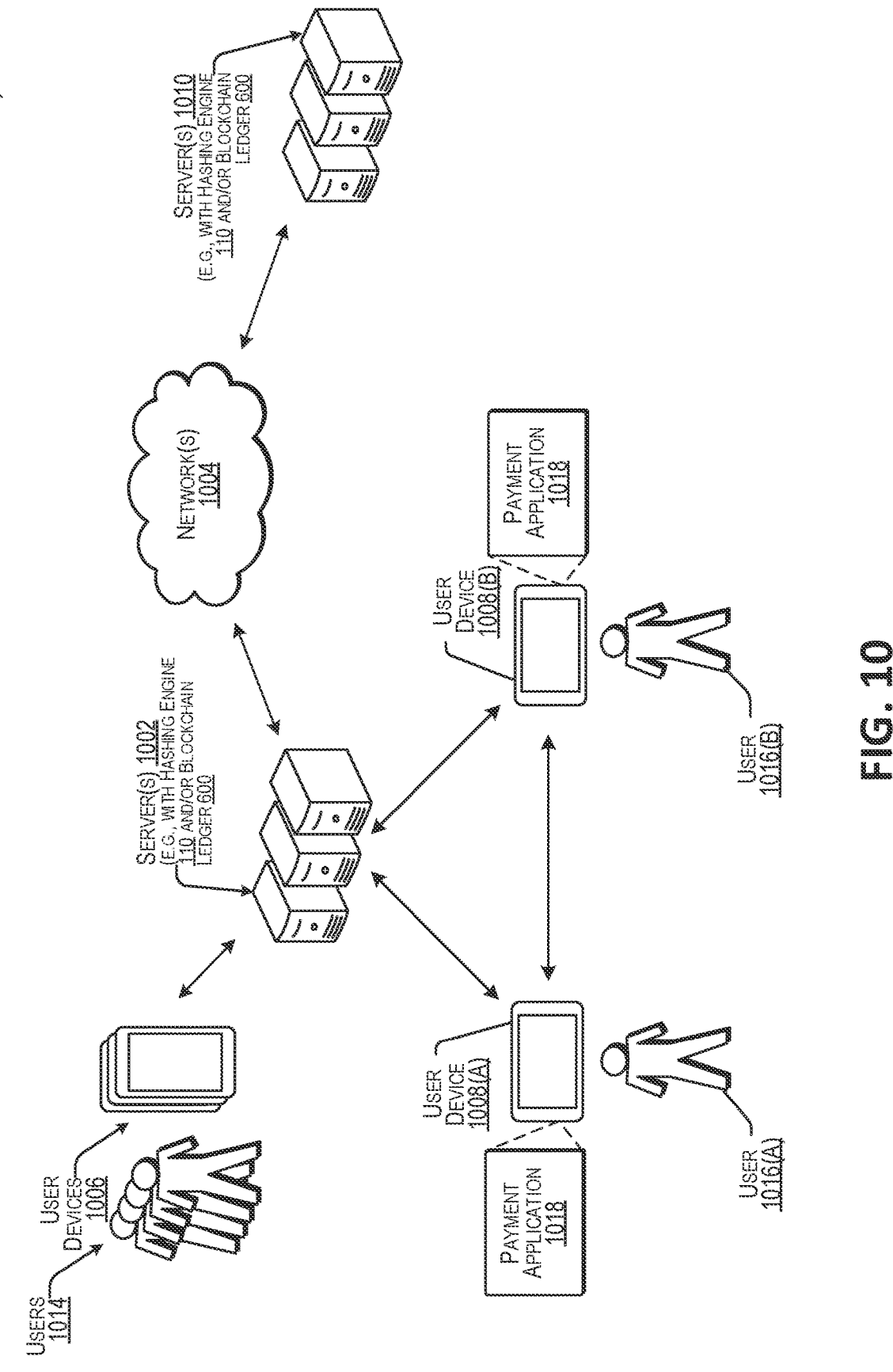
FIG. 10 is a block diagram illustrating an environment that includes various device associated with one or more payment services, in accordance with some examples.

FIG. 10 is a block diagram illustrating an environment 1000 that includes various devices associated with one or more payment services. The environment 1000 includes server(s) 1002 that can communicate over a network 1004 with user devices 1006 (which, in some examples can be user devices 1008 (individually, 1008(A), 1008(B)) and/or server(s) 1010 associated with third-party service provider(s). The server(s) 1002 can be associated with a service provider that can provide one or more services for the benefit of users 1014, as described below. Actions attributed to the service provider can be performed by the server(s) 1002. In some examples, the service provider referenced in FIG. 9 can be the same or different than the service provider referenced in FIG. 10.

In some examples, any of the systems and/or elements in the environment 1000 (e.g., the server(s) 1002, the network(s) 1004, the user devices 1006, the user device(s) 1008(A)-908(N), the server(s) 1010, and/or the payment application 1018,) can include, run, generate hashes using, store hashes generated using, generate words using, store words generated using, and/or access the hashing engine 100, the message expander (ME) 120, the message compressor (MC) 130, the ME 200, the MC 290, the MC 300, the ME 390, the ME 400A, the ME 400B, the MC 500A, the MC 500B, the clock 610, the word line 620, the bit line 630, the clock 660, the word line 670, the bit line 680, the blockchain ledger 700, or a combination thereof.

The environment 1000 can include a plurality of user devices 1006, as described above. Each one of the plurality of user devices 1006 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1014. The users 1014 can be referred to as customers, buyers, merchants, sellers, borrowers, employees, employers, payors, payees, couriers and so on. The users 1014 can interact with the user devices 1006 via user interfaces presented via the user devices 1006. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1006 can have an instance or versioned instance of an application, which can be downloaded from an application store, for example, which can present the user interface(s) described herein. In at least one example, a user 1014 can interact with the user interface via touch input, spoken input, or any other type of input.

In at least one example, the service provider can provide a peer-to-peer payment service that enables peer-to-peer payments between two or more users 1014. Two users, user 1016(A) and user 1016(B) are illustrated in FIG. 10 as "peers" in a peer-to-peer payment. In at least one example, the service provider can communicate with instances of a payment application 1018 (or other access point) installed on devices 1006 configured for operation by users 1014. In an example, an instance of the payment application 1018 executing on a first device 1008(A) operated by a payor (e.g., user 1016(A)) can send a request to the service provider to transfer an asset (e.g., fiat currency, non-fiat currency, cryptocurrency, securities, gift cards, and/or related assets) from the payor to a payee (e.g., user 1016(B)) via a peer-to-peer payment. In some examples, assets associated with an account of the payor are transferred to an account of the payee. In some examples, assets can be held at least temporarily in an account of the service provider prior to transferring the assets to the account of the payee.

In some examples, the service provider can utilize a ledger system to track transfers of assets between users 1006.

FIG. 11 is a block diagram illustrating a ledger system. The ledger system of FIG. 11 may provide additional details associated with a ledger system that may be used with the systems of FIG. 9 and/or FIG. 10. The ledger system can enable users 1006 to own fractional shares of assets that are not conventionally available. For instance, a user can own a fraction of a Bitcoin or a stock. Additional details are described herein.

In at least one example, the service provider can facilitate transfers and can send notifications related thereto to instances of the payment application 1018 executing on user device(s) of payee(s). As an example, the service provider can transfer assets from an account of user 1016(A) to an account of the user 1016(B) and can send a notification to the user device 1008(B) of the user 1016(B) for presentation via a user interface. The notification can indicate that a transfer is in process, a transfer is complete, or the like. In some examples, the service provider can send additional or alternative information to the instances of the payment application 1018 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the service provider funds the request to payee on behalf of the payor, to speed up the transfer process and compensate for any lags that may be attributed to the payor's financial network.

In some examples, the service provider can trigger the peer-to-peer payment process through identification of a "payment proxy" having a particular syntax. For example, the syntax can include a monetary currency indicator prefixing one or more alphanumeric characters (e.g., $Cash). The currency indicator operates as the tagging mechanism that indicates to the server(s) 1002 to treat the inputs as a request from the payor to transfer assets, where detection of the syntax triggers a transfer of assets. The currency indicator can correspond to various currencies including but not limited to, dollar ($), euro (€), pound (£), rupee (₹ ), yuan (¥), etc. Although use of the dollar currency indicator ($) is used herein, it is to be understood that any currency symbol could equally be used. In some examples, additional or alternative identifiers can be used to trigger the peer-to-peer payment process. For instance, email, telephone number, social media handles, and/or the like can be used to trigger and/or identify users of a peer-to-peer payment process.

In some examples, the peer-to-peer payment process can be initiated through instances of the payment application 1018 executing on the user devices 1006. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/$Cash.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. In some examples, the content provider can be the service provider as described with reference to FIG. 10 or a third-party service provider associated with the server(s) 1010. In examples where the content provider is a third-party service provider, the server(s) 1010 can be accessible via one or more APIs or other integrations. The forum can be employed by a content provider to enable users of the forum to interact with one another (e.g., through creating messages, posting comments, etc.). In some examples, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the service provider referenced in FIG. 10. For instance, the service provider can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1006 (e.g., mobile device or conventional personal computer (PC)) based on instructions transmitted to and from the server(s) 1002 (which, in such an example can be called a "messaging server"). In some instances, the messaging application can include a payment application with messaging capability that enables users of the payment application to communicate with one another. In such instances, the payment application can be executed on a user device 1006 based on instructions transmitted to and from the server(s) 1002 (e.g., the payment service discussed in this description or another payment service that supports payment transactions). In some examples, the messaging application can be provided by a third-party service provider associated with the server(s) 1010. In examples where the messaging application is a third-party service provider, the server(s) 1010 can be accessible via one or more APIs or other integrations.

As described above, the service provider can facilitate peer-to-peer transactions, which can enable users 1006 to transfer fiat currency, non-fiat currency, cryptocurrency, securities, or other assets, or portions thereof, to other users 1006. In at least one example, individual users can be associated with user accounts. Additional details associated with user accounts and the transfer of assets between users 1006 are described below with reference to FIG. 11.

Furthermore, the service provider of FIG. 10 can enable users 1006 to perform banking transactions via instances of the payment application 1018. For example, users can configure direct deposits or other deposits for adding assets to their various ledgers/balances. Further, users 1006 can configure bill pay, recurring payments, and/or the like using assets associated with their accounts. In addition to sending and/or receiving assets via peer-to-peer transactions, users 1006 buy and/or sell assets via asset networks such as cryptocurrency networks, securities networks, and/or the like.

FIG. 11 illustrates example data store(s) 1100 that can be associated with the server(s) 1002.

In at least one example, the data store(s) 1100 can store assets in an asset storage 1102, as well as data in user account(s) 1104, merchant account(s) 1106, and/or customer account(s) 1108. In at least one example, the asset storage 1102 can be used to store assets managed by the service provider of FIG. 10. In at least one example, the asset storage 1102 can be used to record whether individual of the assets are registered to users. For example, the asset storage 1102 can include an asset wallet 1110 for storing records of assets owned by the service provider of FIG. 10, such as cryptocurrency, securities, or the like, and communicating with one or more asset networks, such as cryptocurrency networks, securities networks, or the like. In some examples, the asset network can be a first-party network or a third-party network, such as a cryptocurrency exchange or the stock market. In examples where the asset network is a third-party network, the server(s) 1010 can be associated therewith. In some examples, the asset wallet 1110 can communication with the asset network via one or more components associated with the server(s) 1002.

In some examples, the example data store(s) 1100, and/or the server(s) 902, can include, run, generate hashes using, store hashes generated using, generate words using, store words generated using, and/or access the hashing engine 100, the message expander (ME) 120, the message compressor (MC) 130, the ME 200, the MC 290, the MC 300, the ME 390, the ME 400A, the ME 400B, the MC 500A, the MC 500B, the clock 610, the word line 620, the bit line 630, the clock 660, the word line 670, the bit line 680, the blockchain ledger 700, or a combination thereof. The private blockchain 1119 may be an example of the blockchain ledger 700. The blockchain ledger 700 may be an example of the private blockchain 1119.

The asset wallet 1110 can be associated with one or more addresses and can vary addresses used to acquire assets (e.g., from the asset network(s)) so that its holdings are represented under a variety of addresses on the asset network. In examples where the service provider of FIG. 10 has its own holdings of cryptocurrency (e.g., in the asset wallet 1110), a user can acquire cryptocurrency directly from the service provider of FIG. 10. In some examples, the service provider of FIG. 10 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In all of these scenarios, the buying and selling of cryptocurrency, and therefore the associated updating of the public ledger of asset network can be separate from any customer-merchant transaction or peer-to-peer transaction, and therefore not necessarily time-sensitive. This can enable batching transactions to reduce computational resources and/or costs. The service provider can provide the same or similar functionality for securities or other assets.

The asset storage 1102 may contain ledgers that store records of assignments of assets to users 1006. Specifically, the asset storage 1102 may include asset wallet 1110 (e.g., asset ledger), fiat currency ledger 1114, and other ledger(s) 1116, which can be used to record transfers of assets between users 1006 of the service provider and/or one or more third-parties (e.g., merchant network(s), payment card network(s), ACH network(s), equities network(s), the asset network, securities networks, etc.). In doing so, the asset storage 1102 can maintain a running balance of assets managed by the service provider of FIG. 10. The ledger(s) of the asset storage 1102 can further indicate some of the running balance for each of the ledger(s) stored in the asset storage 1102 is assigned or registered to one or more user account(s) 1104.

In at least one example, the asset storage 1102 can include transaction logs 1118, which can include records of past transactions involving the service provider of FIG. 10. In at least one example, transaction data, as described herein, can be stored in association with the transaction logs 1118.

In some examples, the data store(s) 1100 can store a private blockchain 1119. A private blockchain 1119 can function to record sender addresses, recipient addresses, public keys, values of cryptocurrency transferred, and/or can be used to verify ownership of cryptocurrency tokens to be transferred. In some examples, the service provider of FIG. 10 can record transactions taking place within the service provider of FIG. 10 involving cryptocurrency until the number of transactions has exceeded a determined limit (e.g., number of transactions, storage space allocation, etc.). Based at least in part on determining that the limit has been reached, the service provider of FIG. 10 can publish the transactions in the private blockchain 1119 to a public blockchain (e.g., associated with the asset network), where miners can verify the transactions and record the transactions to blocks on the public blockchain. In at least one example, the service provider of FIG. 10 can participate as miner(s) at least for its transactions to be posted to the public blockchain.

In at least one example, the data store(s) 1100 can store and/or manage accounts, such as user account(s) 1104, merchant account(s) 1106, and/or customer account(s) 1108. In at least one example, the user account(s) 1104 may store records of user accounts associated with the users 1006. In at least one example, the user account(s) 1104 can include a user account 1120, which can be associated with a user (of the users 1006). Other user accounts of the user account(s) 1104 can be similarly structured to the user account 1120, according to some examples. In other examples, other user accounts may include more or less data and/or account information than that provided by the user account 1120. In at least one example, the user account 1120 can include user account data 1128, which can include, but is not limited to, data associated with user identifying information (e.g., name, phone number, address, etc.), user identifier(s) (e.g., alphanumeric identifiers, etc.), user preferences (e.g., learned or user-specified), purchase history data (e.g., identifying one or more items purchased (and respective item information), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1128 can include account activity 1130 and user wallet key(s) 1132. The account activity 1130 may include a transaction log for recording transactions associated with the user account 1120. In some examples, the user wallet key(s) 1132 can include a public-private key-pair and a respective address associated with the asset network or other asset networks. In some examples, the user wallet key(s) 1132 may include one or more key pairs, which can be unique to the asset network or other asset networks.

In addition to the user account data 1128, the user account 1120 can include ledger(s) for account(s) managed by the service provider of FIG. 10, for the user. For example, the user account 1120 may include an asset ledger 1134, a fiat currency ledger 1136, and/or one or more other ledgers 1138. The ledger(s) can indicate that a corresponding user utilizes the service provider of FIG. 10 to manage corresponding accounts (e.g., a cryptocurrency account, a securities account, a fiat currency account, etc.). It should be noted that in some examples, the ledger(s) can be logical ledger(s) and the data can be represented in a single database. In some examples, individual of the ledger(s), or portions thereof, can be maintained by the service provider of FIG. 10.

In some examples, the asset ledger 1134 can store a balance for each of one or more cryptocurrencies (e.g., Bitcoin, Ethereum, Litecoin, etc.) registered to the user account 1120. In at least one example, the asset ledger 1134 can further record transactions of cryptocurrency assets associated with the user account 1120. For example, the user account 1120 can receive cryptocurrency from the asset network using the user wallet key(s) 1132. In some examples, the user wallet key(s) 1132 may be generated for the user upon request. User wallet key(s) 1132 can be requested by the user in order to send, exchange, or otherwise control the balance of cryptocurrency held by the service provider of FIG. 10 (e.g., in the asset wallet 1110) and registered to the user. In some examples, the user wallet key(s) 1132 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider of FIG. 10 and the value is credited as a balance in asset ledger 1134), by purchasing currency in the form associated with the account using currency in a different form (e.g., buying a value of cryptocurrency from the service provider of FIG.

10 using a value of fiat currency reflected in fiat currency ledger 206, and crediting the value of cryptocurrency in asset ledger 1134), or by conducting a transaction with another user (customer or merchant) of the service provider of FIG. 10 wherein the account receives incoming currency (which can be in the form associated with the account or a different form, in which the incoming currency may be converted to the form associated with the account). In some examples, the user account data 1128 can include preferences for maintaining balances of individual of the ledgers. For example, the service provider of FIG. 10 can automatically debit the fiat currency ledger 1136 to increase the asset ledger 1134, or another account associated with the user whenever the cryptocurrency balance (e.g., of the asset ledger 1134) falls below a stated level (e.g., a threshold). Conversely, in some embodiments, the service provider of FIG. 10 can automatically credit the fiat currency ledger 1136 to decrease the asset ledger 1134 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party (e.g., associated with third-party server(s)) unrelated to the service provider of FIG. 10 (i.e., an external account). In at least one example, the user can transfer all or a portion of a balance of the cryptocurrency stored in the third-party cryptocurrency wallet to the service provider of FIG. 10. Such a transaction can require the user to transfer an amount of the cryptocurrency in a message signed by user's private key to an address provided by the service provider of FIG. 10. In at least one example, the transaction can be sent to miners to bundle the transaction into a block of transactions and to verify the authenticity of the transactions in the block. Once a miner has verified the block, the block is written to a public, distributed blockchain where the service provider of FIG. 10 can then verify that the transaction has been confirmed and can credit the user's asset ledger 1134 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund their cryptocurrency account. In some examples, the user can purchase cryptocurrency through services offered by the service provider of FIG. 10. As described above, in some examples, the service provider of FIG. 10 can acquire cryptocurrency from a third-party source (e.g., associated with third-party server(s)). In such examples, the asset wallet 1110 can be associated with different addresses and can vary addresses used to acquire cryptocurrency so that its holdings are represented under a variety of addresses on a blockchain. When the service provider of FIG. 10 has their own holdings of cryptocurrency, users can acquire cryptocurrency directly from the service provider of FIG. 10. In some examples, the service provider of FIG. 10 can include logic for buying and selling cryptocurrency in order to maintain a desired level of cryptocurrency. The desired level can be based on a volume of transactions over a period, balances of collective user profiles cryptocurrency ledgers, exchange rates, or trends in changing of exchange rates such that the cryptocurrency is trending towards gaining or losing value with respect to the fiat currency. In all of these examples, the buying and selling of cryptocurrency, and therefore the associated updating of the public ledger can be separate from any customer-merchant transaction, and therefore not necessarily time-sensitive.

In examples where the service provider of FIG. 10 has its own cryptocurrency assets, cryptocurrency transferred in a transaction (e.g., data with address provided for receipt of transaction and a balance of cryptocurrency transferred in the transaction) can be stored in the asset wallet 1110. In at least one example, the service provider of FIG. 10 can credit the asset ledger 1134 of the user. Additionally, while the service provider of FIG. recognizes that the user retains the value of the transferred cryptocurrency through crediting the asset ledger 1134, any person that inspects the blockchain will see the cryptocurrency as having been transferred to the service provider of FIG. 10. In some examples, the asset wallet 1110 can be associated with many different addresses. In such examples, any person that inspects the blockchain may not easily associate all cryptocurrency stored in asset wallet 1110 as belonging to the same entity. It is this presence of a private ledger that is used for real-time transactions and maintained by the service provider of FIG. 10, combined with updates to the public ledger at other times, that allows for extremely fast transactions using cryptocurrency to be achieved. In some examples, the "private ledger" can refer to the asset wallet 1110 (e.g., asset ledger), which in some examples, can utilize the private blockchain 1119, as described herein. The "public ledger" can correspond to a public blockchain associated with the asset network.

In at least one example, a user's asset ledger 1134, fiat currency ledger 1136, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1134. In some examples, a user can receive fiat currency or another currency in the form of payment for a transaction with another user. In at least one example, at least a portion of such funds can be converted into cryptocurrency by the service provider of FIG. 10 and used to fund the asset ledger 1134 of the user.

As addressed above, in some examples, users can also have other accounts maintained by the service provider of FIG. 10. For example, a user can also have an account in U.S. dollars, which can be tracked, for example, via the fiat currency ledger 1136. Such an account can be funded by transferring money from a bank account at a third-party bank to an account maintained by the service provider of FIG. 10 as is conventionally known. In some examples, a user can receive fiat currency in the form of payment for a transaction with another user. In such examples, at least a portion of such funds can be used to fund the fiat currency ledger 1136.

In some examples, a user can have one or more internal payment cards registered with the service provider of FIG. 10. Internal payment cards can be linked to one or more of the accounts associated with the user account 1120. In some embodiments, options with respect to internal payment cards can be adjusted and managed using an application (e.g., the payment application 1018).

In at least one example, as described above, each ledger can correspond to an account of the user that is managed by the service provider of FIG. 10. In at least one example, individual of the accounts can be associated with a wallet or a stored balance for use in payment transactions, peer-to-peer transactions, payroll payments, etc.

In at least one example, the user account 1120 can be associated with a asset wallet 1140. The asset wallet 1140 of the user can be associated with account information that can be stored in the user account data 1128 and, in some examples, can be associated with the user wallet key(s) 1132. In at least one example, the asset wallet 1140 can store data indicating an address provided for receipt of a cryptocurrency transaction. In at least one example, the balance of the asset wallet 1140 can be based at least in part on a balance of the asset ledger 1134. In at least one example, funds availed via the asset wallet 1140 can be stored in the asset wallet 1140 or the asset wallet 1110. Funds availed via the asset wallet 1110 can be tracked via the asset ledger 1134. The asset wallet 1140, however, can be associated with additional cryptocurrency funds.

In at least one example, when the service provider of FIG. 10 includes a private blockchain 1119 for recording and validating cryptocurrency transactions, the asset wallet 1140 can be used instead of, or in addition to, the asset ledger 1134. For example, at least one example, a merchant can provide the address of the asset wallet 1140 for receiving payments. In an example where a customer is paying in cryptocurrency and the customer has their own cryptocurrency wallet account associated with the service provider of FIG. 10, the customer can send a message signed by its private key including its wallet address (i.e., of the customer) and identifying the cryptocurrency and value to be transferred to the merchant's asset wallet 1140. The service provider of FIG. 10 can complete the transaction by reducing the cryptocurrency balance in the customer's cryptocurrency wallet and increasing the cryptocurrency balance in the merchant's asset wallet 1140. In addition to recording the transaction in the respective cryptocurrency wallets, the transaction can be recorded in the private blockchain 1119 and the transaction can be confirmed. A user can perform a similar transaction with cryptocurrency in a peer-to-peer transaction as described above. In at least one example, the cryptocurrency wallet account can be funded by a balance transfer from a third-party cryptocurrency wallet, as described above. Such a transaction can require a user to transfer an amount of cryptocurrency in a message signed by the user's private key to an address of the cryptocurrency wallet account. The transferred amount of cryptocurrency can then be within the cryptocurrency wallet account for use in later transactions.

While the asset ledger 1134 and/or asset wallet 1140 are each described above with reference to cryptocurrency, the asset ledger 1134 and/or asset wallet 1140 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider of FIG. 10 is an aspect of the technology disclosed that enables technical advantages of increased processing speed and improved security.

Figure 12:
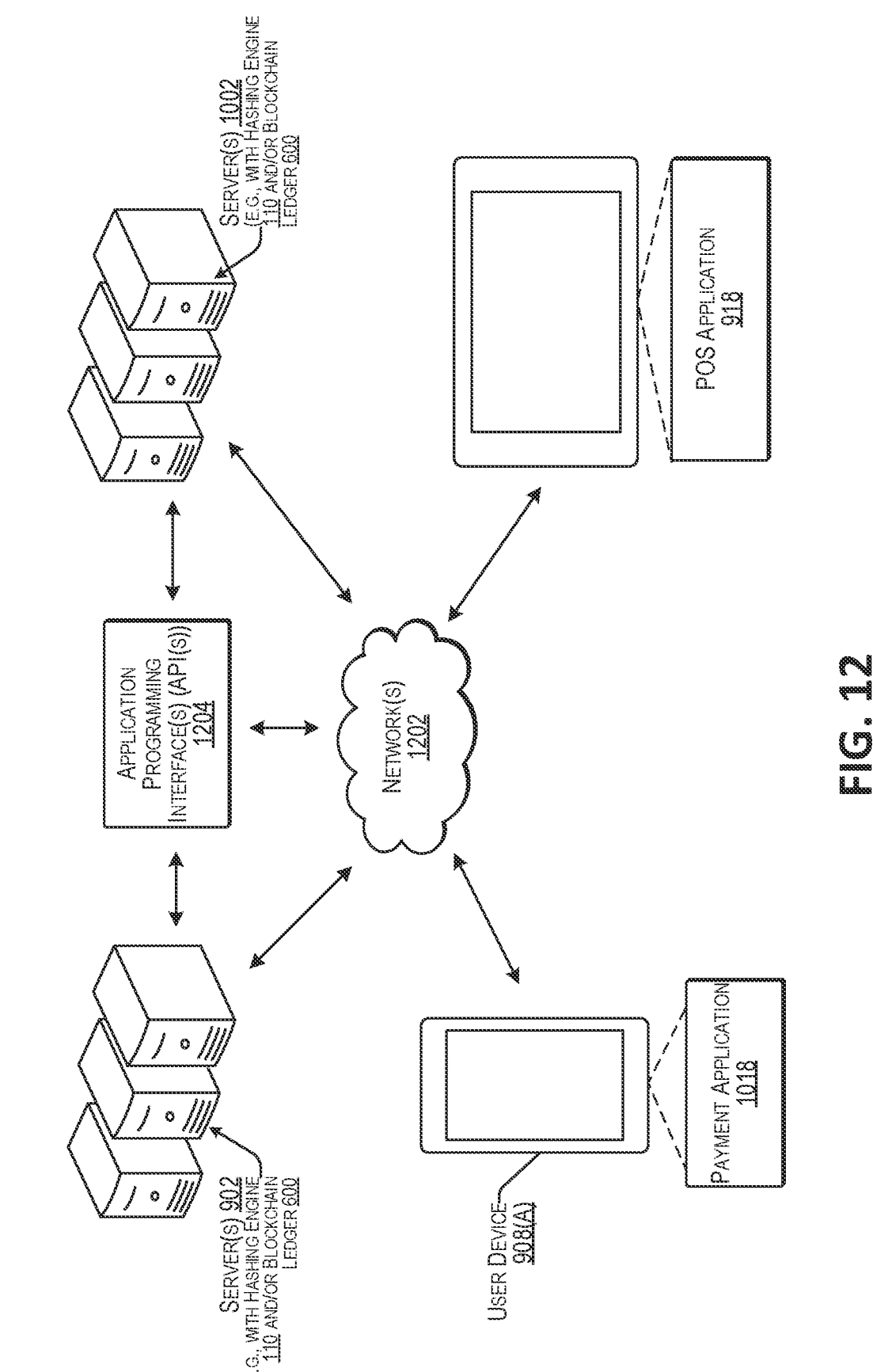
FIG. 12 is a block diagram illustrating an example environment wherein the environment of FIG. 9 and the environment of FIG. 10 can be integrated to enable payments at the point-of-sale using assets associated with user accounts in the peer-to-peer environment of FIG. 10, in accordance with some examples.

FIG. 12 illustrates an example environment 1200 wherein the environment 900 of FIG. 9 and the environment 1000 of FIG. 10 can be integrated to enable payments at the point-of-sale using assets associated with user accounts in the peer-to-peer environment 1000 of FIG. 10. As illustrated, each of the components can communicate with one another via one or more networks 1202. In some examples, one or more APIs 1204 or other functional components can be used to facilitate such communication.

In at least one example, the example environment 1200 can enable contactless payments, via integration of peer-to-peer payment, or other payment making, platform(s) and payment processing platform(s), are described herein. For the purpose of FIG. 12, the environment 900 can refer to a payment processing platform and the environment 1000 can refer to a peer-to-peer payment, or payment making, platform. In an example, such an integration can enable a customer to participate in a transaction via their own computing device instead of interacting with a merchant device of a merchant, such as the merchant device 908(A). In such an example, the POS application 918, associated with a payment processing platform and executable by the merchant device 908(A) of the merchant, can present a Quick Response (QR) code, or other code that can be used to identify a transaction (e.g., a transaction code), in association with a transaction between the customer and the merchant. The QR code, or other transaction code, can be provided to the POS application 918 via an API associated with the peer-to-peer payment platform. In an example, the customer can utilize their own computing device, such as the user device 1008(A), to capture the QR code, or the other transaction code, and to provide an indication of the captured QR code, or other transaction code, to server(s) 902 and/or server(s) 1002.

Based at least in part on the integration of the peer-to-peer payment platform and the payment processing platform (e.g., via the API), the server(s) 902 and/or 1002 associated with each can exchange communications with each other—and with a payment application 1018 associated with the peer-to-peer payment platform and/or the POS application 918—to process payment for the transaction using a peer-to-peer payment where the customer is a first "peer" and the merchant is a second "peer." In at least one example, the peer-to-peer payment platform can transfer funds from an account of the customer, maintained by the peer-to-peer payment platform, to an account of the merchant, maintained by the payment processing platform, thereby facilitating a contactless (peer-to-peer) payment for the transaction. That is, based at least in part on receiving an indication of which payment method a user (e.g., customer or merchant) intends to use for a transaction, techniques described herein utilize an integration between a peer-to-peer payment platform and payment processing platform (which can be a first- or third-party integration) such that a QR code, or other transaction code, specific to the transaction can be used for providing transaction details, location details, customer details, or the like to a computing device of the customer, such as the user device 1008(A), to enable a contactless (peer-to-peer) payment for the transaction.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 1008(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 918 and the payment application 1018, as described herein, can process a payment transaction by routing information input via the merchant application to the payment application for completing a "frictionless" payment. This can be referred to as "in-application payment." In another example of "in-application payment," the payment application described herein can be created or modified via a software developer kit (SDK) to enable in-application payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. In such a "scan to pay" example, a customer computing device, such as the user device 1008(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc.

In an example, a customer can desire to purchase items from a merchant. When the customer approaches the merchant to check out, the merchant (e.g., a worker associated therewith) can add indications of the items to a virtual cart via the POS application 918, associated with a payment processing platform, on the merchant device 908(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, a display of the merchant device 908(A) can present a QR code, or other transaction code, that can be associated with a peer-to-peer payment platform. The customer can use a camera associated with the user device 1008(A) to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As an additional or alternative example, a customer can desire to purchase items from a merchant. When the customer approaches the merchant to check out, the merchant (e.g., a worker associated therewith) can add indications of the items to a virtual cart via the POS application 918, associated with a payment processing platform, on the merchant device 908(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, the POS application 918 can cause a text message with a resource locator (e.g., uniform resource locator (URL)) that can be associated with a peer-to-peer payment platform to be sent to the user device 1008(A). The customer can interact with the resource locator and, if the customer is already associated with the peer-to-peer payment platform (e.g., has an existing account, previously onboarded, etc.), the peer-to-peer payment platform can provide an indication of the interaction with the resource locator to the payment processing platform. This interaction—between the customer and the resource locator presented via the customer computing device—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. As described above, such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

The same or similar techniques can be applicable in online and/or ecommerce selling channels as well. In such an example, a QR code, or other transaction code, can be presented via an online store/ecommerce web page of a merchant. The customer can use a camera associated with a customer computing device, such as the user device 1008 (A), to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As described above, techniques described herein offer improvements to conventional payment technologies. In an example, techniques described herein can enable transaction data to be sent from a POS application 918 of a merchant device 908(A) at a brick-and-mortar store of a merchant to a payment application 1018 of a user device 1008(A) of a customer to enable the customer to participate in a transaction via their own computing device. For instance, in a "scan to pay" example as described above, based at least in part on capturing the QR code, or other transaction code, via the user device 1008(A), the payment processing platform can provide transaction data to the peer-to-peer payment platform for presentation via the payment application 1018 on the user device 1008(A). In some examples, the customer can watch items being added to their cart (e.g., via a user interface presented via the payment application). As an item is added to a virtual cart by the merchant—via the POS application 918 on the merchant device 908(A) of the merchant—the customer can see the item in their virtual cart on their own computing device in near-real time. In another example, the peer-to-peer payment platform can analyze transaction data as it is received to determine whether an incentive (e.g., a discount, a loyalty reward, prioritized access or booking, etc.) is applicable to the transaction and can automatically apply the incentive or send a recommendation to the payment application 1018 for presentation via a user interface associated therewith. In addition to enabling a customer to participate in a transaction during cart building, techniques described herein can enable a customer to complete a transaction, and in some examples, provide gratuity (i.e., a tip), feedback, loyalty information, or the like, via the user device 1008(A) during or after payment of the transaction.

In some examples, based at least in part on capturing the QR code, or other transaction code, the payment processing platform can provide transaction data to the peer-to-peer payment platform for presentation via the payment application 1018 on the computing device of the customer, such as the user device 1008(A), to enable the customer to complete the transaction via their own computing device. In some examples, in response to receiving an indication that the QR code, or other transaction code, has been captured or otherwise interacted with via the customer computing device, the peer-to-peer payment platform can determine that the customer authorizes payment of the transaction using funds associated with a stored balance of the customer that is managed and/or maintained by the peer-to-peer payment platform. Such authorization can be implicit such that the interaction with the transaction code can imply authorization of the customer. In some examples, in response to receiving an indication that the QR code, or other transaction code, has been captured or otherwise interacted with via the customer computing device, the peer-to-peer payment platform can request authorization to process payment for the transaction using the funds associated with the stored balance and the customer can interact with the payment application to authorize the settlement of the transaction. A response to such a request can provide an express authorization of the customer. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the peer-to-peer payment platform can transfer funds from the stored balance of the customer to the payment processing platform. In at least one example, the payment processing platform can deposit the funds, or a portion thereof, into a stored balance of the merchant that is managed and/or maintained by the payment processing platform. That is, techniques described herein enable the peer-to-peer payment platform to transfer funds to the payment processing platform to settle payment of the transaction. In such an example, the payment processing platform can be a "peer" to the customer in a peer-to-peer transaction.

In some examples, techniques described herein can enable the customer to interact with the transaction after payment for the transaction has been settled. For example, in at least one example, the payment processing platform can cause a total amount of a transaction to be presented via a user interface associated with the payment application 1018 such that the customer can provide gratuity, feedback, loyalty information, or the like, via an interaction with the user interface. In some examples, because the customer has already authorized payment via the peer-to-peer payment platform, if the customer inputs a tip, the peer-to-peer payment platform can transfer additional funds, associated with the tip, to the payment processing platform. This pre-authorization (or maintained authorization) of sorts can enable faster, more efficient payment processing when the tip is received. Further, the customer can provide feedback and/or loyalty information via the user interface presented by the payment application, which can be associated with the transaction.

As described above—and also below—techniques described herein enable contactless payments. That is, by integrating the payment processing platform with the peer-to-peer payment platform, merchants and customers can participate in transactions via their own computing devices without needing to touch, or otherwise be in contact, with one another. By moving aspects of a transaction that are traditionally performed on a computing device of a merchant to a computing device of a customer, customers can have more control over the transaction and can have more privacy. That is, customers can monitor items that are added to their cart to ensure accuracy. Further, customers can authorize payments, use rewards, claim incentives, add gratuity, or the like without being watched by the merchant or other customers.

In some examples, such as when the QR code, or other transaction code, is captured by the computing device of the customer prior to a payment selection user interface being presented via the POS application 918, payment for the transaction can be pre-authorized such that when the time comes to complete the transaction, neither the payment processing platform nor the peer-to-peer payment platform need to re-authorize payment at that time. That is, techniques described herein can enable faster, more efficient transactions. Further, in some examples, when a customer adds a tip after payment for a transaction has been settled, in some examples, because the peer-to-peer payment platform has already been authorized, the peer-to-peer payment platform and the payment processing platform may not need to obtain another authorization to settle funds associated with the tip. That is, in such examples, fewer data transmissions are required and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 1018 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, instead of scanning, capturing, or otherwise interacting with a QR code or transaction code, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. For example, based at least in part on detecting a dip, tap, swipe, or the like, the payment processing platform can associate a customer with a transaction and provide at least a portion of transaction data associated with the transaction to a customer computing device associated therewith. In some examples, the payment instrument can be associated with the peer-to-peer payment platform as described herein (e.g., a debit card linked to a stored balance of a customer) such that when the payment instrument is caused to interact with a payment reader, the payment processing platform can exchange communications with the peer-to-peer payment platform to authorize payment for a transaction and/or provision associated transaction data to a computing device of the customer associated with the transaction.

In some examples, any of the systems and/or elements in the environment 1200 (e.g., the server(s) 902, the user device 908(A), the POS application 918, the payment application 1018, the server(s) 1002, the application programming interfaces (APIs) 1204, and/or the network(s) 1202) can include, run, or access the hashing engine 100, the message expander (ME) 120, the message compressor (MC) 130, the ME 200, the MC 290, the MC 300, the ME 390, the ME 400A, the ME 400B, the MC 500A, the MC 500B, the clock 610, the word line 620, the bit line 630, the clock 660, the word line 670, the bit line 680, the blockchain ledger 700, or a combination thereof.

Figure 13:
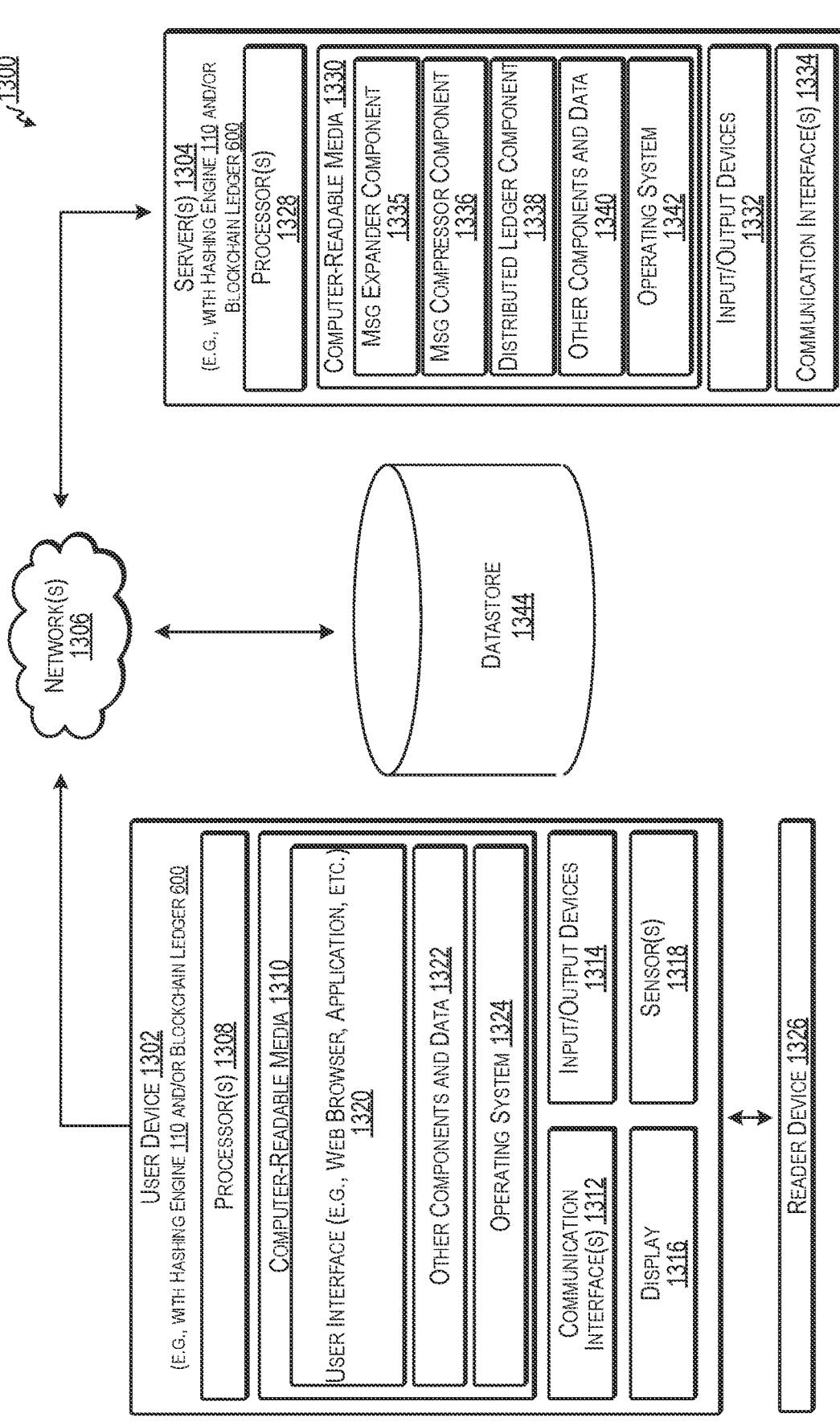
FIG. 13 is a block diagram illustrating a system for performing techniques described herein, in accordance with some examples.

FIG. 13 block diagram illustrating a system 1300 for performing techniques described herein. The system 1300 includes a user device 1302, that communicates with server computing device(s) (e.g., server(s) 1304) via network(s) 1306 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1302 is illustrated, in additional or alternate examples, the system 1300 can have multiple user devices, as described above with reference to FIG. 7.

In some examples, any of the devices and/or elements in the system 1300 (e.g., the user device 1302, the server(s) 1304, the reader device(s) 1326, the datastore 1344) can include, run, or access the hashing engine 100, the message expander (ME) 120, the message compressor (MC) 130, the ME 200, the MC 290, the MC 300, the ME 390, the ME 400A, the ME 400B, the MC 500A, the MC 500B, the clock 610, the word line 620, the bit line 630, the clock 660, the word line 670, the bit line 680, the blockchain ledger 700, or a combination thereof.

In at least one example, the user device 1302 can be any suitable type of computing device, e.g., portable, semi-portable, semi-stationary, or stationary. Some examples of the user device 1302 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1302 can be any computing device capable of sending communications and performing the functions according to the techniques described herein. The user device 1302 can include devices, e.g., payment card readers, or components capable of accepting payments, as described below.

In the illustrated example, the user device 1302 includes one or more processors 1308, one or more computer-readable media 1310, one or more communication interface(s) 1312, one or more input/output (I/O) devices 1314, a display 1316, and sensor(s) 1318.

In at least one example, each processor 1308 can itself comprise one or more processors or processing cores. For example, the processor(s) 1308 can be implemented as one or more microprocessors, microcomputers, microcontrollers, digital signal processors, central processing units, state machines, logic circuitries, and/or any devices that manipulate signals based on operational instructions. In some examples, the processor(s) 1308 can be one or more hardware processors and/or logic circuits of any suitable type specifically programmed or configured to execute the algorithms and processes described herein. The processor(s) 1308 can be configured to fetch and execute computer-readable processor-executable instructions stored in the computer-readable media 1310.

Depending on the configuration of the user device 1302, the computer-readable media 1310 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1310 can include, but is not limited to, RAM, ROM, EEPROM, flash memory, solid-state storage, magnetic disk storage, optical storage, and/or other computer-readable media technology. Further, in some examples, the user device 1302 can access external storage, such as RAID storage systems, storage arrays, network attached storage, storage area networks, cloud storage, or any other medium that can be used to store information and that can be accessed by the processor(s) 1308 directly or through another computing device or network. Accordingly, the computer-readable media 1310 can be computer storage media able to store instructions, components or components that can be executed by the processor(s) 1308. Further, when mentioned, non-transitory computer-readable media exclude media such as energy, carrier signals, electromagnetic waves, and signals per se.

The computer-readable media 1310 can be used to store and maintain any number of functional components that are executable by the processor(s) 1308. In some implementations, these functional components comprise instructions or programs that are executable by the processor(s) 1308 and that, when executed, implement operational logic for performing the actions and services attributed above to the user device 1302. Functional components stored in the computer-readable media 1310 can include a user interface 1320 to enable users to interact with the user device 1302, and thus the server(s) 1304 and/or other networked devices. In at least one example, the user interface 1320 can be presented via a web browser, or the like. In other examples, the user interface 1320 can be presented via an application, such as a mobile application or desktop application, which can be provided by a service provider 712 associated with the server(s) 1304, or which can be an otherwise dedicated application. In some examples, the user interface 1320 can include a hashing user interface associated with the hashing engine 110, the ME 120, the MC 130, or combinations thereof. In at least one example, a user can interact with the user interface via touch input, spoken input, gesture, or any other type of input. The word "input" is also used to describe "contextual" input that may not be directly provided by the user via the user interface 1320. For example, user's interactions with the user interface 1320 are analyzed using, e.g., natural language processing techniques, to determine context or intent of the user, which may be treated in a manner similar to "direct" user input.

Depending on the type of the user device 1302, the computer-readable media 1310 can also optionally include other functional components and data, such as other components and data 1322, which can include programs, drivers, etc., and the data used or generated by the functional components. In addition, the computer-readable media 1310 can also store data, data structures and the like, that are used by the functional components. Further, the user device 1302 can include many other logical, programmatic and physical components, of which those described are merely examples that are related to the discussion herein.

In at least one example, the computer-readable media 1310 can include additional functional components, such as an operating system 1324 for controlling and managing various functions of the user device 1302 and for enabling basic user interactions.

The communication interface(s) 1312 can include one or more interfaces and hardware components for enabling communication with various other devices, such as over the network(s) 1306 or directly. For example, communication interface(s) 1312 can enable communication through one or more network(s) 1306, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1306 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1302 can further include one or more input/output (I/O) devices 1314. The I/O devices 1314 can include speakers, a microphone, a camera, and various user controls (e.g., buttons, a joystick, a keyboard, a keypad, etc.), a haptic output device, and so forth. The I/O devices 1314 can also include attachments that leverage the accessories (audio-jack, USB-C, Bluetooth, etc.) to connect with the user device 1302.

In at least one example, user device 1302 can include a display 1316. Depending on the type of computing device(s) used as the user device 1302, the display 1316 can employ any suitable display technology. For example, the display 1316 can be a liquid crystal display, a plasma display, a light emitting diode display, an OLED (organic light-emitting diode) display, an electronic paper display, or any other suitable type of display able to present digital content thereon. In at least one example, the display 1316 can be an augmented reality display, a virtually reality display, or any other display able to present and/or project digital content. In some examples, the display 1316 can have a touch sensor associated with the display 1316 to provide a touchscreen display configured to receive touch inputs for enabling interaction with a graphic interface presented on the display 1316. Accordingly, implementations herein are not limited to any particular display technology. Alternatively, in some examples, the user device 1302 may not include the display 1316, and information can be presented by other means, such as aurally, haptically, etc.

In addition, the user device 1302 can include sensor(s) 1318. The sensor(s) 1318 can include a GPS device able to indicate location information. Further, the sensor(s) 1318 can include, but are not limited to, an accelerometer, gyroscope, compass, proximity sensor, camera, microphone, and/or a switch.

In some example, the GPS device can be used to identify a location of a user. In at least one example, the location of the user can be used by the service provider 712, described above, to provide one or more services. That is, in some examples, the service provider 712 can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users 714 and/or for sending users 714 notifications regarding available appointments with merchant(s) located proximate to the users 714. In at least one example, location can be used for taking payments from nearby customers when they leave a geofence, or location can be used to initiate an action responsive to users 714 enter a brick-and-mortar store of a merchant. Location can be used in additional or alternative ways as well.

Additionally, the user device 1302 can include various other components that are not shown, examples of which include removable storage, a power source, such as a battery and power control unit, a barcode scanner, a printer, a cash drawer, and so forth.

In addition, in some examples, the user device 1302 can include, be connectable to, or otherwise be coupled to a reader device 1326, for reading payment instruments and/or identifiers associated with payment objects. In some examples, as described above, the reader device 1326 can plug in to a port in the user device 1302, such as a microphone port, a headphone port, an audio-jack, a data port, or other suitable port. In additional or alternative examples, the reader device 1326 can be coupled to the user device 1302 via another wired or wireless connection, such as via a Bluetooth®, BLE, and so on. The reader device 1326 can include a read head for reading a magnetic strip of a payment card, and further can include encryption technology for encrypting the information read from the magnetic strip. Additionally or alternatively, the reader device 1326 can be an EMV payment reader, which in some examples, can be embedded in the user device 1302. Moreover, numerous other types of readers can be employed with the user device 1302 herein, depending on the type and configuration of the user device 1302.

The reader device 1326 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1326 may include hardware implementation, such as slots, magnetic tracks, and rails with one or more sensors or electrical contacts to facilitate detection and acceptance of a payment instrument. That is, the reader device 1326 may include hardware implementations to enable the reader device 1326 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1326 may also include a biometric sensor to receive and process biometric characteristics and process them as payment instruments, given that such biometric characteristics are registered with the hashing system 100 and connected to a financial account with a bank server.

The reader device 1326 may include processing unit(s), computer-readable media, a reader chip, a transaction chip, a timer, a clock, a network interface, a power supply, and so on. The processing unit(s) of the reader device 1326 may execute one or more components and/or processes to cause the reader device 1326 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 1326, the computer-readable media may include volatile memory (such as RAM), non-volatile memory (such as ROM, flash memory, miniature hard drive, memory card, or the like), or some combination thereof. In at least one example, the computer-readable media of the reader device 1326 may include at least one component for performing various functions as described herein.

The reader chip may perform functionalities to control the operations and processing of the reader device 1326. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock, which may provide a clock signal indicating a time. Furthermore, the reader chip may perform functionality to control the network interface, which may interface with the network(s) 1306, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1326. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1302, which can be a POS terminal, and the reader device 1326 are shown as separate devices, in additional or alternative examples, the user device 1302 and the reader device 1326 can be part of a single device, which may be a battery-operated device. In such an example, components of both the user device 1302 and the reader device 1326 may be associated with the single device. In some examples, the reader device 1326 can have a display integrated therewith, which can be in addition to (or as an alternative of) the display 1316 associated with the user device 1302.

The server(s) 1304 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1304 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1304 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1304 can include one or more processors 1328, one or more computer-readable media 1330, one or more I/O devices 1332, and one or more communication interfaces 1334. Each processor 1328 can be a single processing unit or a number of processing units, and can include single or multiple computing units or multiple processing cores. The processor(s) 1328 can be implemented as one or more microprocessors, microcomputers, microcontrollers, digital signal processors, central processing units, state machines, logic circuitries, and/or any devices that manipulate signals based on operational instructions. For example, the processor(s) 1328 can be one or more hardware processors and/or logic circuits of any suitable type specifically programmed or configured to execute the algorithms and processes described herein. The processor(s) 1328 can be configured to fetch and execute computer-readable instructions stored in the computer-readable media 1330, which can program the processor(s) 1328 to perform the functions described herein.

The computer-readable media 1330 can include volatile and nonvolatile memory and/or removable and non-removable media implemented in any type of technology for storage of information, such as computer-readable instructions, data structures, program components, or other data. Such computer-readable media 1330 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1304, the computer-readable media 1330 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1330 can be used to store any number of functional components that are executable by the processor(s) 1328. In many implementations, these functional components comprise instructions or programs that are executable by the processors 1328 and that, when executed, specifically configure the one or more processors 1328 to perform the actions attributed above to the service provider 712 and/or payment processing service. Functional components stored in the computer-readable media 1330 can optionally include a message expander (ME) component 1335, a message compressor (MC) component 1336, a distributed ledger component 1338, and one or more other components and data 1340.

The message expander (ME) component 1335 can be configured to function as a message expander (ME) of a hashing engine, as in the ME 120, the ME 200, the ME 390, the ME 400A, the ME 400B, or a combination thereof.

The message compressor (MC) component 1336 can be configured to function as a message compressor (MC) of a hashing engine, as in the MC 130, the MC 290, the MC 300, the MC 500A, the MC 500B, or a combination thereof.

The distributed ledger component 1338 can be configured to generate, store, receive, access, generate block(s) for, generate hash(es) for block(s) for, generate payload(s) for block(s) for, store payload(s) for block(s) for, append block(s) to, mine, verify payload(s) for, verify block(s) for, verify completion of smart contract(s) for, and/or send, a distributed ledger, such as the blockchain ledger 700, a DAG ledger as discussed with respect to FIG. 7, the private blockchain 1119, or a combination thereof.

Further, the one or more other components and data 1340 can include programs, drivers, etc., and the data used or generated by the functional components, such as any elements described herein as used by the hashing engine 100, the message expander (ME) 120, the message compressor (MC) 130, the ME 200, the MC 290, the MC 300, the ME 390, the ME 400A, the ME 400B, the MC 500A, the MC 500B, the clock 610, the word line 620, the bit line 630, the clock 660, the word line 670, the bit line 680, the blockchain ledger 700, the server(s) 902, the network(s) 904, the user devices 906, the merchant device(s) 908(A)-908(N), the server(s) 910, the POS application 918, the reader device 922, the POS system 924, the server(s) 1002, the network(s) 1004, the user devices 1006, the user device(s) 1008(A)-908(N), the server(s) 1010, the payment application 1018, the data store(s) 1100, the asset storage 1102, the user account(s) 1104, the private blockchain 1119, the application programming interfaces (APIs) 1204, the network(s) 1202, the user device 1302, the server(s) 1304, the reader device(s) 1326, the datastore 1344, or a combination thereof. Further, the server(s) 1304 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1330 can additionally include an operating system 1342 for controlling and managing various functions of the server(s) 1304.

The communication interface(s) 1334 can include one or more interfaces and hardware components for enabling communication with various other devices, such as over the network(s) 1306 or directly. For example, communication interface(s) 1334 can enable communication through one or more network(s) 1306, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1306 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1304 can further be equipped with various I/O devices 1332. Such I/O devices 1332 can include a display, various user interface controls (e.g., buttons, joystick, keyboard, mouse, touch screen, biometric or sensory input devices, etc.), audio speakers, connection ports and so forth.

In at least one example, the system 1300 can include a datastore 1344 that can be configured to store data that is accessible, manageable, and updatable. In some examples, the datastore 1344 can be integrated with the user device 1302 and/or the server(s) 1304. In other examples, as shown in FIG. 13, the datastore 1344 can be located remotely from the server(s) 1304 and can be accessible to the server(s) 1304. The datastore 1344 can comprise multiple databases and/or servers connected locally and/or remotely via the network(s) 1306.

In at least one example, the datastore 1344 can store user profiles, which can include merchant profiles, customer profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider 712.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

In at least one example, the payee currency account(s) 170, the payee security asset account(s) 172, and the payee cryptocurrency account(s) 174, described above with reference to FIG. 1, can include or be associated with the merchant profiles and/or customer profiles described above.

Furthermore, in at least one example, the datastore 1344 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1344 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

Example aspects of the disclosure include:

Aspect 1. An apparatus for secure data hashing, the apparatus comprising: a plurality of data storage circuit elements, wherein the plurality of data storage circuit elements are configured to store a plurality of words that are used for hashing a message using a secure hash algorithm (SHA), wherein a data storage circuit element of the plurality of data storage circuit elements is configured to store a word of the plurality of words during hashing of the message using the SHA without moving the word to any other data storage circuit element of the plurality of data storage circuit elements; a plurality of combinational logic circuit elements configured to select specified data storage circuit elements of the plurality of data storage circuit elements, wherein the plurality of combinational logic circuit elements are configured to select the specified data storage circuit elements according to a specified order that changes throughout hashing the message to simulate shifting of at least a subset of the plurality of words among at least a subset of the plurality of data storage circuit elements; and a plurality of computational operators configured to generate one or more additional words based on the specified data storage circuit elements as selected by the plurality of combinational logic circuit elements, wherein the one or more additional words are configured to be stored in one or more available data storage circuit elements of the plurality of data storage circuit elements and used for hashing the message.

Aspect 2. The apparatus of Aspect 1, further comprising: a timing circuit to synchronize selection of the specified data storage circuit elements according to the specified order.

Aspect 3. The apparatus of any of Aspects 1 to 2, further comprising: a delay circuit to delay selection of the specified data storage circuit elements based on whether a cycle generates a valid word.

Aspect 4. The apparatus of any of Aspects 1 to 3, wherein the apparatus includes a message expander (ME), wherein the one or more additional words are configured to be output from the ME to a message compressor (MC) that generates a hash for the message.

Aspect 5. The apparatus of any of Aspects 1 to 4, wherein the apparatus includes a message compressor (MC), wherein the one or more additional words are configured to be part of a hash for the message.

Aspect 6. The apparatus of any of Aspects 1 to 5, wherein the plurality of combinational logic circuit elements include one or more multiplexers.

Aspect 7. The apparatus of any of Aspects 1 to 6, wherein the plurality of data storage circuit elements at least one of a random access memory (RAM) element, a static random access memory (SRAM) element, or a dynamic random access memory (DRAM) element.

Aspect 8. The apparatus of any of Aspects 1 to 7, wherein the plurality of combinational logic circuit elements are configured to select the specified data storage circuit elements based also on a clock input received from a clock circuit element.

Aspect 9. The apparatus of any of Aspects 1 to 8, wherein the plurality of combinational logic circuit elements are configured to select the one or more available data storage circuit elements of the plurality of data storage circuit elements for storage of the one or more additional words.

Aspect 10. The apparatus of any of Aspects 1 to 9, wherein the plurality of combinational logic circuit elements include one or more demultiplexers.

Aspect 11. The apparatus of any of Aspects 1 to 10, wherein the one or more additional words are configured to overwrite one or more prior words of the plurality of words by being stored in the one or more available data storage circuit elements.

Aspect 12. The apparatus of any of Aspects 1 to 11, wherein the one or more available data storage circuit elements do not store any of the plurality of words prior to storage of the one or more additional words in the one or more available data storage circuit elements.

Aspect 13. The apparatus of any of Aspects 1 to 12, wherein the specified order changes throughout hashing the message to simulate shifting of at least a subset of the plurality of words among at least a subset of the plurality of data storage circuit elements.

Aspect 14. The apparatus of any of Aspects 1 to 13, wherein the message includes at least a portion of a first block of a distributed ledger, wherein hashing the message includes generating a hash to be stored in a second block of the distributed ledger.

Aspect 15. An apparatus comprising: a plurality of data storage circuit elements, wherein the plurality of data storage circuit elements are configured to store a plurality of words that are used for hashing a message, wherein a data storage circuit element of the plurality of data storage circuit elements is configured to store a word of the plurality of words during hashing of the message without rotating from or shifting the word to any other data storage circuit element of the plurality of data storage circuit elements; one or more combinational logic circuit elements configured to select specified data storage circuit elements of the plurality of data storage circuit elements according to a specified order that changes throughout hashing the message; and one or more computational operators configured to generate one or more additional words based on the specified data storage circuit elements as selected by the one or more combinational logic circuit elements, wherein the one or more additional words are configured to be stored in one or more available data storage circuit elements of the plurality of data storage circuit elements and used for hashing the message.

Aspect 16. The apparatus of Aspect 15, further comprising: a timing circuit to synchronize selection of the specified data storage circuit elements according to the specified order.

Aspect 17. The apparatus of any of Aspects 15 to 16, further comprising: a delay circuit to delay selection of the specified data storage circuit elements based on whether a cycle generates a valid word.

Aspect 18. The apparatus of any of Aspects 15 to 17, wherein the apparatus includes a message expander (ME), wherein the one or more additional words are configured to be output from the ME to a message compressor (MC) that generates a hash for the message.

Aspect 19. The apparatus of any of Aspects 15 to 18, wherein the apparatus includes a message compressor (MC), wherein the one or more additional words are configured to be part of a hash for the message.

Aspect 20. The apparatus of any of Aspects 15 to 19, wherein the one or more combinational logic circuit elements include one or more multiplexers.

Aspect 21. The apparatus of any of Aspects 15 to 20, wherein the plurality of data storage circuit elements at least one of a random access memory (RAM) element, a static random access memory (SRAM) element, or a dynamic random access memory (DRAM) element.

Aspect 22. The apparatus of any of Aspects 15 to 21, wherein the one or more combinational logic circuit elements are configured to select the specified data storage circuit elements based also on a clock input received from a clock circuit element.

Aspect 23. The apparatus of any of Aspects 15 to 22, wherein the one or more combinational logic circuit elements are configured to select the one or more available data storage circuit elements of the plurality of data storage circuit elements for storage of the one or more additional words.

Aspect 24. The apparatus of any of Aspects 15 to 23, wherein the one or more combinational logic circuit elements include one or more demultiplexers.

Aspect 25. The apparatus of any of Aspects 15 to 24, wherein the one or more additional words are configured to overwrite one or more prior words of the plurality of words by being stored in the one or more available data storage circuit elements.

Aspect 26. The apparatus of any of Aspects 15 to 25, wherein the one or more available data storage circuit elements do not store any of the plurality of words prior to storage of the one or more additional words in the one or more available data storage circuit elements.

Aspect 27. The apparatus of any of Aspects 15 to 26, wherein the specified order changes throughout hashing the message to simulate shifting of at least a subset of the plurality of words among at least a subset of the plurality of data storage circuit elements.

Aspect 28. The apparatus of any of Aspects 15 to 27, wherein the message includes at least a portion of a first block of a distributed ledger, wherein hashing the message includes generating a hash to be stored in a second block of the distributed ledger.

Aspect 29. A method comprising: storing a plurality of words in a plurality of data storage circuit elements, wherein the plurality of words are to be used for hashing a message, wherein a data storage circuit element of the plurality of data storage circuit elements is configured to store a word of the plurality of words during hashing of the message without moving the word to any other data storage circuit element of the plurality of data storage circuit elements; selecting, using one or more combinational logic circuit elements, specified data storage circuit elements of the plurality of data storage circuit elements according to a specified order that changes throughout hashing the message; generating one or more additional words based on input into one or more computational operators of specified words from the specified data storage circuit elements that are selected by the one or more combinational logic circuit elements; and storing the one or more additional words in one or more available data storage circuit elements of the plurality of data storage circuit elements, wherein the one or more additional words are configured to be used for hashing the message.

Aspect 30. The method of Aspect 29, further comprising: synchronizing selection of the specified data storage circuit elements according to the specified order using a timing circuit.

Aspect 31. The method of any of Aspects 29 to 30, further comprising: delaying selection of the specified data storage circuit elements based on whether a cycle generates a valid word and using a delay circuit.

Aspect 32. The method of any of Aspects 29 to 31, wherein the plurality of words and the one or more additional words are used as part of a message expander (ME) process, wherein the one or more additional words are configured to be output using the ME process to a message compressor (MC) that generates a hash for the message.

Aspect 33. The method of any of Aspects 29 to 32, wherein the plurality of words and the one or more additional words are used as part of a message compressor (MC) process, wherein the one or more additional words are configured to be part of a hash for the message.

Aspect 34. The method of any of Aspects 29 to 33, wherein the one or more combinational logic circuit elements include one or more multiplexers.

Aspect 35. The method of any of Aspects 29 to 34, wherein the plurality of data storage circuit elements at least one of a random access memory (RAM) element, a static random access memory (SRAM) element, or a dynamic random access memory (DRAM) element.

Aspect 36. The method of any of Aspects 29 to 35, further comprising: receiving a clock input from a clock circuit element, wherein the one or more combinational logic circuit elements are configured to select the specified data storage circuit elements based also on the clock input.

Aspect 37. The method of any of Aspects 29 to 36, further comprising: selecting, using the one or more combinational logic circuit elements, the one or more available data storage circuit elements of the plurality of data storage circuit elements for the one or more additional words to be stored in.

Aspect 38. The method of any of Aspects 29 to 37, wherein the one or more combinational logic circuit elements include one or more demultiplexers.

Aspect 39. The method of any of Aspects 29 to 38, wherein storing the one or more additional words in the one or more available data storage circuit elements includes overwriting one or more prior words of the plurality of words previously stored in the one or more available data storage circuit elements.

Aspect 40. The method of any of Aspects 29 to 39, wherein the one or more available data storage circuit elements do not store any of the plurality of words prior to storage of the one or more additional words in the one or more available data storage circuit elements.

Aspect 41. The method of any of Aspects 29 to 40, wherein the specified order changes throughout hashing the message to simulate shifting of at least a subset of the plurality of words among at least a subset of the plurality of data storage circuit elements.

Aspect 42. The method of any of Aspects 29 to 41, wherein the message includes at least a portion of a first block of a distributed ledger, wherein hashing the message includes generating a hash to be stored in a second block of the distributed ledger.

Aspect 43. A non-transitory computer-readable medium having stored thereon instructions that, when executed by one or more processors, cause the one or more processors to: store a plurality of words in a plurality of data storage circuit elements, wherein the plurality of words are to be used for hashing a message, wherein a data storage circuit element of the plurality of data storage circuit elements is configured to store a word of the plurality of words during hashing of the message without moving the word to any other data storage circuit element of the plurality of data storage circuit elements; select, using one or more combinational logic circuit elements, specified data storage circuit elements of the plurality of data storage circuit elements according to a specified order that changes throughout hashing the message; generate one or more additional words based on input into one or more computational operators of specified words from the specified data storage circuit elements that are selected by the one or more combinational logic circuit elements; and store the one or more additional words in one or more available data storage circuit elements of the plurality of data storage circuit elements, wherein the one or more additional words are configured to be used for hashing the message.

Aspect 44: The non-transitory computer-readable medium of Aspect 43, further comprising operations according to any of Aspects 2 to 14, 16 to 28, and/or 30 to 42.

Aspect 45: An apparatus for image processing, the apparatus comprising: means for storing a plurality of words in a plurality of data storage circuit elements, wherein the plurality of words are to be used for hashing a message, wherein a data storage circuit element of the plurality of data storage circuit elements is configured to store a word of the plurality of words during hashing of the message without moving the word to any other data storage circuit element of the plurality of data storage circuit elements; means for selecting, using one or more combinational logic circuit elements, specified data storage circuit elements of the plurality of data storage circuit elements according to a specified order that changes throughout hashing the message; means for generating one or more additional words based on input into one or more computational operators of specified words from the specified data storage circuit elements that are selected by the one or more combinational logic circuit elements; and means for storing the one or more additional words in one or more available data storage circuit elements of the plurality of data storage circuit elements, wherein the one or more additional words are configured to be used for hashing the message.

Aspect 46: The apparatus of Aspect 45, further comprising means for performing operations according to any of Aspects 2 to 14, 16 to 28, and/or 30 to 42.

What is claimed is:

1. An apparatus for secure data hashing, the apparatus comprising:

a plurality of data storage circuit elements stored in an array, wherein the plurality of data storage circuit elements store a plurality of words readable as bit line data that are used for hashing a message using a secure hash algorithm (SHA), wherein a data storage circuit element of the plurality of data storage circuit elements stores a word of the plurality of words during hashing of the message using the SHA, wherein hashing the message includes using at least one demultiplexer and at least one multiplexer to simulate shifting of the word without shifting the word to any other data storage circuit element of the plurality of data storage circuit elements, and wherein the at least one multiplexer receives input from one or more bit lines associated with the plurality of data storage circuit elements;

a clock circuit element;

a plurality of combinational logic circuit elements that cause the at least one multiplexer to select specified data storage circuit elements of the plurality of data storage circuit elements based on a clock input received from the clock circuit element, wherein the plurality of combinational logic circuit elements select the specified data storage circuit elements according to a specified order that changes throughout hashing the message to simulate shifting of at least a subset of the plurality of words among at least a subset of the plurality of data storage circuit elements; and a plurality of computational operators that generate one or more additional words based on the specified data storage circuit elements as selected by the plurality of combinational logic circuit elements, wherein the at least one demultiplexer is used to store the one or more additional words in one or more available data storage circuit elements of the plurality of data storage circuit elements and used for hashing the message.

2. The apparatus of claim 1, further comprising:

a timing circuit to synchronize selection of the specified data storage circuit elements according to the specified order.

3. The apparatus of claim 1, further comprising:

a delay circuit to delay selection of the specified data storage circuit elements based on whether a cycle generates a valid word.

4. An apparatus comprising:

a plurality of data storage circuit elements stored in an array, wherein the plurality of data storage circuit elements store a plurality of words readable as bit line data that are used for hashing a message, wherein a data storage circuit element of the plurality of data storage circuit elements stores a word of the plurality of words during hashing of the message, wherein hashing the message includes using at least one demultiplexer and at least one multiplexer to simulate shifting of the word without rotating from or shifting the word to any other data storage circuit element of the plurality of data storage circuit elements, and wherein the at least one multiplexer receives input from one or more bit lines associated with the plurality of data storage circuit elements;

a clock circuit element;

one or more combinational logic circuit elements that cause the at least one multiplexer to select specified data storage circuit elements of the plurality of data storage circuit elements based on a clock input received from the clock circuit element, wherein the one or more combinational logic circuit elements select the specified data storage circuit elements according to a specified order that changes throughout hashing the message; and one or more computational operators that generate one or more additional words based on the specified data storage circuit elements as selected by the one or more combinational logic circuit elements, wherein the at least one demultiplexer is used to store the one or more additional words in one or more available data storage circuit elements of the plurality of data storage circuit elements and used for hashing the message.

5. The apparatus of claim 4, wherein the apparatus includes a message expander (ME), wherein the one or more additional words are output from the ME to a message compressor (MC) that generates a hash for the message.

6. The apparatus of claim 4, wherein the apparatus includes a message compressor (MC), wherein the one or more additional words are part of a hash for the message.

7. The apparatus of claim 4, wherein the one or more combinational logic circuit elements include one or more demultiplexers, and one or more multiplexers and at least one additional element, wherein the one or more combinational logic circuit elements select the specified data storage circuit elements using the one or more multiplexers and the at least one additional element, and wherein the at least one additional element is at least one of a σ operator, a Σ operator, a majority operator, a choice operator, an adder, a demultiplexer, or a logic gate.

8. The apparatus of claim 4, wherein the plurality of data storage circuit elements has at least one of a random access memory (RAM) element, a static random access memory (SRAM) element, or a dynamic random access memory (DRAM) element.

9. The apparatus of claim 4, wherein the one or more combinational logic circuit elements select the one or more available data storage circuit elements of the plurality of data storage circuit elements for storage of the one or more additional words.

10. The apparatus of claim 4, wherein the one or more combinational logic circuit elements include one or more demultiplexers, wherein the one or more combinational logic circuit elements select the specified data storage circuit elements using the one or more demultiplexers.

11. The apparatus of claim 4, wherein the one or more additional words overwrite one or more prior words of the plurality of words by being stored in the one or more available data storage circuit elements.

12. The apparatus of claim 4, wherein the one or more available data storage circuit elements do not store any of the plurality of words prior to storage of the one or more additional words in the one or more available data storage circuit elements.

13. The apparatus of claim 4, wherein the specified order changes throughout hashing the message to simulate shifting of at least a subset of the plurality of words among at least a subset of the plurality of data storage circuit elements.

14. The apparatus of claim 4, wherein the message includes at least a portion of a first block of a distributed ledger, wherein hashing the message includes generating a hash to be stored in a second block of the distributed ledger.

15. A method comprising:

storing a plurality of words in a plurality of data storage circuit elements in an array, wherein the plurality of words readable as bit line data are to be used for hashing a message, wherein a data storage circuit element of the plurality of data storage circuit elements stores a word of the plurality of words during hashing of the message, wherein hashing the message includes using at least one demultiplexer and at least one multiplexer to simulate shifting of the word without shifting the word to any other data storage circuit element of the plurality of data storage circuit elements, and wherein the at least one multiplexer receives input from one or more bit lines associated with the plurality of data storage circuit elements;

receiving a clock input from a clock circuit element;

selecting, using one or more combinational logic circuit elements, specified data storage circuit elements of the plurality of data storage circuit elements based on the clock input, wherein the one or more combinational logic circuit elements cause the at least one multiplexer to select the specified data storage circuit elements according to a specified order that changes throughout hashing the message;

generating one or more additional words based on input into one or more computational operators of specified words from the specified data storage circuit elements that are selected by the one or more combinational logic circuit elements; and storing, using the at least one demultiplexer, the one or more additional words in one or more available data storage circuit elements of the plurality of data storage circuit elements, wherein the one or more additional words are used for hashing the message.

16. The method of claim 15, wherein the plurality of words and the one or more additional words are used as part of a message expander (ME) process, wherein the one or more additional words are output from the ME to a message compressor (MC) that generates a hash for the message.

17. The method of claim 15, wherein the plurality of words and the one or more additional words are used as part of a message compressor (MC) process, wherein the one or more additional words are part of a hash for the message.

18. The method of claim 15, further comprising:

selecting, using the one or more combinational logic circuit elements, the one or more available data storage circuit elements of the plurality of data storage circuit elements for the one or more additional words to be stored in.

19. The method of claim 15, wherein storing the one or more additional words in the one or more available data storage circuit elements includes overwriting one or more prior words of the plurality of words previously stored in the one or more available data storage circuit elements.

\* \* \* \* \*